US00RE39297E

(19) United States
(12) Reissued Patent
Oshima et al.

(10) Patent Number: US RE39,297 E
(45) Date of Reissued Patent: Sep. 19, 2006

(54) MARK FORMING APPARATUS, METHOD OF FORMING LASER MARK ON OPTICAL DISK, REPRODUCING APPARATUS, OPTICAL DISK AND METHOD OF PRODUCING OPTICAL DISK

(75) Inventors: Mitsuaki Oshima, Kyoto (JP); Yoshiho Gotoh, Osaka (JP)

(73) Assignee: Matsushita Electric Industrial Co., Ltd., Osaka (JP)

(21) Appl. No.: 10/020,427

(22) Filed: Dec. 7, 2001

Related U.S. Patent Documents

Reissue of:
(64) Patent No.: 5,761,301
Issued: Jun. 2, 1998
Appl. No.: 08/560,015
Filed: Nov. 17, 1995

U.S. Applications:
(62) Division of application No. 09/588,364, filed on Jun. 2, 2000.

(30) Foreign Application Priority Data

Nov. 17, 1994 (JP) ..... 6-283415
Feb. 2, 1995 (JP) ..... 7-016153
Oct. 9, 1995 (JP) ..... 7-261247

(51) Int. Cl.
*H04K 1/00* (2006.01)

(52) U.S. Cl. ..... 369/272; 705/57; 369/52.1; 369/273; 369/286; 369/292; 235/494

(58) Field of Classification Search ..... 380/201, 380/203; 705/57; 369/272, 273, 286, 392, 369/52.1; 235/494
See application file for complete search history.

(56) References Cited

U.S. PATENT DOCUMENTS 4,503,531 A 3/1985 Kato
4,758,058 A 7/1988 Cato et al.
4,961,077 A 10/1990 Wilson et al. ..... 346/1.1

(Continued)

FOREIGN PATENT DOCUMENTS

CN 1059222 A 3/1992
DE 4308680 * 10/1993
EP 0329122 8/1989

(Continued)

OTHER PUBLICATIONS

European Search Report dated May 15, 1997.*
International Search Report dated Jan. 30, 1996.*
Official Action from the European Patent Office dated Mar. 28, 2003, for Application No. 01 108 949.7.
Replication and BCA, [internet]http://www.panasonicdvd-.com/rep.html, Dec. 2001.
"NSM Storage—Jukebox and Storage ABC," [internet] http://www.storageminds.com/nsm/nsm_folders/folders/algemeen/glossary_storage_and_jukebox.pdf, Dec. 2001.

(Continued)

*Primary Examiner*—Gregory Morse
*Assistant Examiner*—Paul E. Callahan
(74) *Attorney, Agent, or Firm*—RatnerPrestia

(57) ABSTRACT

An object of the present invention is to provide a marking forming apparatus, a method of forming a laser marking on an optical disk, a reproduction apparatus, an optical disk, and a method of manufacturing an optical disk, capable of providing a greatly improved copy prevention capability as compared to prior known construction. To achieve this object, in the optical disk of the invention, for example, a marking is formed by a laser on a reflective film of a disk holding data written thereon and at least position information of the marking or information concerning the position information is written on the disk in an encrypted form or with a digital signature appended thereto.

2 Claims, 43 Drawing Sheets

U.S. PATENT DOCUMENTS

| | | | | | |
|---|---|---|---|---|---|
| 5,050,150 | A | * | 9/1991 | Ikeda | 369/44.27 |
| 5,061,341 | A | | 10/1991 | Kildal et al. | |
| 5,065,429 | A | * | 11/1991 | Lang | 380/25 |
| 5,126,741 | A | | 6/1992 | Yoshida | 341/155 |
| 5,191,611 | A | * | 3/1993 | Lang | 380/25 |
| 5,197,060 | A | | 3/1993 | Yatake | |
| 5,309,421 | A | | 5/1994 | Fujisawa | |
| 5,371,792 | A | | 12/1994 | Asai et al. | |
| 5,392,351 | A | * | 2/1995 | Hasebe et al. | 380/4 |
| 5,400,403 | A | * | 3/1995 | Fahn et al. | 380/21 |
| 5,418,852 | A | | 5/1995 | Itami et al. | |
| 5,457,668 | A | * | 10/1995 | Hibino et al. | 380/4 |
| 5,457,746 | A | * | 10/1995 | Dolphin | 380/4 |
| 5,489,768 | A | | 2/1996 | Brownstein et al. | |
| 5,502,702 | A | | 3/1996 | Nakajo | |
| 5,513,169 | A | * | 4/1996 | Fite et al. | 380/3 |
| 5,549,953 | A | | 8/1996 | Li | |
| RE35,839 | E | | 7/1998 | Asai et al. | |
| 5,982,886 | A | | 11/1999 | Itami et al. | |

FOREIGN PATENT DOCUMENTS

| | | | | |
|---|---|---|---|---|
| EP | 0 520 619 | A | | 12/1992 |
| EP | 0 545 472 | A1 | | 6/1993 |
| EP | 0545472 | | * | 6/1993 |
| EP | 0 549 488 | | | 6/1993 |
| EP | 553545 | | * | 8/1993 |
| EP | 0553545 | | | 8/1993 |
| JP | 61-190734 | | * | 8/1986 |
| JP | 63-46541 | | * | 2/1988 |
| JP | 63-164043 | | * | 7/1988 |
| JP | 01-243237 | A | | 9/1989 |
| JP | 2-44448 | | * | 2/1990 |
| JP | 5-325193 | | * | 1/1991 |
| JP | 04-338872 | | | 11/1992 |
| JP | 5-266576 | | * | 10/1993 |
| JP | 5-325193 | | | 12/1993 |
| JP | 7-325712 | | * | 12/1995 |
| NL | 9101358 | | * | 3/1993 |

OTHER PUBLICATIONS

Japanese Official Action for JP 2002–235948, date mailed Sep. 28, 2004, with English translation.

Japanese Official Action for JP 2002–235949, date mailed Sep. 28, 2004, with English translation.

"Outline of Barcode Symbol", (see "JAN code standard" at http://www.barcode.ne.jp/about_barcode/code/index.html, with English translation.

European Search Report for EP 04020082, dated Oct. 6, 2004.

Chinese Official Action for CN 1059222A, dated issued Nov. 26, 2004 with English translation.

* cited by examiner

LEGITIMATE DISK

LOW-REFLECTIVITY PORTION ADDRESS TABLE

609

| MARK NO. | START POSITION | | | END POSITION | | |
|---|---|---|---|---|---|---|
| | ADDRESS | Sync No | CLOCK NUMBER | ADDRDSS | Sync No | CLOCK NUMBER |
| | | | | | | |
| 1 | A n | $S_1$ | m+2 | n | | m+257 |
| 1 | A n+12 | $S_2$ | m+14 | n+12 | | m+267 |
| 1 | A n+23 | | m+25 | n+23 | | m+300 |
| : | : | | : | : | | : |
| 2 | A n+1 | | m+15 | n+1 | | m+160 |
| 2 | A n+13 | | m+85 | n+13 | | m+250 |
| 2 | A n+24 | | m+68 | n+24 | | m+210 |
| | | | | | | |
| 10 | A n+9 | | | | | |
| 10 | | | | | | |

PLANNING

ILLEGALLY DUPLICATED DISK

LOW-REFLECTIVITY PORTION ADDRESS TABLE

609x

| MARK NO. | START POSITION | | | END POSITION | | |
|---|---|---|---|---|---|---|
| | ADDRDSS | Sync No | CLOCK NUMBER | ADDRDSS | Sync No | CLOCK NUMBER |
| | | | | | | |
| 1 | n | $S_1$ | m+2 | n | | m+257 |
| 1 | n+12 | $S_2$ | m+21 | n+12 | | m+277 |
| 1 | n+22 | | m+4 | n+22 | | m+230 |
| : | : | | : | : | | : |
| 2 | n+1 | | m+36 | n+1 | | m+190 |
| 2 | n+13 | | m+120 | n+13 | | m+281 |
| 2 | n+25 | | | n+25 | | |
| | | | | | | |
| 10 | n+9 | | | | | |
| 10 | | | | | | |

FIG. 17

BARCODE LINE WIDTH VERSUS RECORDING DENSITY

| LINE WIDTH W (μm) | PERIOD T (μm) | RECORDING DENSITY μm/bit | MAXIMUM RECORDING CAPACITY | LENGTH OF 1 KBITS 842 mm |
|---|---|---|---|---|
| 1 μm | 2 μm | 2.55 μm | ONE RING | 2.5mm |
| 3 μm | 6 μm | 7.5 μm | 56Kbit | 5mm |
| 5 μm | 10 μm | 12.5 μm | 28.2Kbit | 12.5mm |
| 10 μm | 20 μm | 25 μm | 11.2Kbit | 25mm |
| 20 μm | 40 μm | 50 μm | 5.6Kbit | 50mm |
| | | | 2.82Kbit | |

MARK FORMING APPARATUS, METHOD OF FORMING LASER MARK ON OPTICAL DISK, REPRODUCING APPARATUS, OPTICAL DISK AND METHOD OF PRODUCING OPTICAL DISK

Matter enclosed in heavy brackets [ ] appears in the original patent but forms no part of this reissue specification; matter printed in italics indicates the additions made by reissue.

*This is a Reissue Divisional Application of U.S. patent application Ser. No. 09/588,364, filed Jun. 2, 2000, which is a Reissue Application of U.S. Pat. No. 5,761,301, issued Jun. 2, 1998.*

BACKGROUND OF THE INVENTION

1. Field of the Invention

The present invention relates to a marking forming apparatus, a method of forming a laser marking to an optical disk, a reproduction apparatus, an optical disk, and a method of manufacturing an optical disk, which may be utilized, for example, to prevent duplication of optical disks.

2. Description of the Prior Art

With increasing use of ROM-type optical disks in recent years, pirated disks have also been spreading, infringing the rights of copyright owners.

This is because ROM disk manufacturing apparatus have been made readily available and also have become easy to operate.

A pirate can make a CD master disk just by extracting logic data from software contained on a CD, copying it onto a magnetic tape, and setting the tape on a mastering apparatus. Hundreds of thousands of pirated disks can be pressed from this single master disk. Since pirates do not, pay royalties, they make a profit by selling pirated disks at a low price. This necessarily means a financial loss to the copyright owner.

According to the current CD specification, only the function of reading logic data from a CD is provided, but no functions are provided to detect physical features of a disk. As a result, a pirated CD can be easily produced by bit-copying the logic data.

The prior art discloses a method of preventing piracy by adding a function to recognize disk physical features.

This method involves establishing a new specification that defines the inclusion of a physical mark on a master disk to prevent the pirating of disks made to this specification. As an example of the prior art, a piracy prevention method is known such as the one disclosed in Japanese Patent Unexamined Publication No. 5-325193. According to that method, in the cutting process the recording beam is deliberately swept in the tracking direction, when recording a designated region, to form a wobbling on the master disk. When the disk is played back on a reproduction apparatus equipped with a wobbling detection circuit, the disk is checked to see whether the wobbling is formed in the designated region. If it is detected that the wobbling of a designated wobbling frequency is formed in the designated region, the disk is judged to be a legitimate disk; otherwise, the disk is judged to be a pirated disk.

More specifically, based on predefined physical mark design data, a physical mark is formed on the masker disk by using a special mastering apparatus equipped with a wobbling function. This prevents pirates from making pirated disks since they do not have such special mastering apparatus nor physical mark design data. Such an anti-piracy mark needs to be formed on every disk made to this specification. However, since it is possible to extract this physical mark by examining a legitimate disk, the prior art method has had the problem that pirated disks may be made if such a special mastering apparatus falls into the hands of an illegal person. In this patent specification, piracy prevention methods of the type that forms a physical mark on the master disk will be referred to as master disk level methods.

Besides the above-described method, there has been proposed a more sophisticated master disk level method which involves forming a more complicated physical mark. On the other hand, a replica method is known that makes a replica having exactly the same physical features by melting the resin of a legitimate disk no matter how complicated the physical mark is made at the master disk level. This method requires much time and cost to produce one master disk, but since hundreds of thousands of disks can be produced from one pirated master disk, the cost per pirated disk is low. This has therefore given rise to the problem that as the replica method becomes widespread in the future, it may defeat the effectiveness of piracy prevention techniques at the master disk level.

As described above, the prior art piracy prevention techniques have several problems to be overcome.

These problems are summarized below.

Problem 1: The effectiveness of the master disk level piracy prevention techniques of the prior art is low since it is possible to replicate the physical mark.

Problem 2: In the prior art method that forms a physical mark based on physical mark design data, if a manufacturing apparatus of the same precision as the apparatus used by the legitimate disk manufacturer is obtained, illegal disks can be easily manufactured.

Problem 3: Since the security level provided by the prior art piracy prevention methods is fixed, its effectiveness decreases against constantly improving pirating techniques.

Problem 4: If a disk format without copy protection were allowed to exist along with a disk format with copy protection, pirated disks could be made with the disk format without copy protection. It has therefore been necessary to produce all disks with copy protection. The use of copy protection is therefore limited to closed specifications such as game disks.

Problem 5: According to the prior art methods, a limited number of licensing companies possess the special manufacturing apparatus and do not make the apparatus public. Therefore, software makers cannot make disks except at the licensing companies.

Problem 6: In the master-disk marking method, all disks pressed from the same master disk have the same disk ID. This means that all disks can be run by using the same password. As a result, password security cannot be maintained unless a floppy disk or a communication line is used in combination. Furthermore, the password has to be entered each time the disk is used since secondary recording is not possible.

SUMMARY OF THE INVENTION

In view of the above-outlined problems of the prior art, it is an object of the present invention to achieve a greatly improved copy prevention capability as compared to the prior art.

More specifically, the present invention provides the following means to overcome the above-outlined six problems of the prior art piracy prevention methods.

To overcome Problem 1, a piracy prevention method involving the use of a physical mark at a reflective film level, rather than the master disk level physical mark as used in the prior art, is provided wherein the physical mark is formed on a reflective film of a disk. This prevents the production of pirated disks if duplication is made at the master disk level.

To overcome Problem 2, a new ROM-recording means is used that performs secondary recording to a two-disk laminated ROM disk by using a laser. In a first step, physical marks are randomly formed, and in a second step, the physical marks are measured with a measuring accuracy as high as 0.13 μm. In a third step, their position information is encrypted and, using the secondary recording means, a barcode is recorded to the ROM disk with an accuracy of several tens of microns which is the usual processing accuracy. Optical mark position information can thus be obtained with an accuracy of, for example, 0.1 μm much higher than the processing accuracy of a conventional apparatus. Since optical marks cannot be formed with the accuracy of 0.1 μm by using commercially available equipment, production of pirated disks can be prevented.

To overcome Problem 3, both a first-generation cipher with a low degree of security and a second-generation cipher with a high degree of security, each enciphering the position information with a digital signature, are prerecorded on a medium and by using such a medium, piracy is prevented with the security corresponding to the applicable generation if the design of reproduction apparatus changes from one generation to the next.

To overcome Problem 4, an anti-piracy function identifier for indicating whether or not the software product is equipped with a copyright anti-piracy function is recorded on the master disk. To prevent the identifier from being altered, compressed information of software contents: and the anti-piracy function identifier are scrambled and encrypted together when recording the software contents on the master disk. Since the identifier cannot be altered, pirates cannot produce disks with a disk format without anti-piracy measures. This prevents the production of pirated disks.

To overcome Problem 5, as a secret key for digital signature encryption indispensable for the manufacture of disks, a subkey is generated from a master key, and the subkey is delivered to each software maker, thereby allowing the software maker to manufacture legitimate disks at its own factory.

To overcome Problem 6, position information of an antipiracy mark of the invention, which differs from one disk to another, is used as a disk identifier. The position information and the disk serial number, i.e., the disk ID, are combined and encrypted together with a digital signature, thus appending an unalterable disk ID to each disk. Since each completed disk has a different ID, the password is also different. The password does not work on other disks. This enhances password security.

Also, with the secondary recording of the invention, the password is secondary-recorded on the disk, permanently making the disk an operable disk.

Specific methods for overcoming the above six problems are disclosed below by way of embodiments.

The invention provides a marking forming apparatus comprising: marking forming means for applying at least one marking to at least one reflective film formed to a disk; marking position detecting means for detecting at least one position of said marking; and position information output means for outputting said detected position as position information of said marking.

The invention also provides a marking forming apparatus further comprising position information writing means for writing at least said output position information or information concerning said position information to said disk or to a different medium.

The invention also provides a method of forming a laser marking to an optical disk, comprising the steps of: forming at least one disk; forming a reflective film to said formed disk; laminating two disks together, said disks including at least one disk with said reflective film formed thereon; and forming at least one marking by a laser on said reflective layer of the laminated disks.

The invention also provides a reproduction apparatus comprising: position information reading means for reading position information of at least one marking or information concerning said position information, said marking being formed to at least one reflective film formed to a disk and being detected for a position thereof, at least the position thus detected being output as said position information of said marking; marking reading means for reading information concerning at least one actual position of aid marking; comparing/judging means for performing comparison and judgement by using a result of reading by said position information reading means and a result of reading by said marking reading means; and reproducing means for reproducing recorded data on said optical disk in accordance with a result of the comparison and judgement performed by said comparing/judging means.

The invention also provides a method of manufacturing an optical disk, comprising the steps of: forming at least one disk; forming a reflective film to said formed disk; applying at least one marking to said reflective film; detecting at least one position of said marking; and outputting said detected position as position information of said marking, and encrypting said information for writing to said disk.

The invention also provides a method of manufacturing an optical disk, comprising the steps of: forming at least one disk; forming a reflective film to said formed disk; applying at least one marking to said reflective film; detecting at least one position of said marking; and outputting said detected position as position information of said marking, and applying a digital signature in relation to said position information for writing to said disk.

The invention also provides an optical disk wherein at least one marking is formed by a laser to at least one reflective film of the disk holding data written thereon and at least position information of said marking or information concerning said position information is written to said disk in an encrypted form or with a digital signature applied thereto.

The invention also provides an optical disk having a structure such that at least one reflective film is sandwiched directly or indirectly between two members formed from material resistant to laser light, wherein at least one marking is formed by a laser to said reflective film.

BRIEF DESCRIPTION OF THE DRAWINGS

FIG. 17 is a diagram showing a comparison of low-reflectivity portion address tables for a legitimate disk and a duplicated disk;

DESCRIPTION OF THE PREFERRED EMBODIMENTS

The constitution and operation of a marking forming apparatus, a method of forming a laser marking to an optical disk, a reproduction apparatus, an optical disk, and a method of manufacturing an optical disk will be described below in accordance with an embodiment of the present invention.

In the description of the present embodiment given herein, the first half part (1) deals with such operations as manufacturing a disk, forming a marking by using a laser, reading position information of the marking, performing encryption and other processing on the position information, etc. for writing on an optical disk, and reproducing the optical disk on a player. The encryption and reproduction operations are briefly described in the first part (1).

Next, in the second half part (2), the encryption and other processing of the marking position information, etc. and the decryption and reproduction of the position information, etc. on the optical disk, briefly described in the first part (1), will be described in further detail. The second part (2) also deals with various techniques for preventing piracy.

In this patent specification, laser trimming is also referred to as laser marking, while a nonreflective optical marking portion is simply referred to as the marking or optical marking or, sometimes, as the physical ID unique to the disk.

Figure 1:
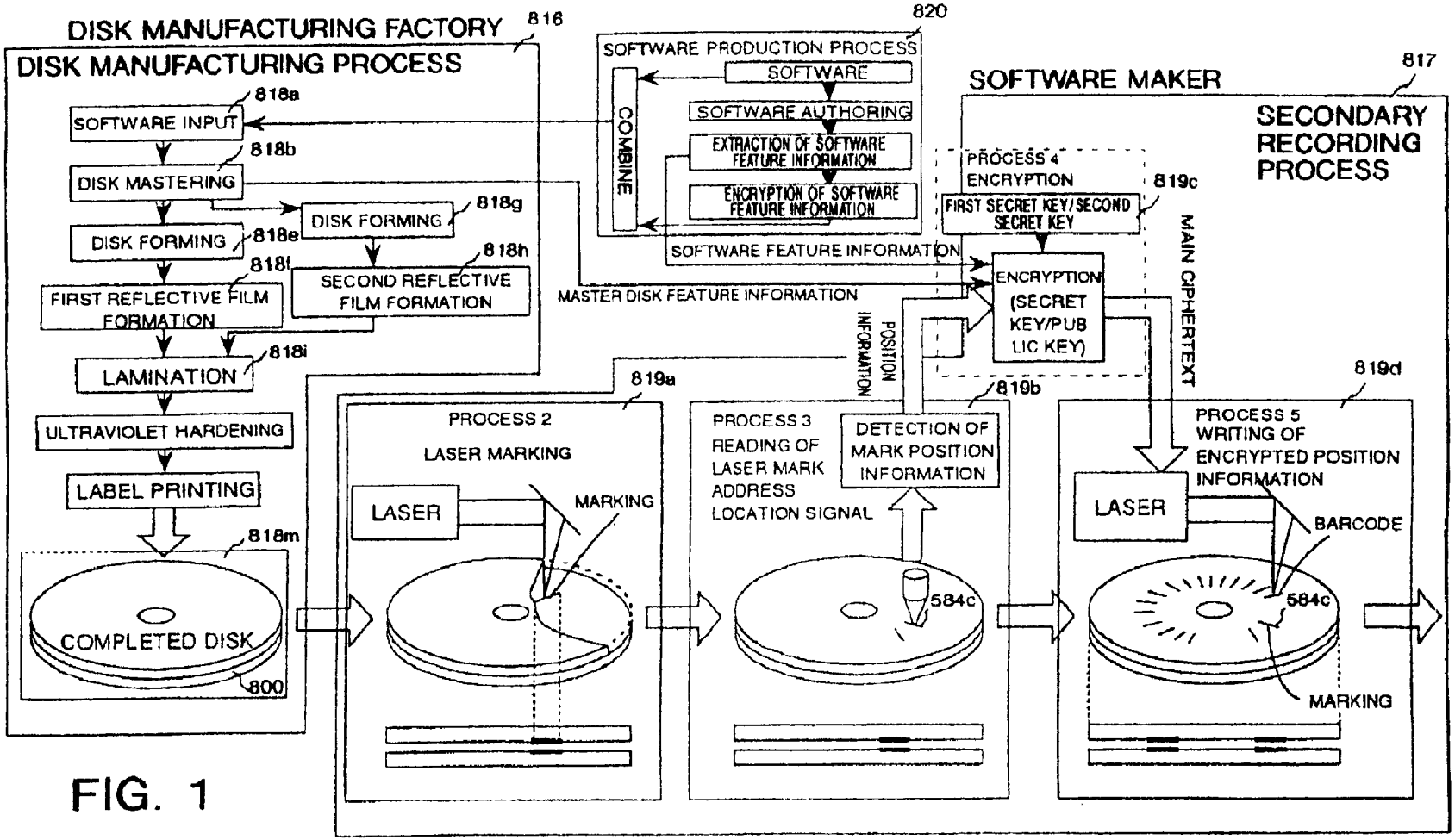
FIG. 1 is a diagram showing a disk manufacturing process and a secondary recording process according to the present embodiment.

(1) FIG. 1 is a flowchart illustrating a general process flow from disk manufacturing to the completion of an optical disk.

First, the software company performs software authoring in software production process 820. The completed software is delivered from the software company to the disk manufacturing factory. In disk manufacturing process 816 at the disk manufacturing factory, the completed software is input in step 818a, a master disk is produced (step 818b), disks are pressed (steps 818e, 818g), reflective films are formed on the respective disks (steps 818f, 818h), the two disks are laminated together (step 818i), and a ROM disk such as a DVD or CD is completed (step 818m, etc.).

Figures 2A, 2B, 2C, 2D, 2E:
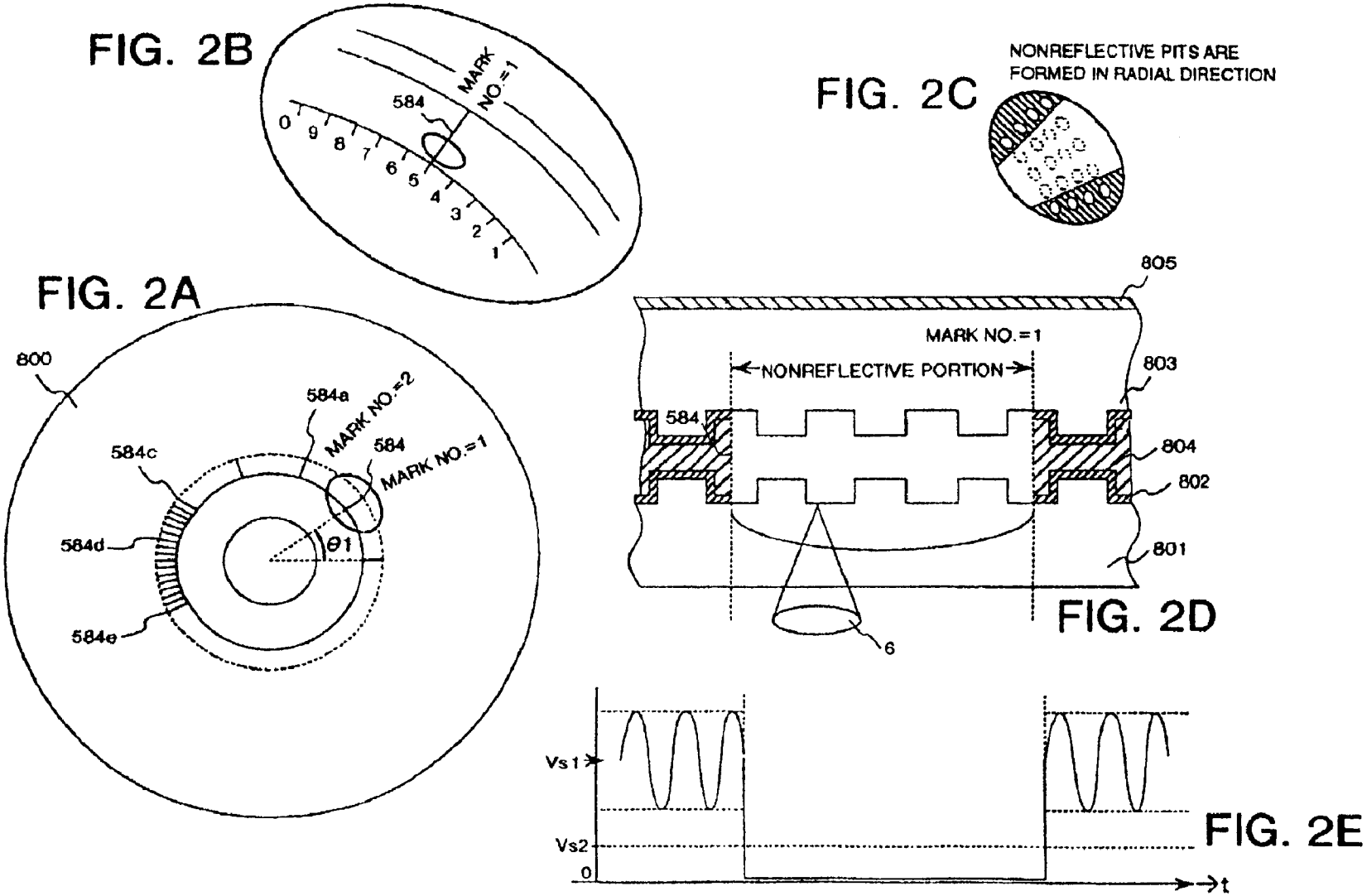
FIG. 2(a) is a top plan view of a disk according to the embodiment, (b) is a top plan view of the disk according to the embodiment, (c) is a top plan view of the disk according to the embodiment, (d) is a transverse sectional view of the disk according to the embodiment, and (e) is a waveform diagram of a reproduced signal according to the embodiment.

The thus completed disk 800 is delivered to the software maker or to a factory under control of the software maker, where, in secondary recording process 817, an anti-piracy marking 584, such the one shown in FIG. 2, is formed (step 819a), and accurate position information of this mark is read by a measuring means (step 819b) to obtain the position information which serves as the physical feature information of the disk. This physical feature information of the disk is encrypted in step 819c. The encrypted information is converted to a PWM-modulated signal which is then recorded in step 819d as a barcode signal on the disk by using a laser. The disk physical feature information may be combined together with software feature information for encryption in step 819c.

The above processes will be described in further detail. That is, a disk fabrication process, a marking formation process, a marking position reading process, and an encrypted information writing process for an optical disk according to the present invention will be described in detail with reference to FIGS. 4 and 5 and FIGS. 8 to 12. A supplementary explanation will also be given dealing with a disk having two reflective layers with reference to FIGS. 6 and 7. In the following description, the marking formation process and the marking position reading process are collectively called the secondary recording process.

(A) First, the disk fabrication process will be described. In the disk fabrication process 806 shown in FIG. 4, first a transparent substrate 801 is pressed in step (1). In step (2), a metal such as aluminum or gold is sputtered to form a reflective layer 802. An adhesive layer 804 formed from an ultraviolet curing resin is applied by spin coating to a substrate 803 formed in a different processing step, and the substrate 803 is bonded to the transparent substrate 801 having the reflective layer 802, and they are rotated at high speed to make the bonding spacing uniform. By exposure to external ultraviolet radiation, the resin hardens, thus firmly bonding the two substrates together. In step (4), a printed layer 805 where a CD or DVD title is printed, is printed by screen printing or offset printing. Thus, in step (4), the ordinary laminated-type optical ROM disk is completed.

Figure 4:
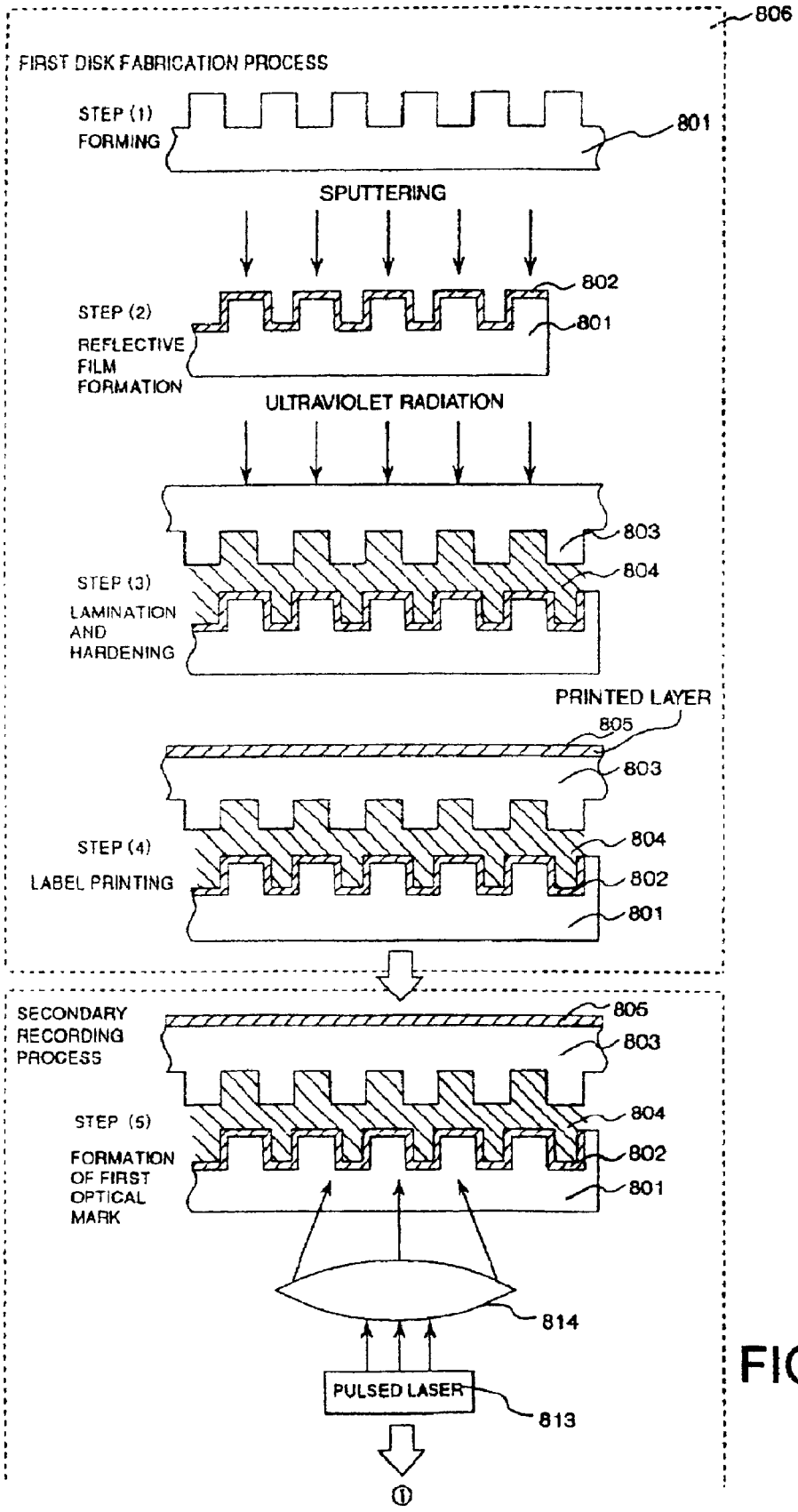
FIG. 4 is a diagram showing a disk fabrication process and a secondary recording process (part 1) according to the present embodiment.

(B) Next, the marking formation process will be described with reference to FIGS. 4 and 5. In FIG. 4, a laser beam from a pulsed laser 813 such as a YAG laser is focused through a converging lens 814 onto the reflective layer 802, to form a nonreflective portion 815 as shown in step (6) in FIG. 5. That is, a distinct waveform, such as the waveform (A) shown in step (7), is reproduced from the nonreflective portion 815 formed in step (6) in FIG. 5. By slicing this waveform, a marking detection signal such as shown by waveform (B) is obtained, from which hierarchial marking position information comprising an address, such as shown in signal (d), and an address, a frame synchronizing signal number, and a reproduced clock count, such as shown in signal (e), can be measured.

Figure 6:
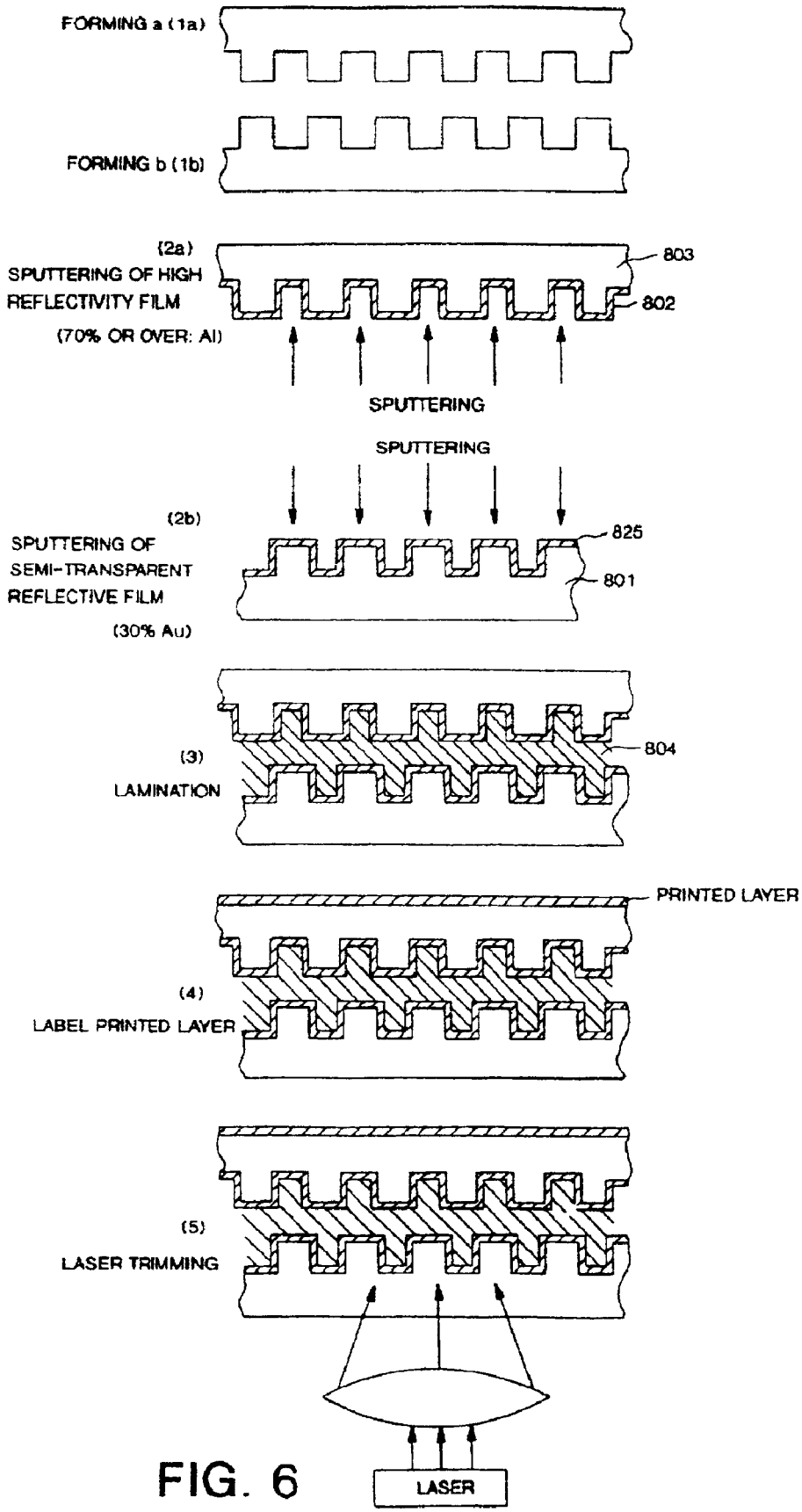
FIG. 6 is a diagram showing a two-layer disk fabrication process (part 1) according to the present embodiment.
Figure 7:
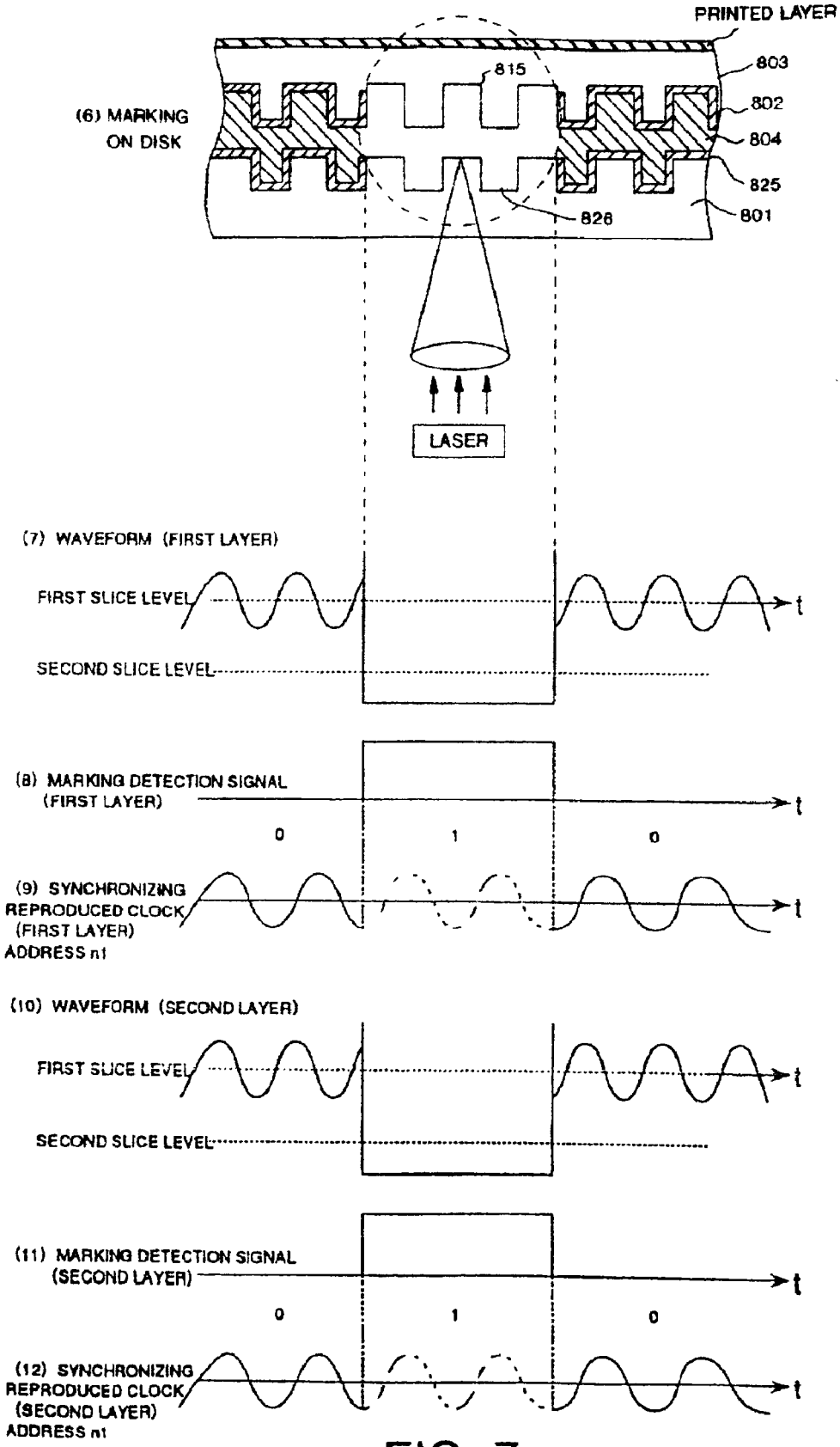
FIG. 7 is a diagram showing the two-layer disk fabrication process (part 2) according to the present embodiment.

As previously stated, a supplementary explanation will be given below of an alternative type of disk (a two-layer laminated disk) with reference to FIGS. 6 and 7.

Figure 5:
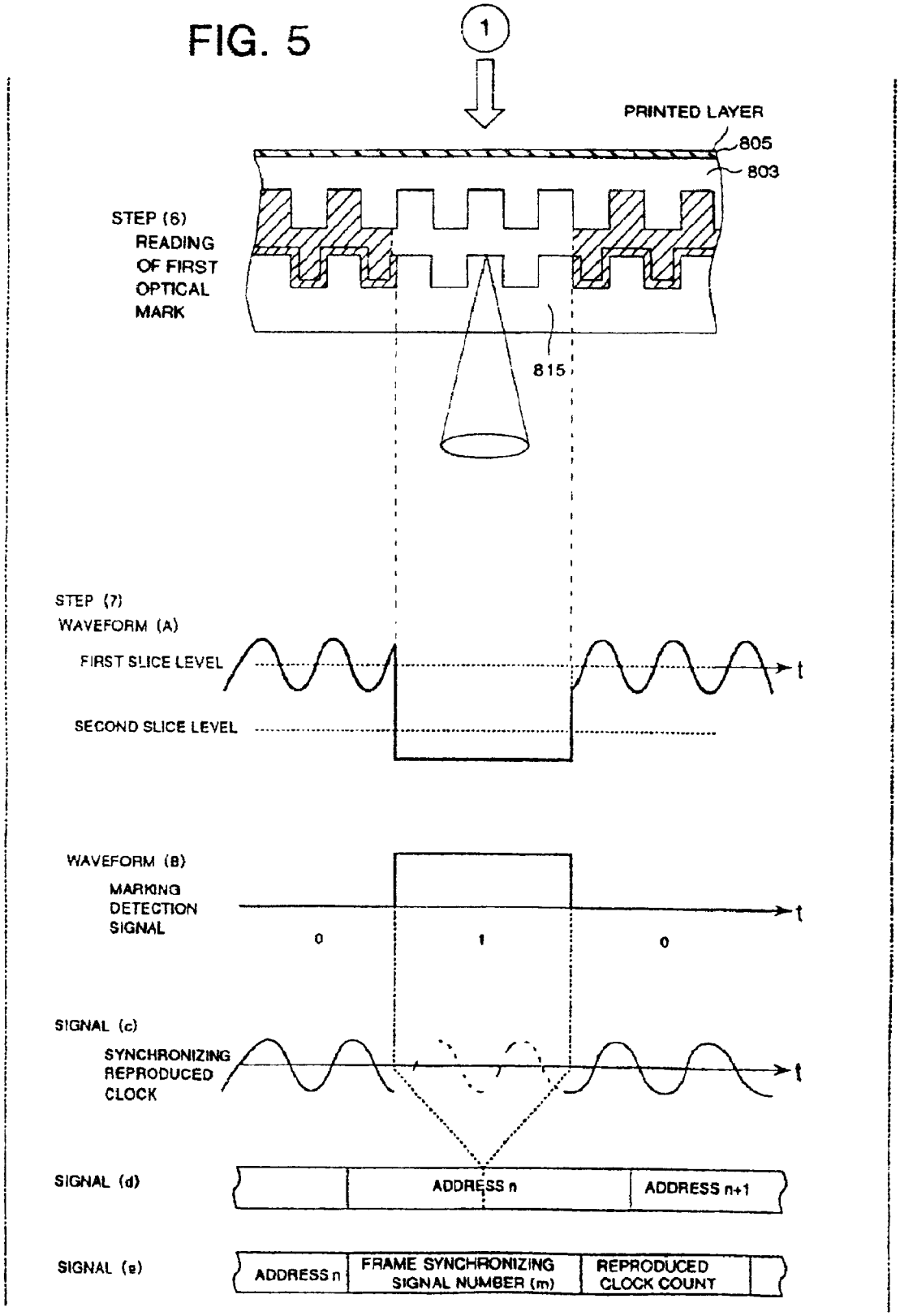
FIG. 5 is a diagram showing the disk fabrication process and the secondary recording process (part 2) according to the present embodiment.

FIGS. 4 and 5 showed a disk generally known as a single-layer laminated disk which has a reflective layer only on one substrate 801. On the other hand, FIGS. 6 and 7 show a disk generally known as a two-layer laminated disk which has reflective layers on both substrates 801 and 803. For laser trimming, the processing steps (5) and (6) are fundamentally the same for both types of disks, except with significant differences which are briefly described below. First, while the single-layer disk uses a reflective layer formed from an aluminum film having reflectivity as high as 70% or over, in the two-layer disk the reflective layer 801 formed on the reading-side substrate 801 is a semitransparent gold (Au) film having a reflectivity of 30%, while the reflective layer 802 formed on the print-side substrate 803 is the same as that used in the single-layer disk. Second, as compared with the single-layer disk, the two-layer disk is required to have high optical accuracy: for example, the adhesive layer 804 must be optically transparent and be uniform in thickness, and the optical transparency must not be lost due to laser trimming. FIGS. 7(7), 7(8), and 7(9) show the waveform from the first layer of the two-recording-layer disk. The waveform from the second layer is similar to that from the first layer, though the signal level is lower than from the first layer. However, since the first and second layers are bonded together, relative positional accuracy between them in random and can be controlled only with an accuracy of a few hundred microns. As will be described later, since the laser beam passes through the two reflective films, to make an illegal disk the position informations on the first and second layers for the first mark, for example, have to be made to match the same value on the legitimate disk. But making them match would require a near-submicron accuracy in laminating, and consequently, making illegal disks of the two-layer type is practically impossible.

Figure 8A:
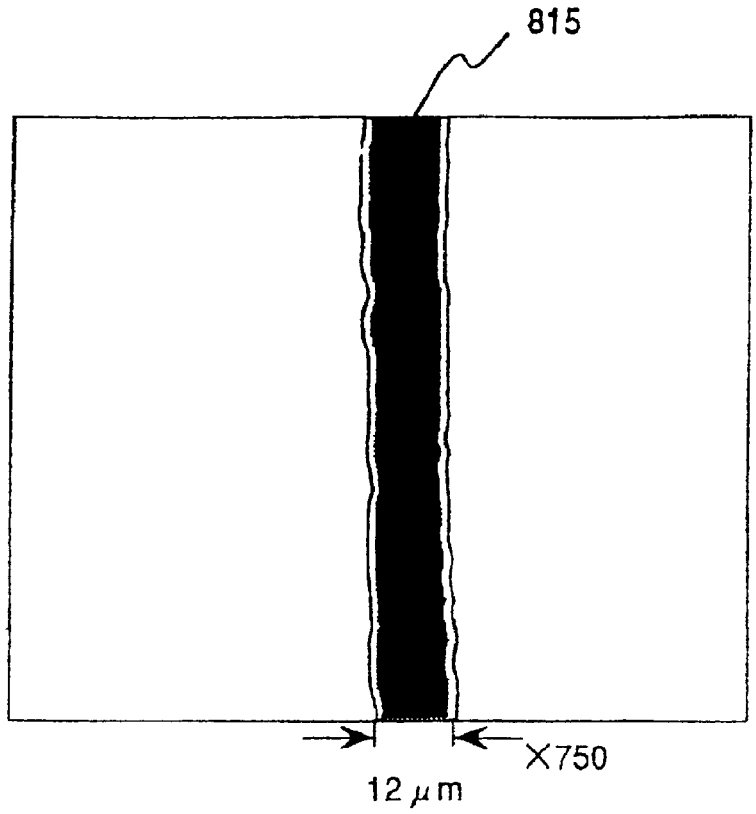
FIG. 8(a) is an enlarged view of a nonreflective portion of a laminated type according to the present embodiment, and (b) is an enlarged view of a nonreflective portion of a single-plate type according to the present embodiment.
Figure 10A:
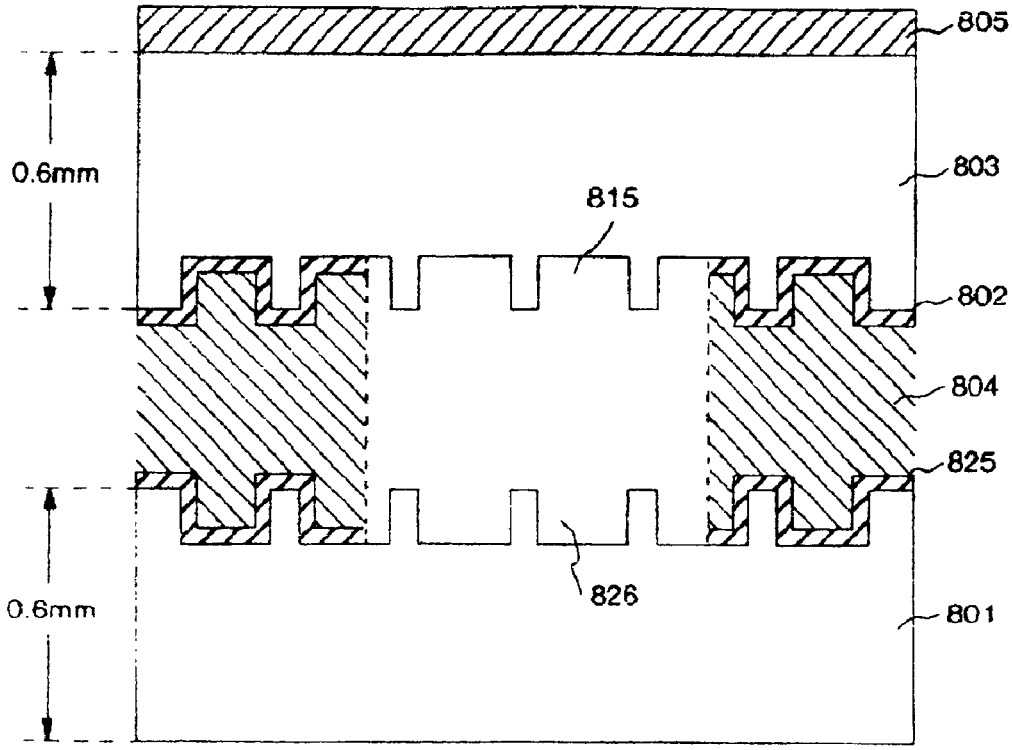
FIG. 10(a) is a cross-sectional view of a nonreflective portion of the laminated type according to the present embodiment, and (b) is a cross-sectional view of a nonreflective portion of the single-plate type according to the present embodiment.
Figure 10B:
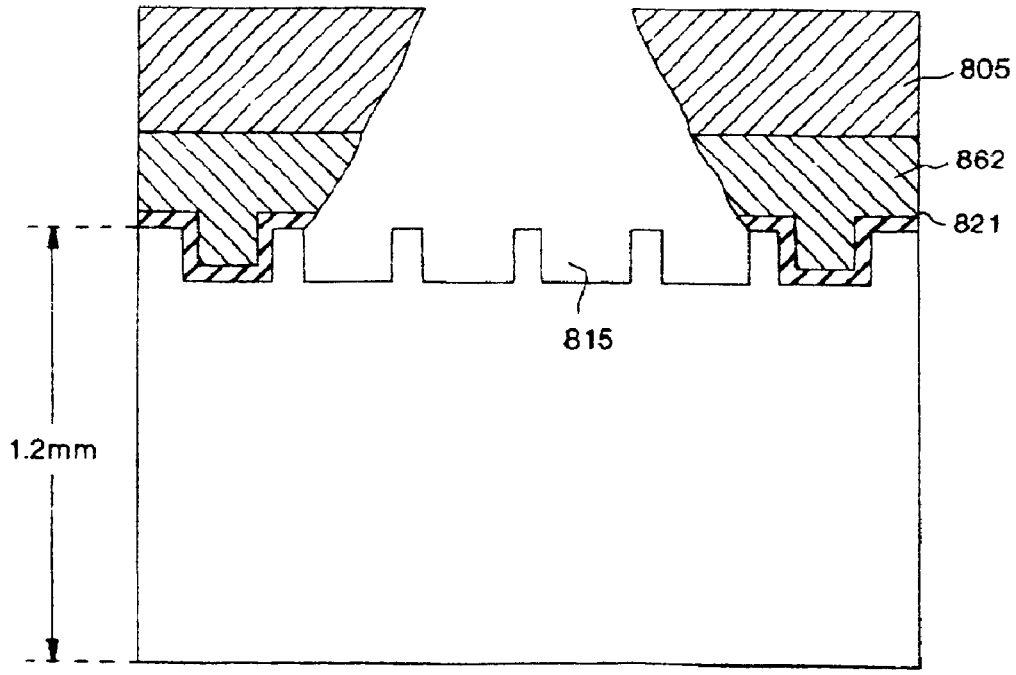
Figure 11:
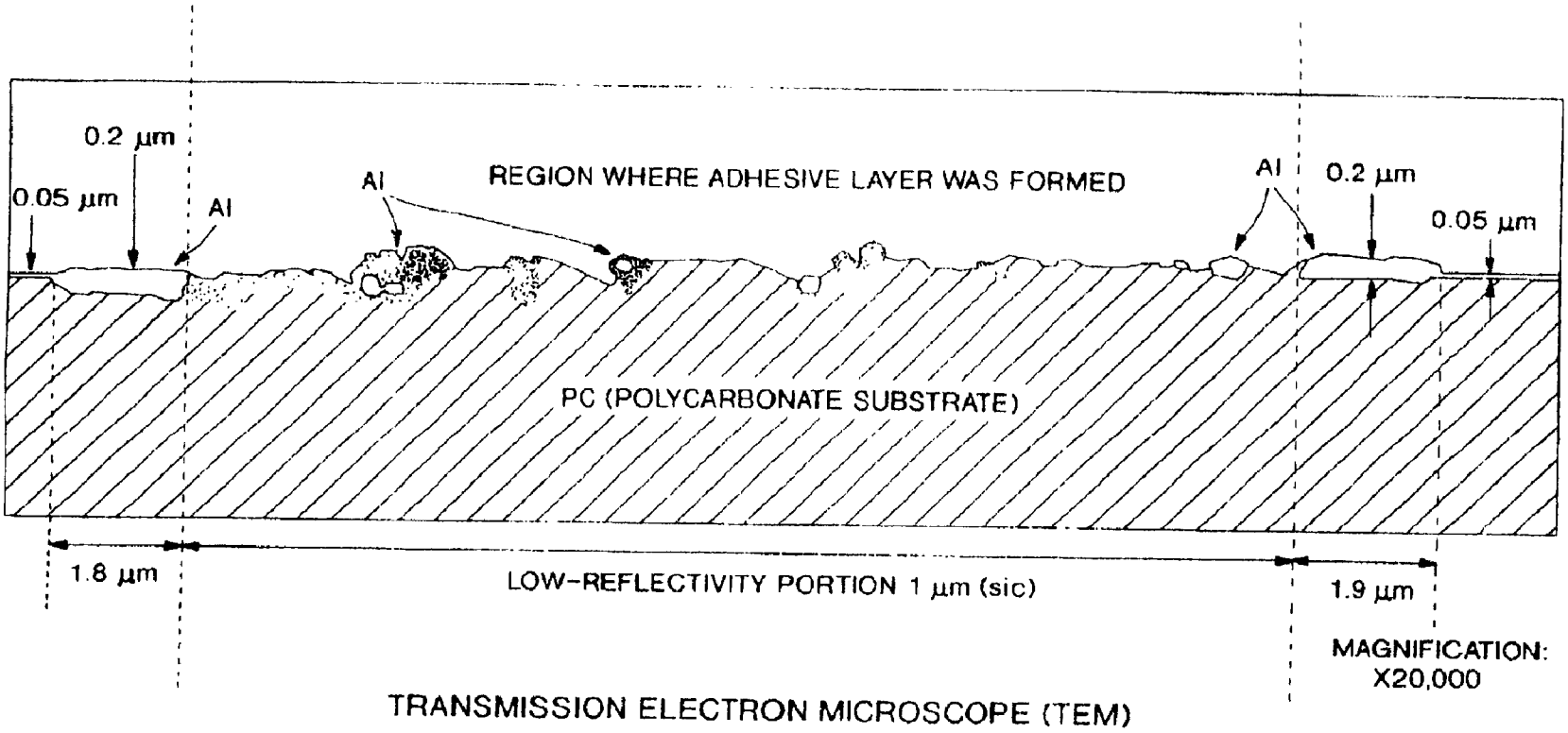
FIG. 11 is a schematic diagram, based on an observation through a transmission electron microscope, illustrating a cross section of the nonreflective portion according to the present embodiment.

The technique for forming the nonreflective optical marking portion will be described in further detail in sections (a) to (d) below with reference to FIGS. 8 to 12, etc., dealing with the laminated type in comparison with a single-plate type. FIGS. 8(a) and (b) are micrographs showing plan views of nonreflective optical marking portions, and FIG. 10 is a simplified schematic cross-sectional view of a nonreflective portion of the two-layer laminated disk. (a) Using a 5 μj/pulse YAG laser, a laser beam was applied to a 500-angstrom aluminum layer lying 0.6 mm below the surface of a 1.2-mm thick ROM disk consisting of two 0.6-mm thick disks laminated together, and, as a result, a 12 μm wide slit-like nonreflective portion 815 was formed, as shown in the X 750 micrograph of FIG. 8(a). In this X 750 micrograph, no aluminum residues were observed on the nonreflective portion 815. Thick swollen aluminum layers, 2000 angstroms thick and 2 μm wide, were observed along boundaries between the nonreflective portion 815 and reflective portions. As shown in FIG. 10(a), it was confirmed that no significant damage had occurred inside. In this case, the application of the pulsed laser presumably melted the aluminum reflective layer, causing a phenomenon of molten aluminum buildup along the boundaries on both sides due to the surface tension. We call this a hot melt surface tension (HMST) recording method. This is a characteristic phenomenon observed only on a laminated disk 800. FIG. 11 is a schematic diagram, based on an observation through a transmission electron microscope (TEM), illustrating a cross section of the nonreflective portion formed by the above laser trimming process. In the figure, if the aluminum film swollen portion is 1.3 μm wide and 0.20 μm thick, the amount of increased aluminum in that portion is $1.3\times(0.20-0.05)=0.195\ \mu m^2$. The amount of aluminum originally deposited in a half portion (5 μm) of the laser exposed region (10 μm) was $5\times0.05=0.250\ \mu m^2$. The difference is calculated as $0.250-0.195=0.055\ \mu m^2$. In terms of length, this is equivalent to $0.055/0.05=1.1$ μm. This means that an aluminum layer of 0.05 μm thickness and 1.1 μm length remained, and therefore, it can be safely said that almost all aluminum was drawn to the film swollen portion. Thus, the result of the analysis of the figure also verifies the explanation about the above-described characteristic phenomenon.

Figure 8B:
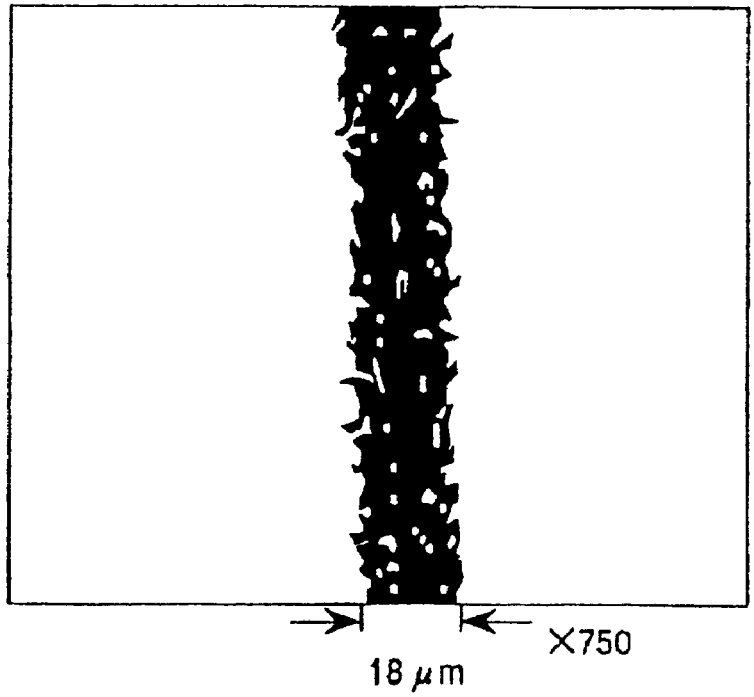

(b) We will next deal with the case of a single-plate optical disk (an optical disk comprising a single disk). An experiment was conducted by applying laser pulses of the same power to a 0.05 μm thick aluminum reflective film formed on a single-sided molded disk, of which result is shown in FIG. 8(b). As shown in the figure, aluminum residues were observed, and since these aluminum residues cause reproduction noise, it can be seen that the single-plate type is not suitable for secondary recording of optical disk information of which a high density and a low error rate are demanded. Furthermore, unlike the laminated disk, in the case of the single-plate disk, the protective layer 862 is inevitably damaged, as shown in FIG. 10(b), when the nonreflective portion is subjected to laser trimming. The degree of damage depends on the laser power, but the damage cannot be avoided even if the laser power is controlled accurately. Moreover, according to our experiment, the printed layer 805 formed by screen printing to a thickness of a few hundred microns on the protective layer 862 was damaged when its thermal absorptance was high. In the case of the single-plate disk, to address the problem of protective layer damage, either the protective layer has to be applied once again or the laser cut operation should be performed before depositing the protective layer. In any case, the single-plate type may present a problem in that the laser cut process has to be incorporated in the pressing process. This limits the application of the single-plate disk despite its usefulness.

Figure 12A:
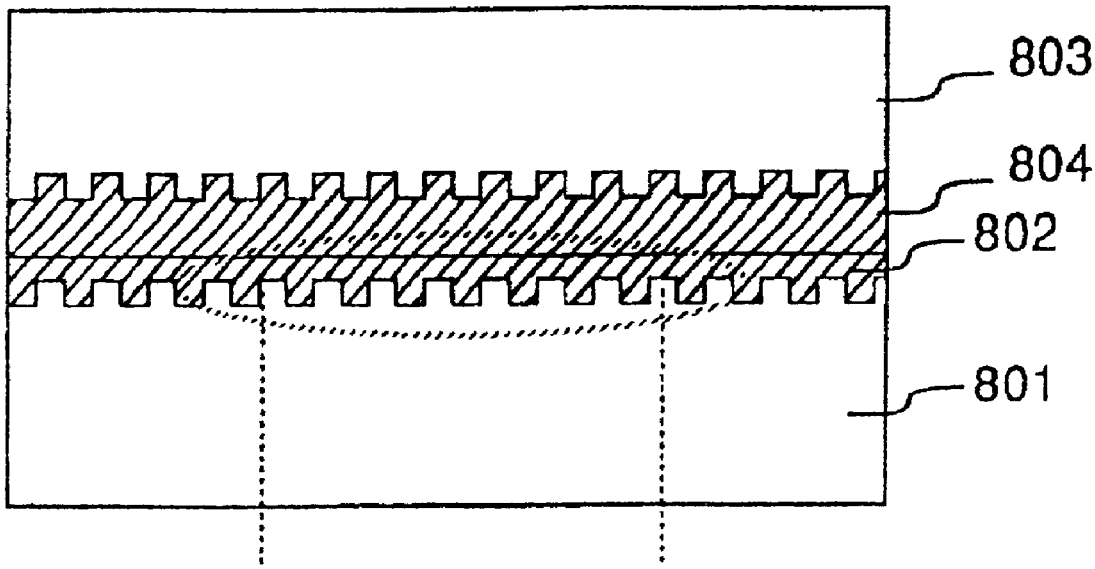
FIG. 12(a) is a cross-sectional view of a disk according to the present embodiment, and (b) is a crosssectional view of the nonreflective portion of the disk according to the present embodiment.
Figure 12B:
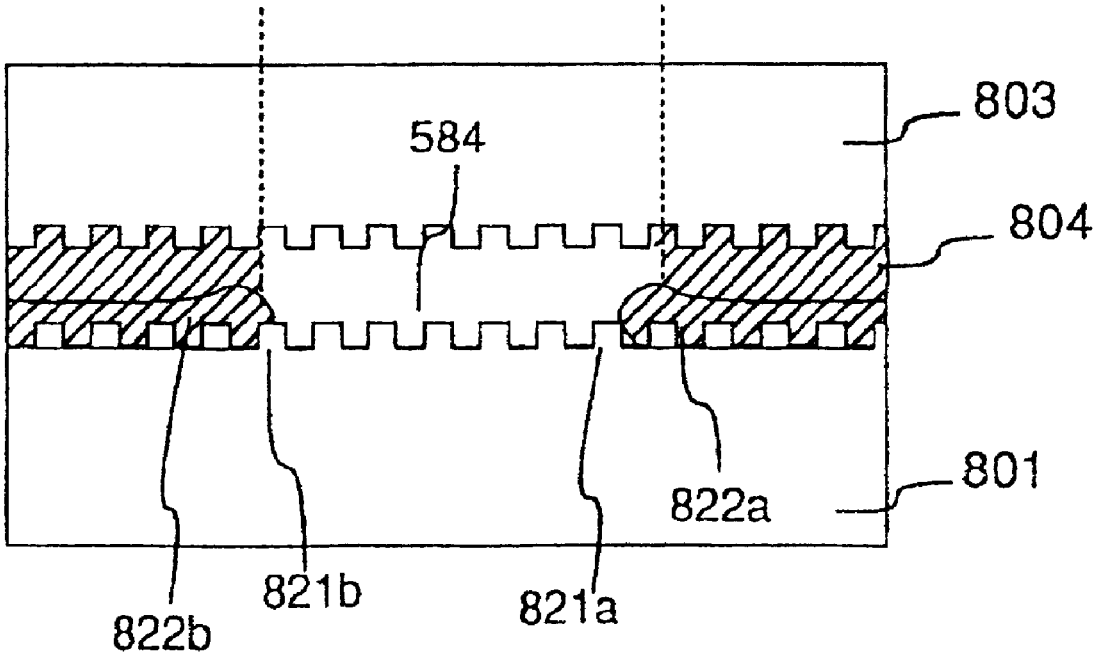

(c) A comparison between single-plate disk and laminated disk has been described above, using a two-layer laminated disk as an example. As is apparent from the above description, the same effect as obtained with the two-layer laminated disk can be obtained with the single-layer laminated disk. Using FIGS. 12(a), 12(b), etc., a further description will be given dealing with the single-layer type. As shown in FIG. 12(a), the reflective layer 802 has the transparent substrate 801 of polycarbonate on one side, and the hardened adhesive layer 804 and a substrate on the other side, the reflective layer 802 thus being hermetically sealed therebetween. In this condition, pulsed laser light is focused thereon for heating; in the case of our experiment, heat of 5 μJ/pulse is applied to a circular spot of 10 to 20 μm diameter on the reflective layer 802 for a short period of 70 ns. As a result, the temperature instantly rises to 600° C., the melting point, melting state is caused. By heat transfer, a small portion of the transparent substrate 801 near the spot is melted, and also a portion of the adhesive layer 804 is melted. The molted aluminum in this state is caused by surface tension to build up along boundaries 821a and 821b, with tension being applied to both sides, thus forming buildups 822a and 822b of hardened aluminum, as shown in FIG. 12(b). The nonreflective portion 584 free from aluminum residues is thus formed. This shows that a clearly defined nonreflective portion 584 can be obtained by laser-trimming the laminated disk as shown in FIG. 10(a). Exposure of the reflective layer to the outside environment due to a damaged protective layer, which was the case with the single-plate type, was not observed even when the laser power was increased more than 10 times the optimum value. After the laser trimming, the nonreflective layer 584 has the structure shown in FIG. 12(b) where it is sandwiched between the two transparent substrates 801 and sealed on both sides with the adhesive layer 804 against the outside environment, thus producing the effect of protecting the structure from environmental effects.

(d) Another benefit of laminating two disks together will be described next. When secondary recording is made in the form of a barcode, an illegal manufacturer can expose the aluminum layer by removing the protective layer in the case of a single-plate disk, as shown in FIG. 10(b). This gives rise to a possibility that nonecrypted data may be tampered with by redepositing an aluminum layer over the barcode portion on a legitimate disk and then laser-trimming a different barcode. For example, if the ID number is recorded in plaintext or separately from main ciphertext, in the case of a single-plate disk it is possible to alter the ID number, enabling illegal use of the software by using a different password. However, if the secondary recording is made on the laminated disk as shown in FIG. 10(a), it is difficult to separate the laminated disk into two sides. In addition, when removing one side from the other, the aluminum reflective film is partially destroyed. When the anti-piracy marking is destroyed, the disk will be judged as being a pirated disk and will not run. Accordingly, when making illegal alterations to the laminated disk, the yield is low and thus illegal alterations are suppressed for economic reasons. Particularly, in the case of the two-layer laminated disk, since the polycarbonate material has temperature/humidity expansion coefficients, it is nearly impossible to laminate the two disks, once separated, by aligning the anti-piracy markings on the first and second layers with an accuracy of a few microns, and to mass produce disks. Thus, the two-layer type provides a greater effectiveness in piracy prevention. It was thus found that a clearly defined slit of a nonreflective portion 584 can be obtained by laser-trimming the laminated disk 800.

The technique for forming the nonreflective optical marking portion has been described in (a) to (d) above.

(C) Next, the process of reading the position of the thus formed marking will be described.

Figure 15:
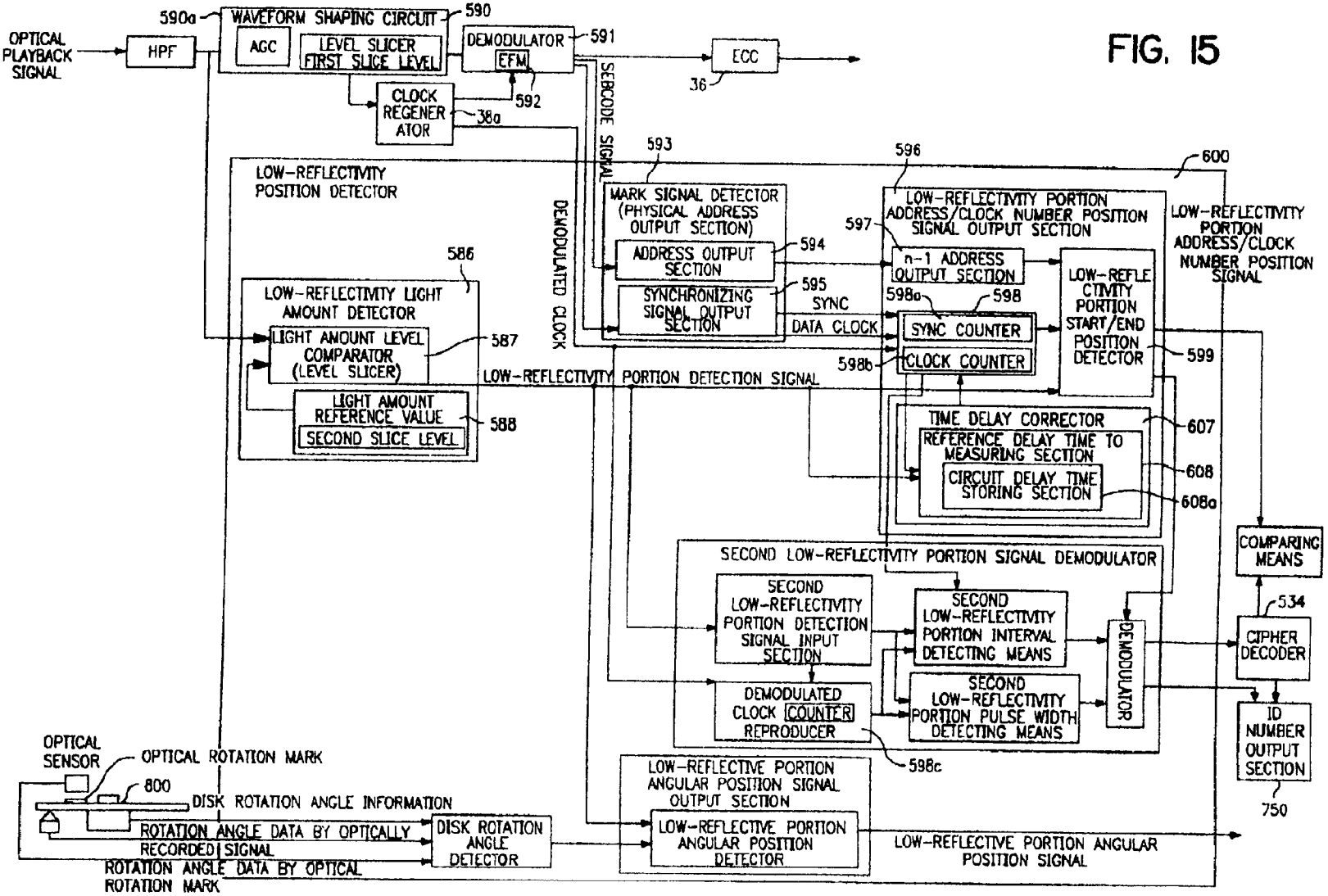
FIG. 15 is a block diagram of a low-reflectivity position detector according to the embodiment.
Figure 16:
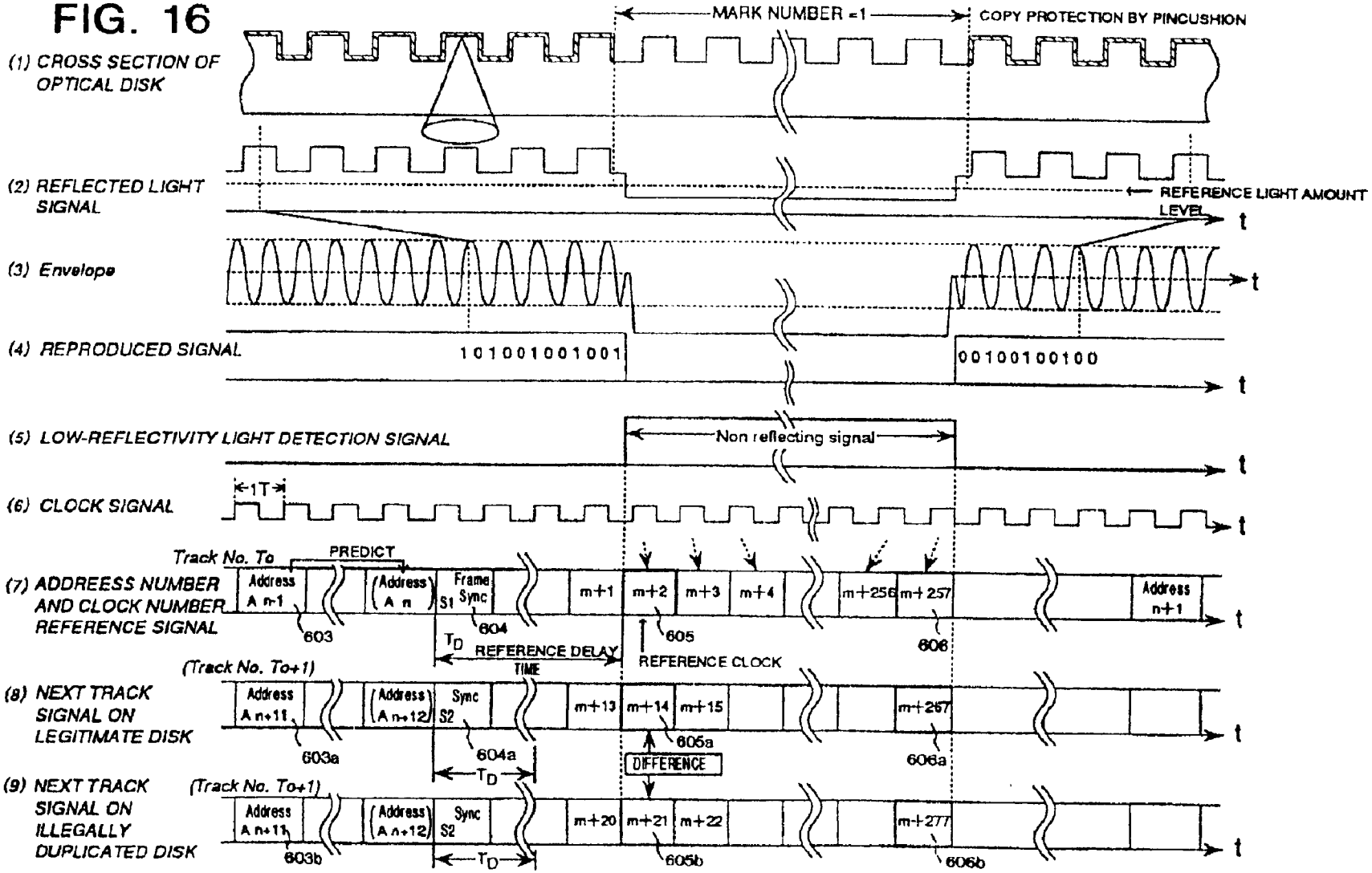
FIG. 16 is a diagram illustrating the principle of detecting address/clock positions of a low-reflectivity portion according to the embodiment.

FIG. 15 is a block diagram showing a low reflectivity light amount detector 586 for detecting a nonreflective optical marking portion, along with its adjacent circuitry, in an optical disk manufacturing process. FIG. 16 is a diagram illustrating the principle of detecting address/clock positions of the low reflectivity portion. For convenience of explanation, the following description deals with the operating principle when a read operation is performed on a nonreflective portion formed on an optical disk constructed from a single disk. It will be recognized that the same operating principle also applies to an optical disk constructed from two disks laminated together.

Figure 9A:
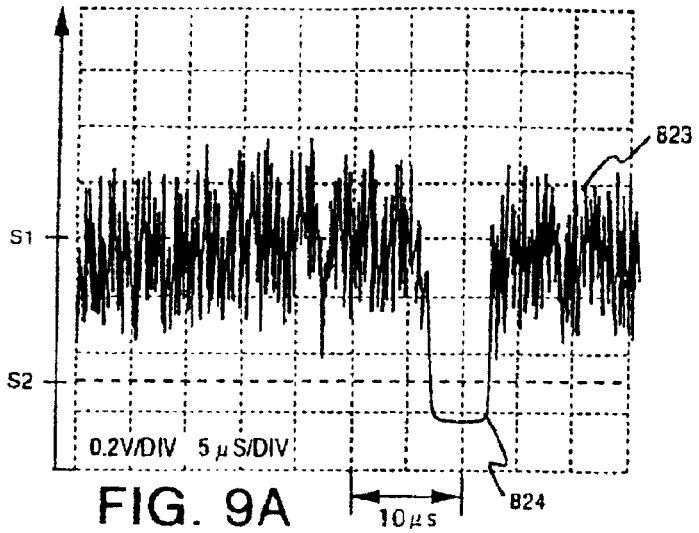
FIG. 9(a) is a reproduced-waveform diagram for a nonreflective portion according to the present embodiment, (b) is a reproduced-waveform diagram for a nonreflective portion according to the present embodiment, and (c) is a reproduced-waveform diagram for a nonreflective portion according to the present embodiment.
Figure 9B:
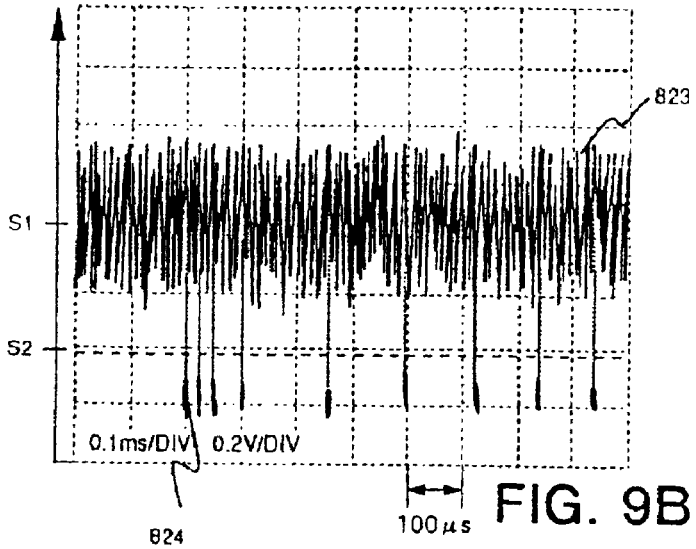

As shown in FIG. 15, the disk 800 is loaded into a marking reading apparatus equipped with a low reflectivity position detector 600 to read the marking, and in this case, since a signal waveform 823 due to the presence and absence of pits and a signal waveform 824 due to the presence of the nonreflective portion 584 are significantly different in signal level, as shown in the waveform diagram of FIG. 9(a), they can be clearly distinguished using a simple circuit.

The start position and end position of the nonreflective portion 564 having the above waveform can be easily detected by the low reflectivity light amount detector 586 shown in the block diagram of FIG. 15. Using the reproduced clock signal as the reference signal, position information is obtained in a low reflectivity position information output section 596.

As shown in FIG. 15, a comparator 587 in the low reflectivity light amount detector 586 detects the low reflectivity light portion by detecting an analog light reproduced signal having a lower signal level than a light amount reference value 588. During the detection period, a low reflectivity portion detection signal of the waveform shown in FIG. 16(5) is output. The addresses and clock positions of the start position and end position of this signal are measured.

The reproduced light signal is waveshaped by a waveform shaping circuit 590 having an AGC 590a, for conversion into a digital signal. A clock regenerator 38a regenerates a clock signal from the waveshaped signal. An EFM demodulator 592 in a demodulating section 591 demodulates the signal, and an ECC corrects errors and outputs a digital signal. The EFM-demodulated signal is also fed to a physical address output section 593 where an address of MSF, from Q bits of a subcode in the case of a CD, is output from an address output section 594 and a synchronizing signal, such as a frame synchronizing signal, is output from a synchronizing signal output section 595. From the clock regenerator 38a, a demodulated clock is output.

In a low reflectivity portion address/clock signal position signal output section 596, a low reflectivity portion start/end position detector 599 accurately measures the start position and end position of the low reflectivity portion 584 by using an (n−1) address output section 597 and an address signal as well as a clock counter 598 and a synchronizing clock signal or the demodulated clock. This method will be described in detail by using the waveform diagrams shown in FIG. 16. As shown in the cross-sectional view of the optical disk in FIG. 16(1), the low reflectivity portion 584 of mark number 1 is formed partially. A reflection selope signal such as shown in FIG. 16(3), is output, the signal level from the reflective portion being lower than the light amount reference value 588. This is detected by the light level comparator 587, and a low reflectivity light detection signal, such as shown in FIG. 16(5), is output from the low reflectivity light amount detector 586. As shown by a reproduced digital signal in FIG. 16(4), no digital signal is output from the mark region since it does not have a reflective layer.

Next, to obtain the start and end positions of the low reflectivity light detection signal, the demodulated clock or synchronizing clock shown in FIG. 16(6) is used along with address information. First, a reference clock 605 at address n in FIG. 16(7) is measured. When the address immediately preceding the address n is detected by the (n−1) address output section 597, it is found that the next sync 604 is a sync at address n. The number of clocks from the synch 604 to the reference clock 605, which is the start position of the low reflectivity light detection signal, is counted by the clock counter 598. This clock count is defined as a reference delay time TD which is measured by a reference delay time TD measuring section 608 for storage therein.

The circuit delay time varies with reproduction apparatus used for reading, which means that the reference delay time TD varies depending on the reproduction apparatus used. Therefore, using the TD, a time delay corrector 607 applies time correction, and the resulting effect is that the start clock count for the low reflectivity portion can be measured accurately if reproduction apparatus of different designs are used for reading. Next, by finding the clock count and the start and end addresses for the optical mark No. 1 in the next track, clock m+14 at address n+12 is obtained, as shown in FIG. 16(8). Since TD=m+2, the clock count is corrected to 12, but for convenience of explanation, n+14 is used. We will describe another method, which eliminates the effects of varying delay times without having to obtain the reference delay time TD in the reproduction apparatus used for reading. This method can check whether the disk is a legitimate disk or not by checking whether the positional relationship of mark 1 at address n in FIG. 16(8) relative to another mark 2 matches or not. That is, TD is ignored as a variable, and the difference between the position, A1=a1+TD, of mark 1 measured and the position, A2=a2+TD, of mark 2 measured is obtained, which is given as A1−A2=a1−a2. At the same time, it is checked whether this difference matches the difference, a1−a2, between the position a1 of the decrypted mark 1 and the position information a2 of the mark 2, thereby judging whether the disk is a legitimate disk or not. The effect of this method is that the positions can be checked after compensating for variations of the reference delay time TD by using a simpler constitution.

Figure 3:
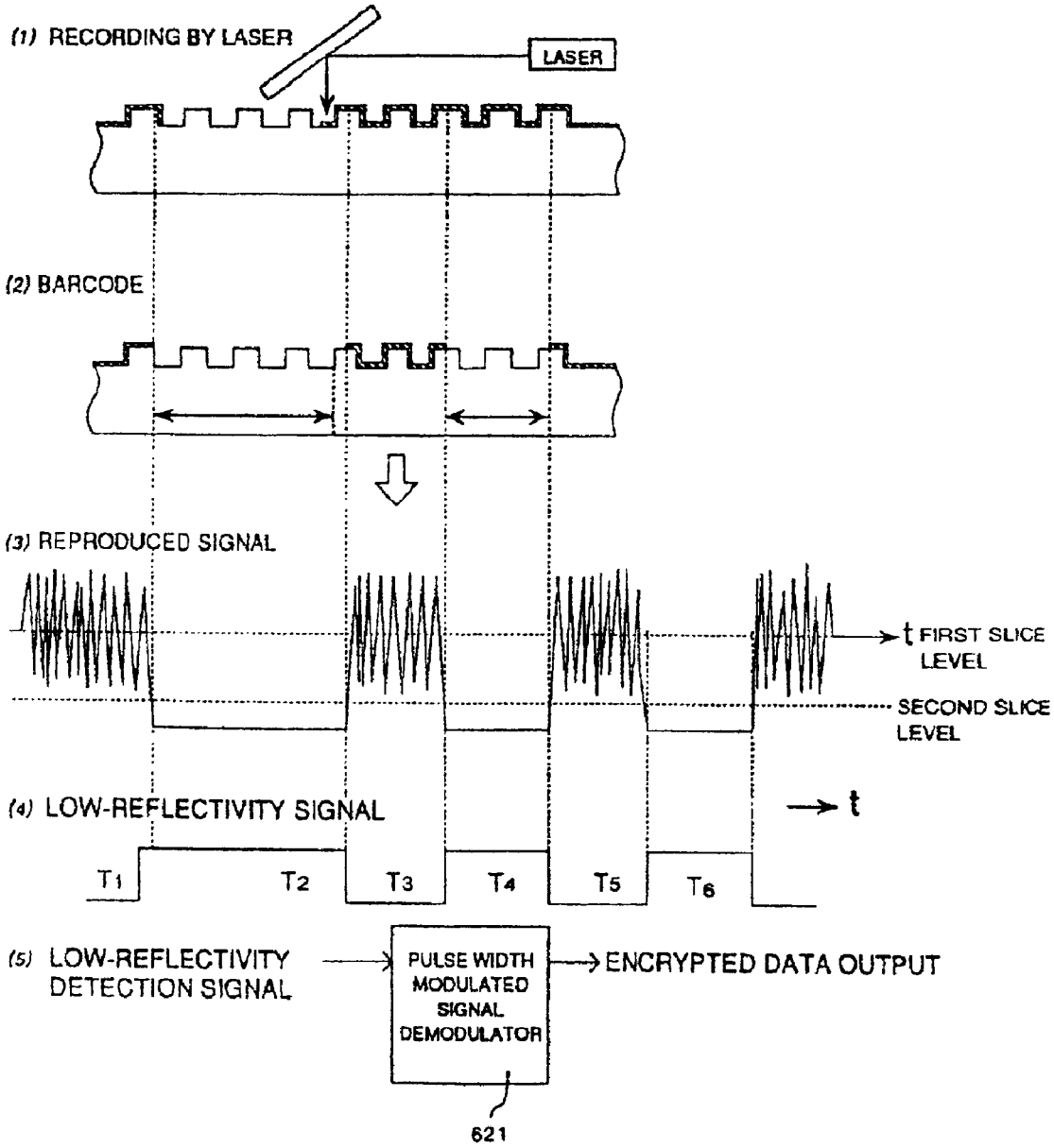
FIG. 3 is a flowchart illustrating a process of recording encrypted position information on a disk in the form of a barcode according to the present embodiment.

(D) Next, the encrypted information writing process will be described. The position information read in the process (C) is encrypted (digital signature), as will be described in detail in the next section (2), and is written on the optical disk using a barcode or other method. FIG. 3 shows how this is done. In FIG. 3(1), the reflective layer is trimmed by a pulsed laser, and a barcode-like trimming pattern, such as shown in FIG. 3(2), is formed. At a reproduction apparatus (player), an envelope waveform some portions of which are missing as shown in FIG. 3(3) is obtained. The missing portions generate a low level signal which is different from a signal generated from an ordinary pit, and this signal is sliced by a second slice level comparator to obtain a low reflectivity portion detection signal as shown in FIG. 3(4). From this low reflectivity portion detection signal, a PWM demodulator 621 in FIG. 3(5) demodulates the signal containing encrypted information.

Figure 41:
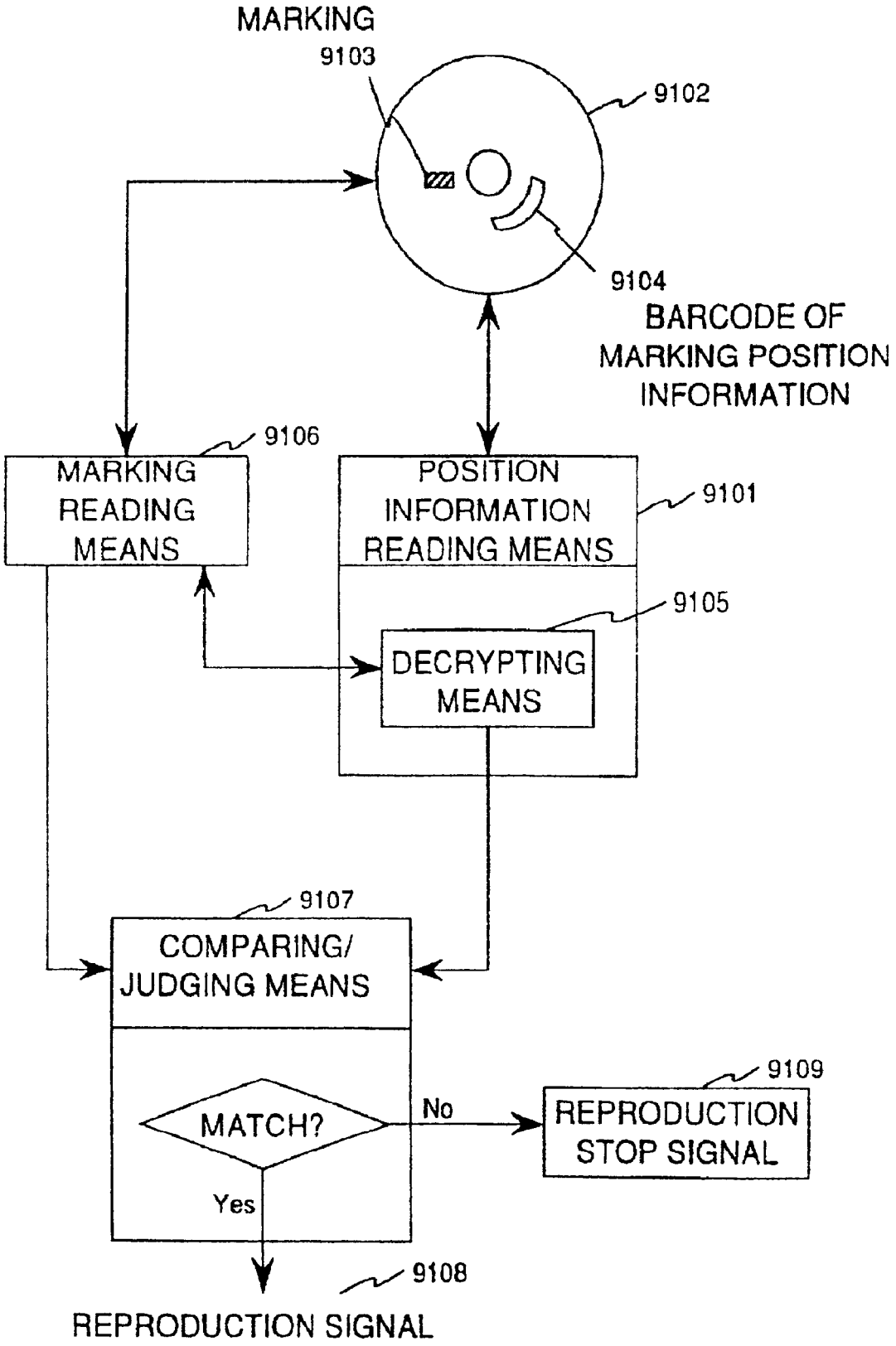
FIG. 41 is a block diagram of an optical disk reproduction apparatus according to the present embodiment.

The processing steps in the optical disk manufacturing process have been described above. Next, the constitution and operation of a reproduction apparatus (player) for reproducing the thus completed optical disk on a player will be described with reference to FIG. 41.

In the figure, the construction of an optical disk 9102 will be described first. A marking 9103 is formed on a reflective layer (not shown) deposited on the optical disk 9102. In the manufacturing process of the optical disk, the position of the marking 9103 was detected by position detecting means, and the detected position was encrypted as marking position information and written on the optical disk in the form of a barcode 9104.

Position information reading means 9101 reads the barcode 9104, and decrypting means 9105 contained therein decrypts the contents of the barcode for output. Marking reading means 9106 reads the actual position of the marking 9103 and outputs the result. Comparing/judging means 9107 compares the decrypted result from the decrypting means 9105 contained in the position information reading means 9101 with the result of reading by the marking reading means 9106, and judges whether the two agree within a predetermined allowable range. If they agree, a reproduction signal 9108 for reproducing the optical disk is output; if they do not agree, a reproduction stop signal 9109 is output. Control means (not shown) controls the reproduction operation of the optical disk in accordance with these signals; when the reproduction stop signal is output, an indication to the effect that the optical disk is an illegal duplicated disk is displayed on a display (not shown) and the reproduction operation is stopped. In the above operation, it will be recognized that it is also possible for the marking reading means 9106 to use the decrypted result from the decrypting means 9105 when reading the actual position of the marking 9103.

Thus the reproduction apparatus of the above construction can detect an illegally duplicated optical disk and stop the reproduction operation of the disk, and can prevent illegal duplicates practically.

The foregoing description has dealt with the process from optical disk manufacturing to the reproduction operation of the player, and we will now proceed to a description of appertaining matters relating to the details of the above process.

(A) A low reflectivity portion address table, which is a position information list for the low reflectivity portion, will be explained.

Figure 13A:
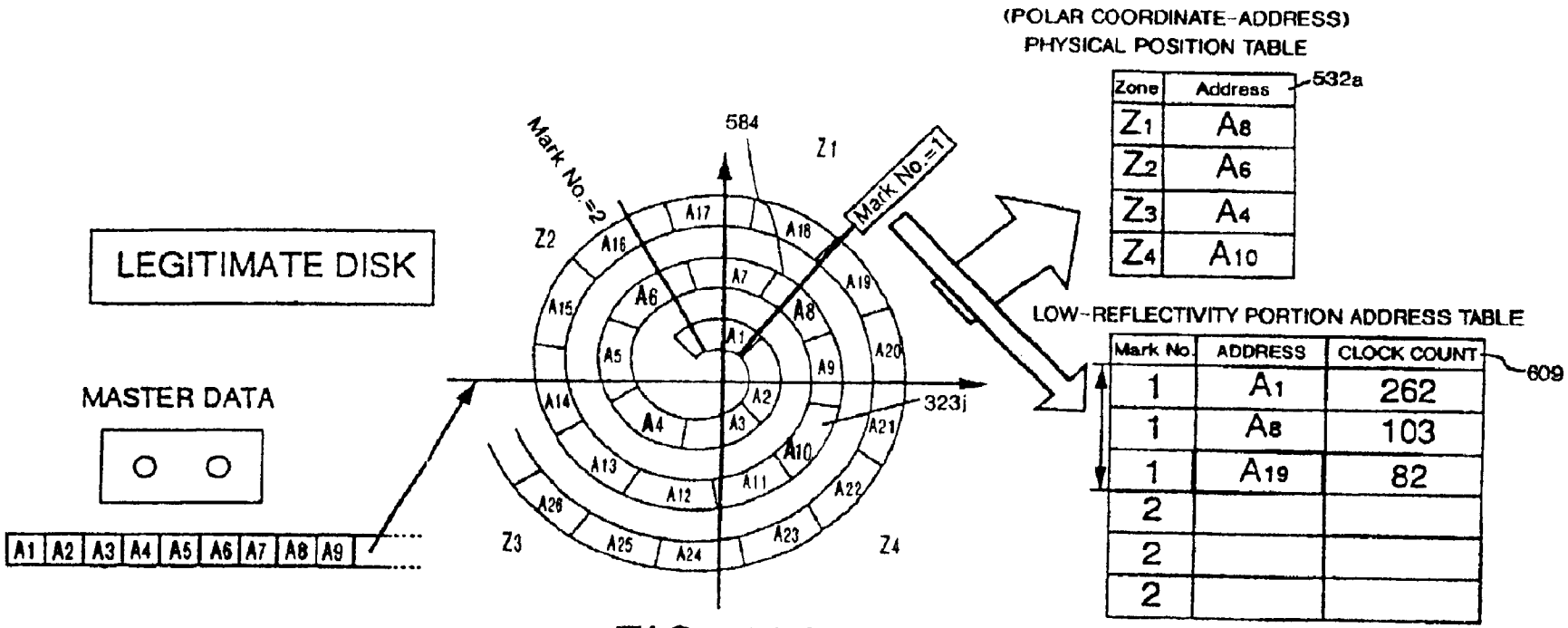
FIG. 13(a) is a diagram showing a physical arrangement of addresses on a legitimate CD according to the embodiment, and (b) is a physical arrangement of addresses on an illegally duplicated CD according to the embodiment.
Figure 13B:
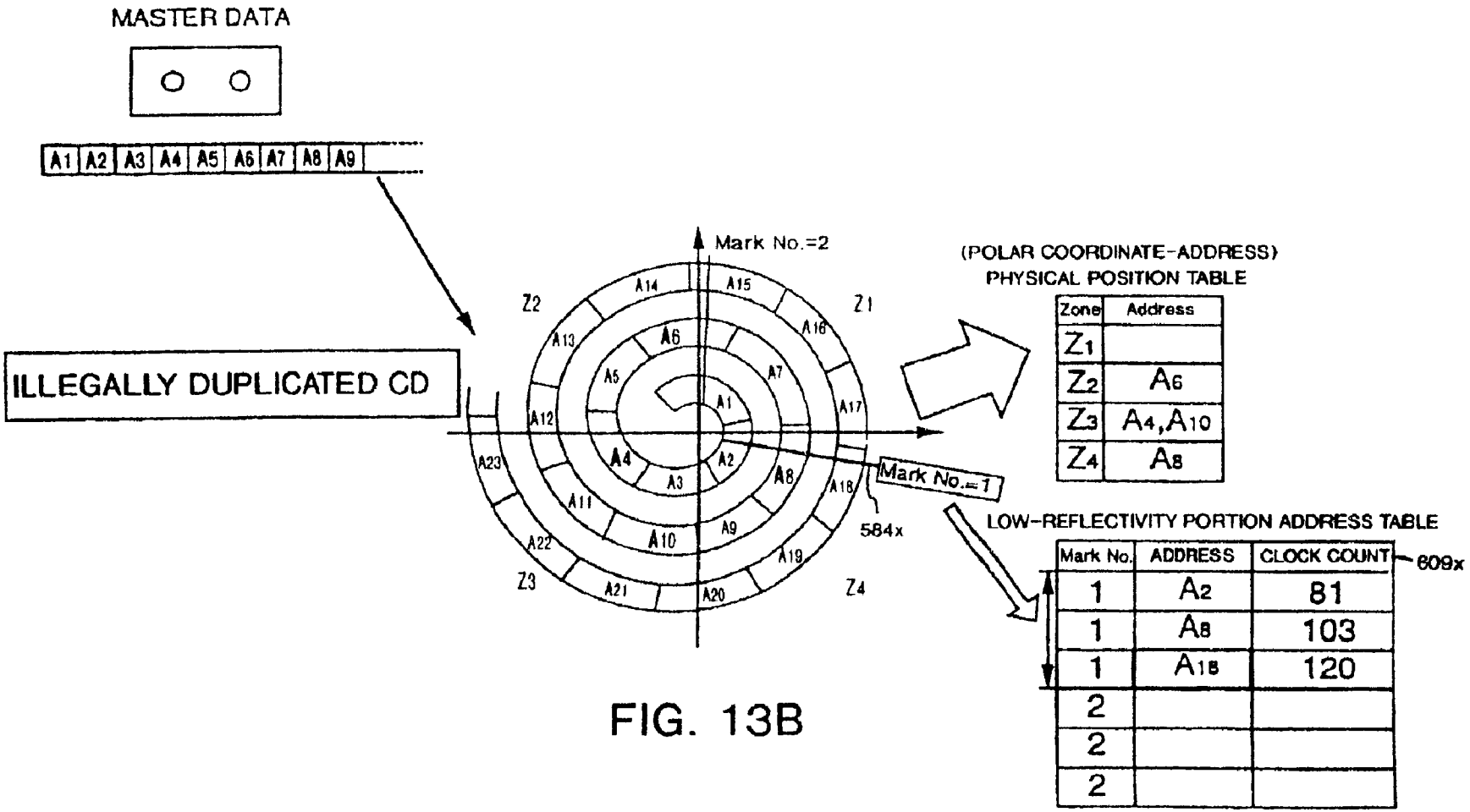
Figure 14:
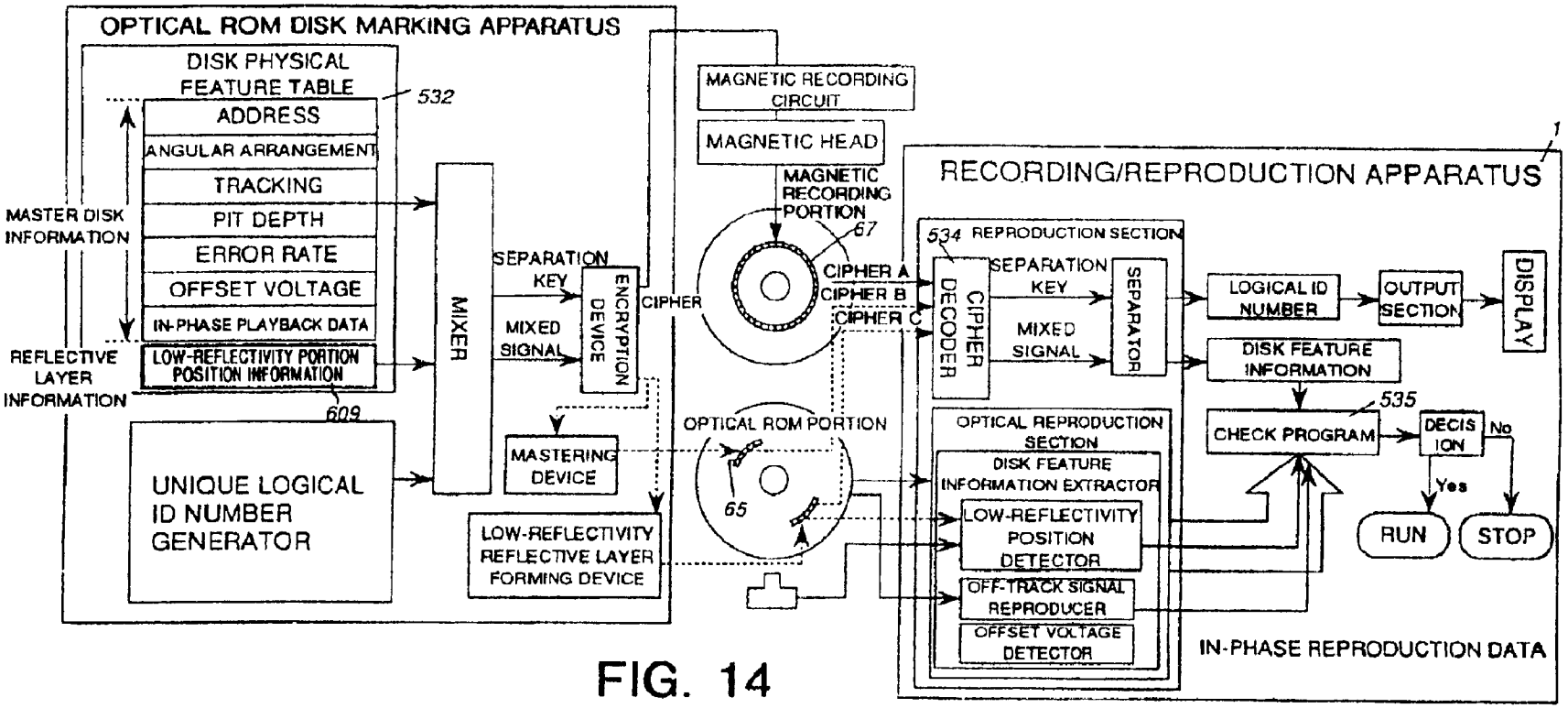
FIG. 14 is a block diagram for disk manufacturing according to the embodiment.
Figure 18:
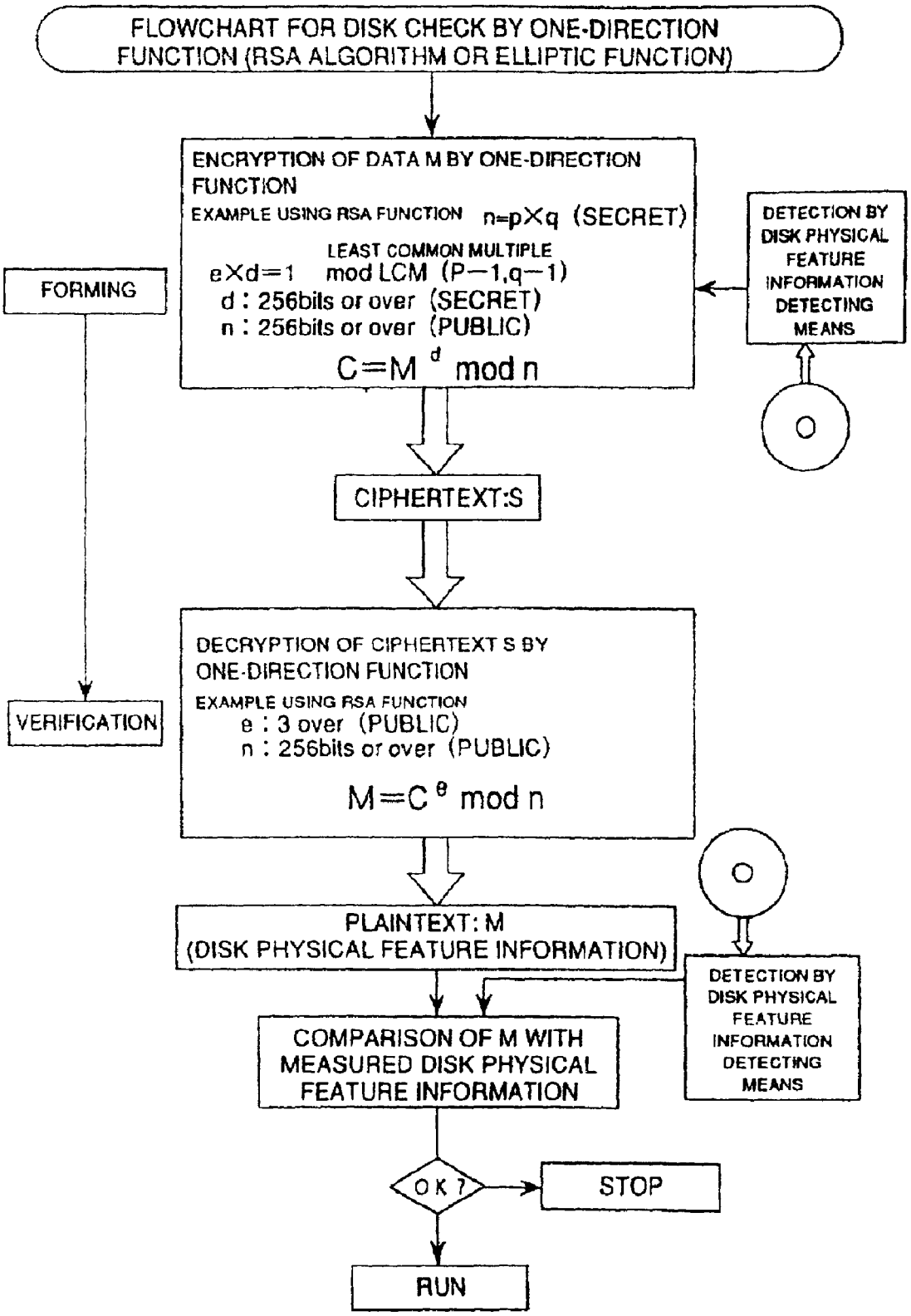
FIG. 18 is a flowchart illustrating a disk check procedure using a one-direction function according to the embodiment.

(a) Laser markings are formed at random in the anti-piracy mark formation process at the factory. No laser markings formed in this manner can be identical in physical feature. In the next process step, the low reflectivity portion 584 formed on each disk is measured with a resolution of 0.13 μm in the case of a DVD, to construct a low reflectivity portion address table 609 as shown in FIG. 13(a). Here, FIG. 13(a) is a diagram showing a low reflectivity portion address table, etc. for a legitimate CD manufactured in accordance with the present embodiment, and FIG. 13(b) is concerned with an illegally duplicated CD. The low reflectivity portion address table 609 is encrypted using a one-direction function such as the one shown in FIG. 18, and in the second reflective-layer forming step, a series of low reflectivity portions 584c to 584e, where the reflective layer is removed, is recorded in a barcode-like pattern on the innermost portion of the disk, as shown in FIG. 2. Alternatively, it may be recorded on a magnetic recording portion 67 of a CD-ROM, as shown in FIG. 14. FIG. 18 is a flowchart illustrating a disk check procedure by the one-way function used for the encryption, and FIG. 14 is a block diagram of a disk making apparatus and a special recording/reproduction apparatus. As shown in FIG. 13, the legitimate CD and the illegally duplicated CD have the low reflectivity portion address tables 609 and 609x, respectively, which are substantially different from each other. One factor resulting in this difference is that laser markings identical in physical feature cannot be made, as earlier noted. Another factor is that the sector address preassigned to the disk is different if the master disk is different.

Referring now to FIG. 13, we will describe how the marking position information differs between the legitimate disk and pirated disk. The figure shows an example in which the above two factors are combined. In the example shown, two markings are formed on one disk. In the case of the legitimate CD, the first marking of mark number 1 is located at the 262nd clock position from the start point of the sector of logical address A1, as shown in the address table 609. In the case of a DVD, one clock is equivalent to 0.13 μm, and the measurement is made with this accuracy. On the other hand, in the case of the pirated CD, the first marking is located at the 81st clock position in the sector of address A2, as shown in the address table 609x. By detecting this difference of the first marking position between the legitimate disk and pirated disk, the pirated disk can be distinguished. Likewise, the position of the second marking is also different. To make the position information match that of the legitimate disk, the reflective film at the 262nd position in the sector of address A1 must be formed with an accuracy of one clock unit, i.e., 0.13 μm; otherwise, the pirated disk cannot be run.

Figure 9C:
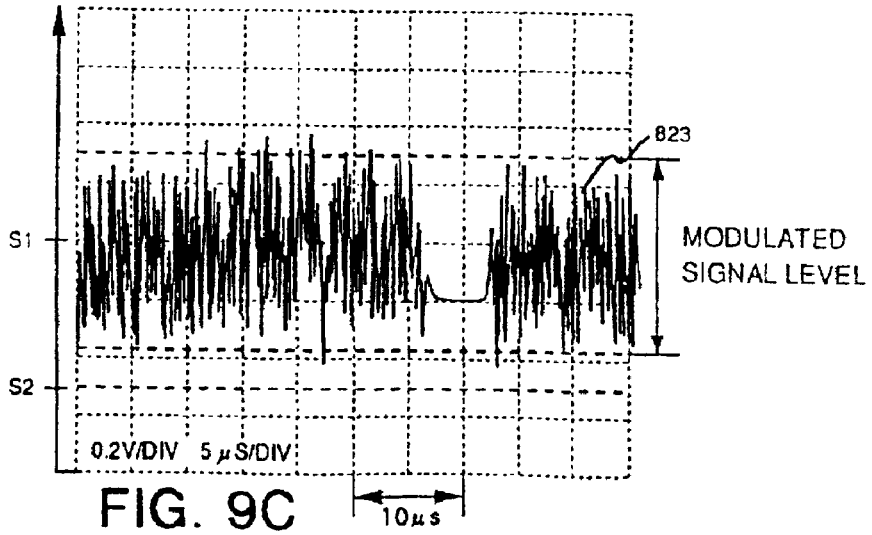
Figure 27:
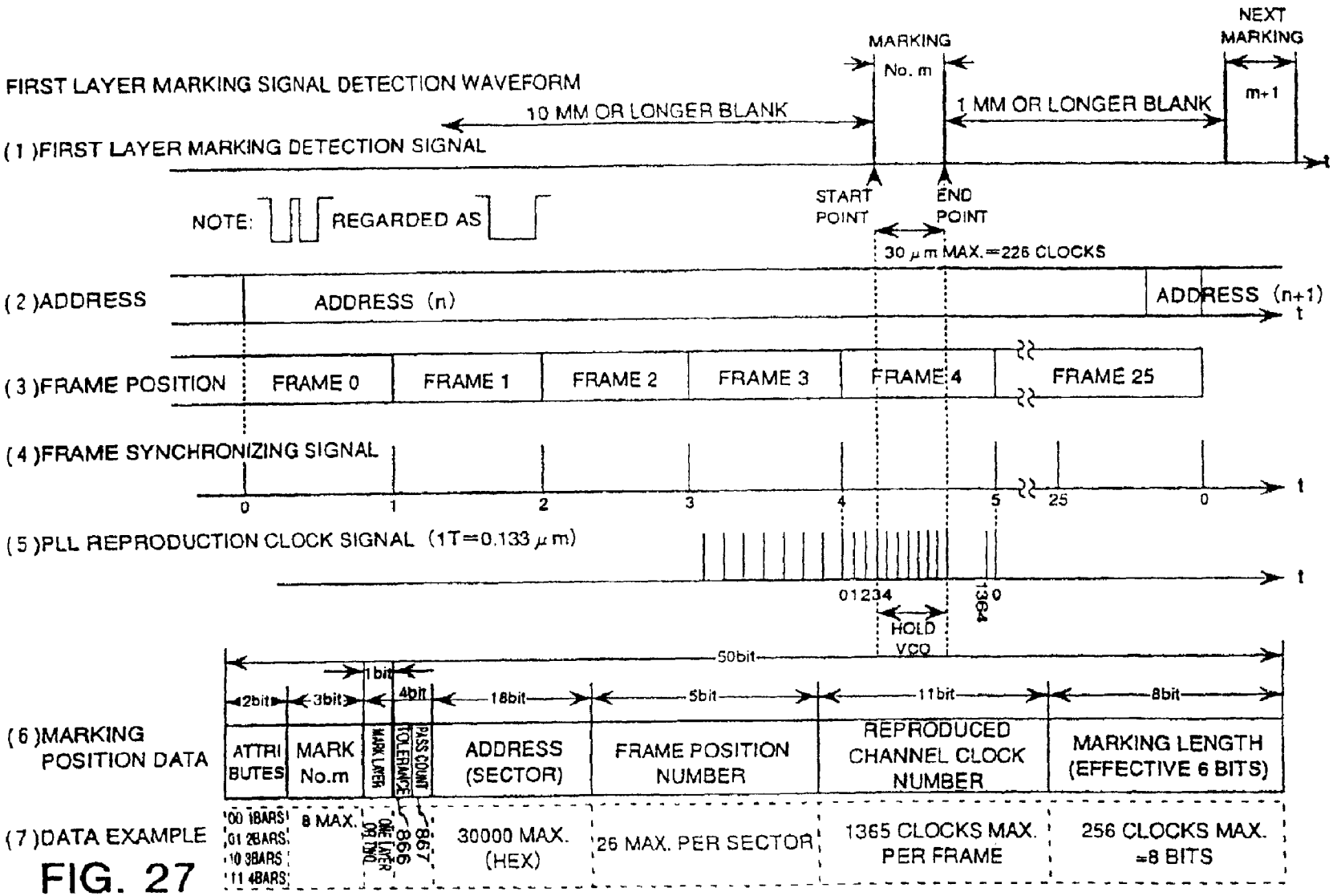
FIG. 27 is a diagram showing a detected waveform of a first-layer marking signal according to the present embodiment.

Accordingly, as shown in FIG. 14, in the reproduction apparatus, the encrypted table is decrypted to reconstruct the legitimate table which is then checked by a check program 535 to differentiate between the legitimate disk and illegally duplicate disk, and to stop the reproduction operation in the case of a duplicated disk. In the example of FIG. 16, the legitimate disk and illegally duplicated disk have low reflectivity portion address tables 609 and 609x respectively, where values are different as shown in FIG. 17. In the case of the legitimate disk, in the track following the mark 1 the start and end positions are m+14 and m+267, respectively, as shown in FIG. 16(8), whereas in the case of the illegally duplicated disk these are m+24 and m+277, respectively, as shown in FIG. 16(9). Therefore, the corresponding values in the low reflectivity portion address tables 609 and 609x are different, as shown in FIG. 17, thus making it possible to distinguish the duplicated disk. If an illegal manufacturer desires to make a copy of the disk having the low reflectivity portion address table 609, they will have to perform a precise laser trimming operation with the resolution of the reproduced clock signal as shown in FIG. 16(8). In the case of a DVD disk, the period T of the reproduced clock pulse, when converted to a distance on the disk, is 0.13 μm as shown in FIG. 27(5). Accordingly, to make an illegal copy, the reflective film will have to be removed with a submicron resolution of 0.1 μm. It is true that when an optical head designed for an optical disk is used, a recording can be made on a recording film such as a CD-R with a submicron resolution. But in this case, the reproduced waveform will be as shown in FIG. 9(c), and the distinct waveform 824 as shown in FIG. 9(a) cannot be obtained unless the reflective film is removed.

(b) A first method of achieving mass production of pirated disks by removing the reflective film may be by laser trimming using a high output laser such as a YAG laser. At the present state of technology, even the most highly accurate machining laser trimming can only achieve a processing accuracy of a few microns. In the laser trimming for semiconductor mask corrections, it is said that 1 μm is the limit of the processing accuracy. This means that it is difficult to achieve a processing accuracy of 0.1 μm at the mass production level.

(c) As a second method, X-ray exposure equipment for processing semiconductor masks for VLSIs and ion beam processing equipment are known at the present time as equipment that can achieve a processing accuracy of the order of submicrons, but such equipment is very expensive and furthermore, it takes much time to process one piece of disk, and if each disk were processed using such equipment, the cost per disk would be very high. At the present time, therefore, the cost would become higher than the retail price of most legitimate disks, so that making pirated disks would not pay and meaningless.

Figure 33:
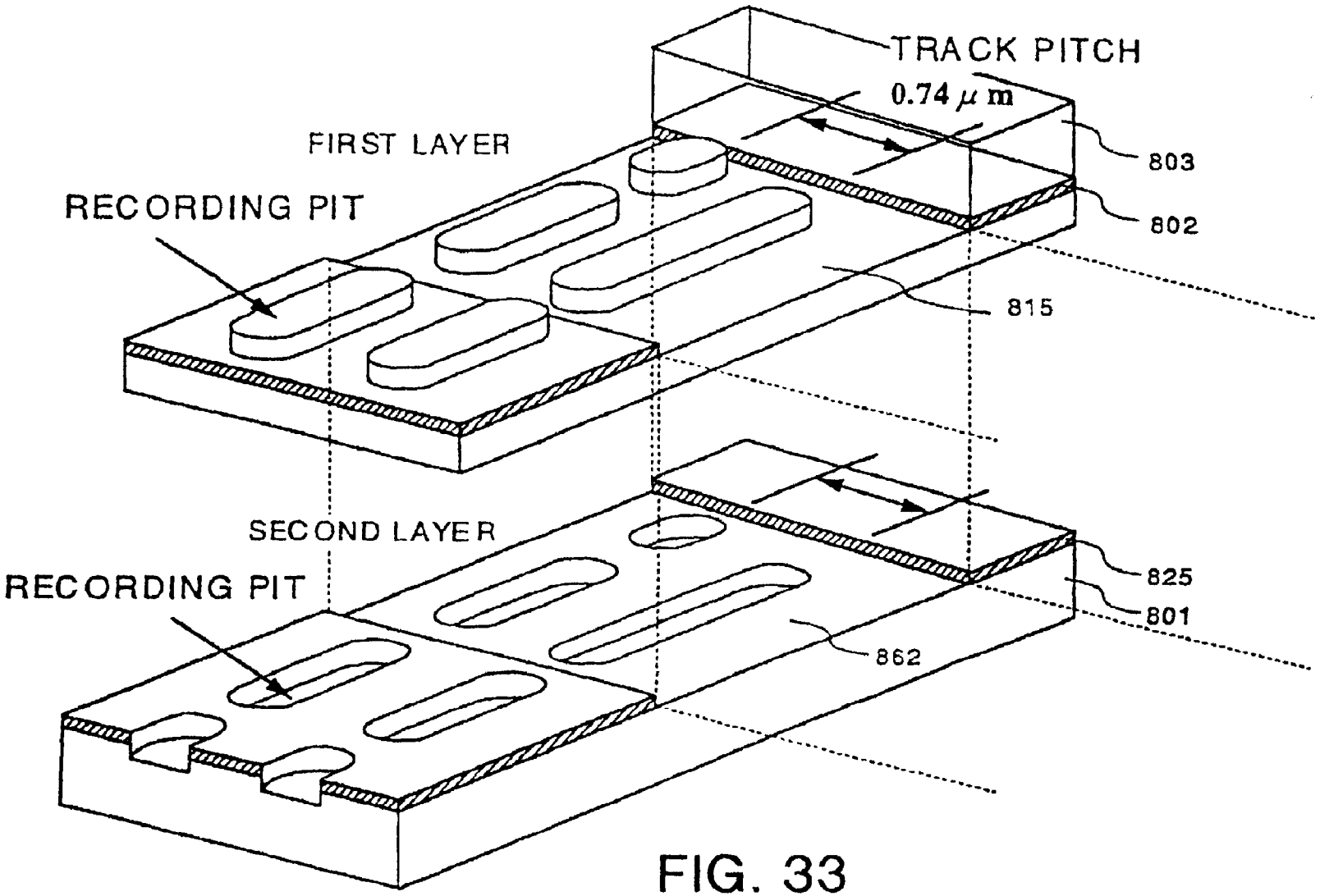
FIG. 33 is a perspective view showing the nonreflective portion formed in the two-layer disk according to the present embodiment.

(d) As described above, with the first method that involves laser trimming, it is difficult to process with a submicron accuracy, and therefore, it is difficult to mass produce pirated disks. On the other hand, with the second method using the submicron processing technology such as X-ray exposure, the cost per disk is so high that making pirated disks is meaningless from an economic point of view. Accordingly, making illegal copies can be prevented until some day in the future when low-cost submicron processing technology for mass production becomes practical. Since practical implementation of such technology will be many years into the future, production of pirated disks can be prevented. In the case of a two-layer disk with a low reflectivity portion formed on each layer as shown in FIG. 33, an illegally duplicated disk cannot be manufactured unless the pits on top and bottom are aligned with good accuracy when laminating, and this enhances the effectiveness in preventing piracy.

(B) Next, we will describe how the arrangement angle of the low reflectivity portion on the disk can be specified.

In the present invention, sufficient effectiveness in piracy prevention is provided by the reflective layer level mechanism, that is, by the low reflective marking alone. In this case, the prevention is effective even if the master disk is a duplicate. However, the effectiveness can be enhanced by combining it with the piracy prevention technique at the master disk level. If the arrangement angle of the low reflectivity portion on the disk is specified as shown in Table 532a and Table 609 in FIG. 13(a), an illegal manufacturer would have to accurately duplicate even the arrangement angle of each pit on the master disk. This would increase the cost of pirated disks and hence enhance the capability to deter piracy.

(C) The points of the present invention will be summarized below. In the present invention, a legitimate manufacturer can make a legitimate disk by processing the disk using a general-purpose laser trimming apparatus having a processing accuracy of several tens of microns. Though a measuring accuracy of 0.13 μm is required, this can be achieved by conventional circuitry contained in a consumer DVD player. By encrypting the measured result with a secret encryption key, a legitimate disk can be manufactured. That is, the legitimate manufacturer need only have a secret key and a measuring apparatus with a measuring accuracy of 0.13 μm, while the required processing accuracy is two or three orders of magnitude lower, that is, several tens of microns. This means that a convectional laser processing apparatus can be used. On the other hand, an illegal manufacturer, who does not have a secret key, will have to directly copy the encrypted information recorded on the legitimate disk. This means that a physical mark corresponding to the encrypted position information, that is, the position information on the legitimate disk, must be formed with a processing accuracy of 0.13 μm. That is, the low reflective mark has to be formed using a processing apparatus having a processing accuracy two orders of magnitude higher than that of the processing apparatus used by the legitimate manufacturer. Volume production with an accuracy higher by two orders of magnitude, i.e., with an accuracy of 0.1 μm, is difficult both technically and economically, even in the foreseeable future. This means that production of pirated disks can be prevented during the life of the DVD standard. One point of the invention is to exploit the fact that the measuring accuracy is generally a few orders of magnitude higher than the processing accuracy.

Figure 19:
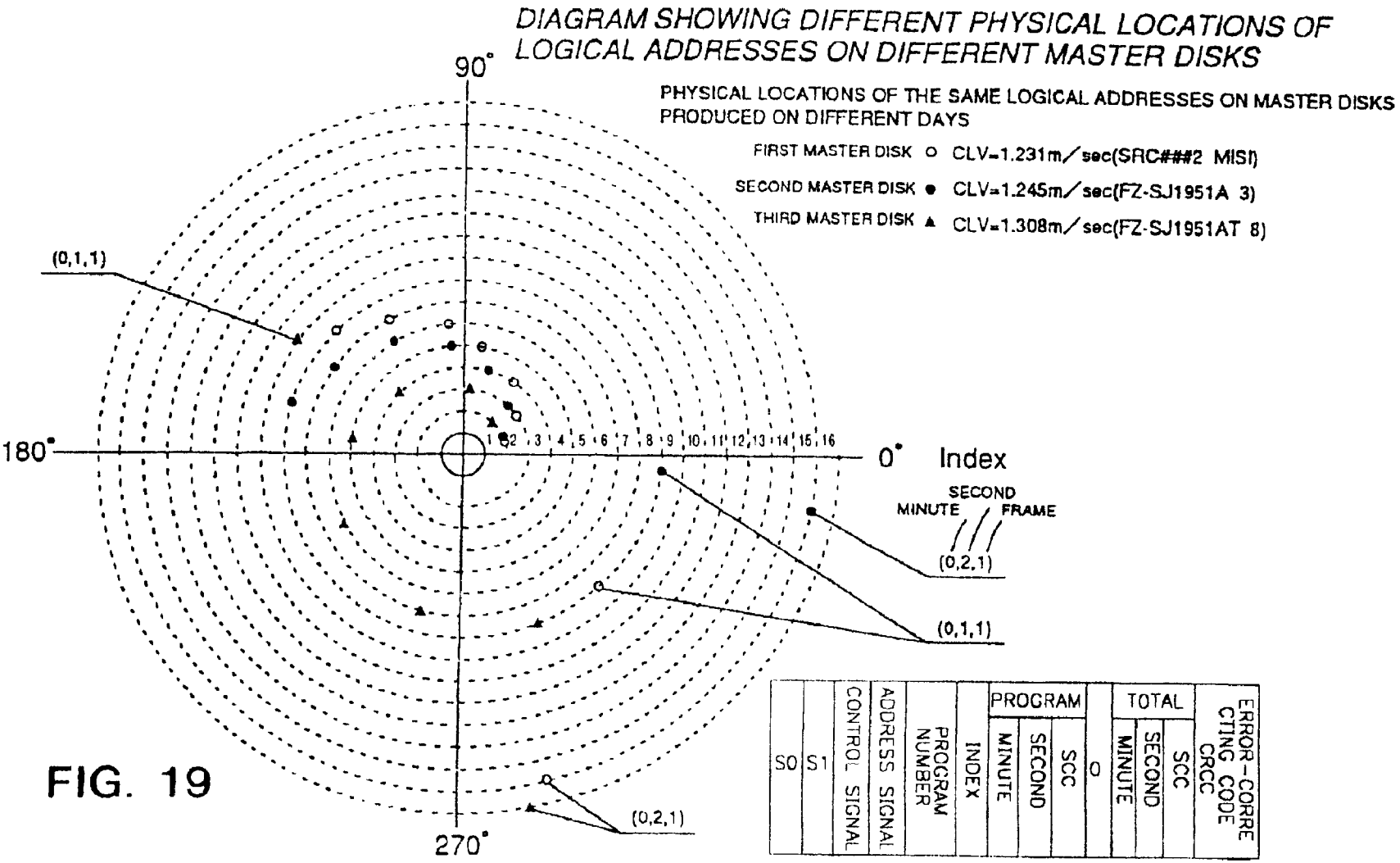
FIG. 19 is a diagram showing a comparison of address coordinate positions on different master disks according to the embodiment.

In the case of CLV, the above method exploits the fact that the address coordinate arrangement differs from one master disk to another, as previously noted. FIG. 19 shows the result of the measurement of address locations on actual CDs. Generally, there are two types of master disk, one recorded by rotating a motor at a constant rotational speed, i.e., with a constant angular velocity (CAV), and the other recorded by rotating a disk with a constant linear velocity (CLV). In the case of a CAV disk, since a logical address is located on a predetermined angular position on the disk, the logical address and its physical angular position on the disk are exactly the same no matter how many master disks are made. On the other hand, in the case of a CLV disk, since only the linear velocity is controlled, the angular position of the logical address on the master disk is random. As can be seen from the result of the measurement of logical address locations on actual CDs in FIG. 19, the tracking pitch, start point, and linear velocity vary slightly from disk to disk even if exactly the same data is recorded using the same mastering apparatus, and these errors accumulate, resulting in different physical locations. In FIG. 19, the locations of each logical address on a first master disk are indicated by white circles, and the locations on second and third master disks are indicated by black circles and triangles, respectively. As can be seen, the physical locations of the logical addresses vary each time the master disk is made. FIG. 17 shows the low reflectivity portion address tables for a legitimate disk and an illegally duplicated disk for comparison.

The method of piracy prevention at the master disk level has been described above. That is, when master disks of CLV recording, such as a CD or DVD, are made from the same logic data by using a mastering apparatus, as shown in FIG. 19, the physical location of each pit on the disk varies between master disks, that is, between the legitimate disk and pirated disk. This method distinguishes a pirated disk from a legitimate disk by taking advantage of this characteristic. The piracy prevention technology at the master disk level can prevent pirated disks at the logic level made by simply copying data only from the legitimate disk. However, recent years have seen the emergence of pirate manufacturers equipped with more advanced technologies, who can make a master disk replica identical in physical feature to a legitimate disk by melting the polycarbonate substrate of the legitimate disk. In this case, the piracy prevention method at the mast disk level is defeated. To prevent this new threat of pirated disk production, the present invention has devised the piracy prevention method at the reflective layer level wherein a marking is formed on a reflective film.

According to the method of the present invention, the marking is formed on each disk pressed from a master disk, even if disks are pressed from the master disk, by removing a portion of the reflective film in the reflective film formation process. As a result, the position and shape of the resulting low reflective marking is different from one disk to another. In a usual process, it is next to impossible to partially remove the reflective film with an accuracy of submicrons. This serves to enhance the effectiveness in preventing duplication since duplicating the disk of the invention does not justify the cost.

Figure 20:
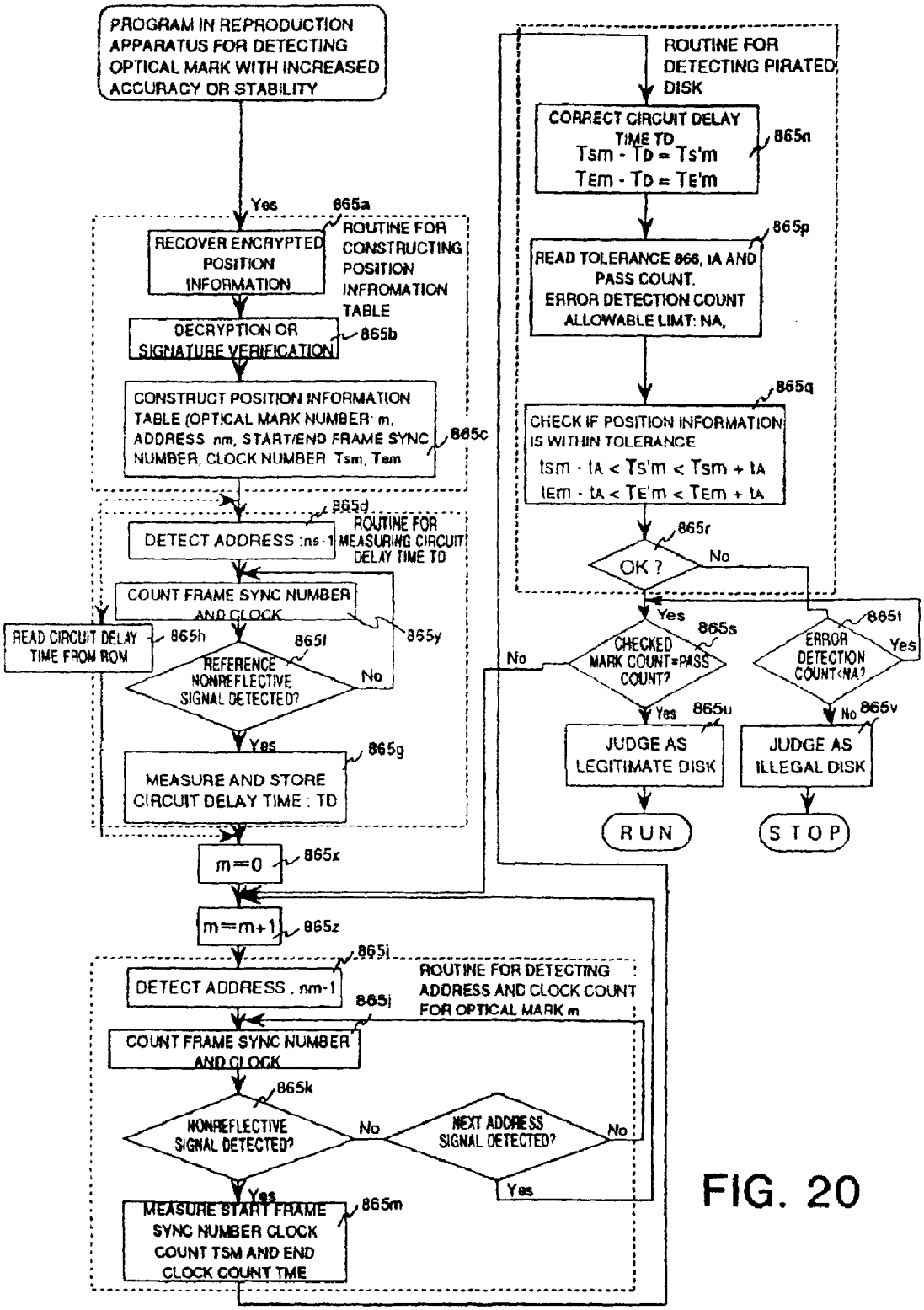
FIG. 20 is a flowchart illustrating a low-reflectivity position detecting program according to the embodiment.

FIG. 20 shows a flowchart for detecting a duplicated CD by using the low reflectivity portion address table. The delay time needed to detect the optical mark varies only slightly due to the optical head and circuit designs of the reproduction apparatus used. This of the delay time TD circuit can be predicted at the design stage or at the time of mass production. The optical mark position information is>obtained by measuring the number of clocks, that is, the time, from the frame synchronizing signal. Due to the effect of the circuit delay time, an error may be caused to detected data of the optical mark position information. As a result, a legitimate disk may be erroneously judged as being a pirated disk, inconveniencing a legitimate user. A measure to reduce the effect of the circuit delay time TD will be described below. Further, a scratch made on a disk after purchase may cause an interruption in the reproduced clock signal, causing an error of a few clocks in the measurement of the optical mark position information. To address this problem, a tolerance 866 and a pass count 867, shown in FIG. 27, are recorded on a disk, and while allowing a certain degree of tolerance on the measured value according to the actual situation at the time of reproduction, the reproduction operation is permitted when the pass count 867 is reached; the margin allowed for an error due to a surface scratch on the disk can be controlled by the copyright owner prior to the shipment of the disk. This will be described with reference to FIG. 20.

In FIG. 20, the disk is reproduced in step 865a to recover the encrypted position information from the barcode recording portion or pit recording portion of the present invention. In step 865b, decryption or signature verification is performed, and in step 865c, a list of optical mark position information is recovered. Next, if the delay time TD of a reproduction circuit is stored in the circuit delay time storing section 608a in the reproduction apparatus of FIG. 15. TD is read out in step 865h and the process proceeds to step 865x. If TD is not stored in the reproduction apparatus, or if a measurement instruction is recorded on the disk, the process proceeds to step 865d to enter a reference delay time measurement routine. When address Ns-1 is detected, the start position of the next address Ns is found. The frame synchronizing signal and the reproduced clock are counted, and in step 865f, the reference optical mark is detected. In step 865g, the circuit delay time TD is measured and stored. This operation is the same as the operation to be described later with reference to FIG. 16(7). In step 865x, the optical mark located inside address Nm is measured. In steps 865i, 865j, 865k, and 865m, the optical mark position information is detected with a resolution of one clock unit, as in steps 865d, 865y, 865f, and 865y. Next, in step 865n, a pirated disk detection routine is entered. First, the circuit delay time TD is corrected. In step 865p, the tolerance 866, i.e., tA, and pass count 867 recorded on the disk, as shown in FIG. 27, are read to check whether or not the position information measured in step 865g falls within the tolerance tA. If the result is OK in step 865r, then in step 865s it is checked whether the checked mark count has reached the pass count. If the result is OK, then in step 865u the disk is judged as being a legitimate disk and reproduction is permitted. If the pass count is not reached yet, the process returns to step 865z. If the result is NO in step 865r, then it is checked in step 865f whether the error detection count is smaller than NA, and only when the result is OK, the process returns to step 865s. If it is not OK, then in step 865v the disk is judged as being an illegal disk and the operation is stopped.

As described, since the circuit delay time TD of the reproduction apparatus is stored in the IC ROM, optical mark position information can be obtained with increased accuracy. Furthermore, by setting the tolerance 866 and pass count for the software on each disk, the criteria for pirated disk detection can be changed according to the actual condition to allow for a scratch made on the disk after purchase. This has the effect of reducing the probability of a legitimate disk being erroneously judged as an illegal disk.

(D) A further description will be given of the operation of reading the nonreflective optical marking portion of the two-disk laminated optical disk, focusing on points that were not touched on in the foregoing description of the operation principle.

Figure 28:
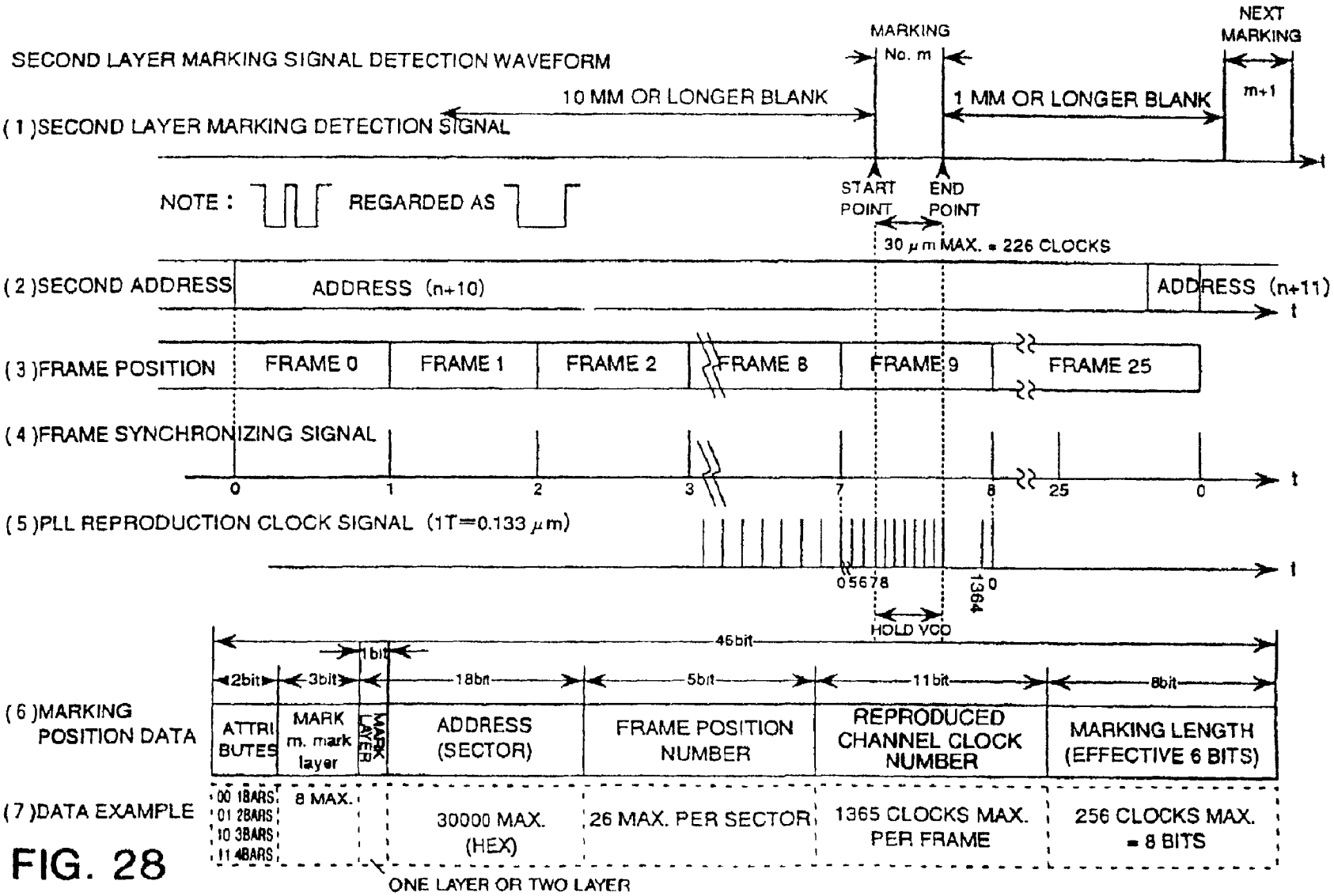
FIG. 28 is a diagram showing a detected waveform of a second-layer marking signal according to the present embodiment.

That is, as shown in FIG. 16, the start position address number, frame number, and clock number can be measured accurately with a resolution of 1 T unit, that is, with a resolution of 0.13 μm in the case of the DVD standard, by using a conventional player, thereby to accurately measure the optical mark of the present invention. FIGS. 27 and 28 show the optical mark address reading method of FIG. 16 as applied to the DVD standard. Explanation of signals (1), (2), (3), (4), and (5) in FIGS. 27 and 28 will not be given here since the operating principle is the same as that shown in FIG. 16.

The correspondence between FIG. 16, which illustrates the principle of the detection operation for detecting the position of a low reflectivity portion on a CD, and FIGS. 27 and 28, which are concerned with a DVD, is given below.

FIG. 16(5) corresponds to FIGS. 27(1) and 28(1). The reproduced clock signal in FIG. 16(6) corresponds to that shown in FIGS. 27(5) and 28(5). Address 603 in FIG. 16(7) corresponds to that shown in FIGS. 27(2) and 28(2).

Frame synch 604 in FIG. 16(7) corresponds to that shown in FIGS. 27(4) and 28(4). Starting clock number 605a in FIG. 16(8) corresponds to reproduced channel clock number in FIG. 27(6). Instead of the end clock number 606 in FIG. 16(7), in FIGS. 27(7) and 28(7) data is compressed using a 6-bit marking length.

As illustrated, the detection operation is fundamentally the same between CD and DVD. A first difference is that a 1-bit mark layer identifier 603a as shown in FIG. 27(7) is included for identifying whether the low reflectivity portion is of the one-layer type or two-layer type. The two-layer DVD structure provides a greater anti-piracy effect, as previously described. A second difference is that since the line recording density is nearly two times as high, 1 T of the reproduced clock is as short as 0.13 μm, which increases the resolution for the detection of the position information and thus provides a greater anti-piracy effect.

Shown in FIG. 27 is the signal from the first layer in a two-layer optical disk having two reflective layers. The signal (1) shows the condition when the start position of an optical mark on the first layer is detected. FIG. 28 shows the condition of the signal from the second layer.

To read the second layer, a first/second layer switching section 827 in FIG. 15 sends a switching signal to a focus control section 828 which then controls a focus driving section 829 to switch the focus from the first layer to the second layer. From FIG. 27, it is found that the mark is in address (n), and by counting the frame synchronizing signal (4) using a counter, it is found that the mark is in frame 4. From signal (5), the PLL reproduced clock number is found, and the optical marking position data as shown by the signal (6) is obtained. Using this position data, the optical mark can be measured with a resolution of 0.13 μm on a conventional consumer DVD player.

(E) Additional matters relating to the two-disk laminated optical disk will be further described below.

FIG. 28 shows address position information pertaining to the optical marking formed on the second layer. Since laser light penetrates the first and second layers through the same hole, as shown in the process step (b)(sic) in FIG. 7, the nonreflective portion 815 formed on the first reflective layer 802 and the nonreflective portion 826 formed on the second reflective layer 825 are identical in shape. This is depicted in the perspective view of FIG. 33. In the present invention, after the transparent substrate 801 and the second substrate 803 are laminated together, laser light is applied penetrating through to the second layer to form an identical mark thereon. In this case, since coordinate arrangements of pits are different between the first and second layers, and since the positional relationship between the first and second layers is random when laminating them together, the pit positions where the mark is formed are different between the first and second layers, and entirely different position information is obtained from each layer. These two kinds of position information are encrypted to produce an anti-piracy disk. If it is attempted to duplicate this disk illegally, the optical marks on the two layers would have to be aligned with a resolution of about 0.13 μm. As previously described, at the present state of technology it is not possible to duplicate the disk by aligning the optical marks with the pits with an accuracy of 0.13 μm, that is, with an accuracy of the order of 0.1 μm, but there is a possibility that mass production technology may be commercially implemented in the future that enables large quantities of single-layer disks to be trimmed with a processing accuracy of 0.1 μm at low cost. Even in that case, since the top and bottom disks are trimmed simultaneously in the case of the two-layer laminated disk 800, the two disks must be laminated together with the pit locations and optical marks aligned with an accuracy of a few microns. However, it is next to impossible to laminate the disks with this accuracy because of the temperature coefficient, etc. of the polycarbonate substrate. When optical marks were formed by applying laser light penetrating through the two-layer disk 800, the resulting anti-piracy mark is extremely difficult to duplicate. This provides a greater anti-piracy effect The optical disk with an anti-piracy mechanism is thus completed. For piracy prevention applications, in cases where the disk process and laser cut process are inseparable as in the case of the single-plate type, the encryption process, which is an integral part of the laser cut process, and processing involving a secret encryption key have to be performed at the disk manufacturing factory. This means that in the case of the single-plate type the secret encryption key maintained in the software company have to be delivered to the disk manufacturing factory. This greatly reduces the security of encryption. On the other hand, according to the method involving laser processing of laminated disks, which constitutes one aspect of the invention, the laser trimming process can be completely separated from the disk manufacturing process. Therefore, laser trimming and encryption operations can be performed at a factory of the software maker. Since the secret encryption key that the software maker keeps need not be delivered to the disk manufacturing factory, the secret key for encryption can be kept in the safe custody of the software maker. This greatly increases the security of encryption.

(2) (A) Encryption (digital signature) of marking position information, etc. and decryption and reproduction of optical disk position information, etc., which have been briefly described in (1), will now be described in more detail. (B) Various mechanism for piracy prevention will also be described below.

(A) Encryption (digital signature) and its reproduction will be described.

(a) Simple encryption (digital signature)

(Implementation by RSA function)

Figure 24:
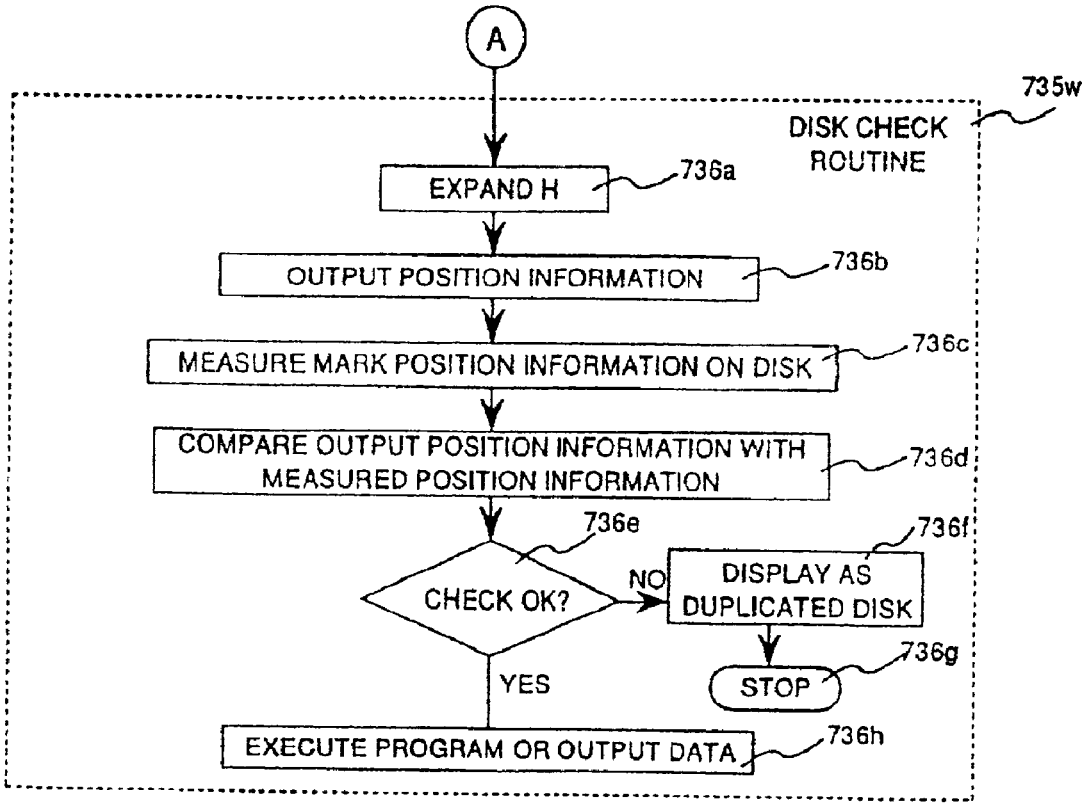
FIG. 24 is a flowchart illustrating a position information check process according to the embodiment.

First, an example of encryption in which encryption is performed using a function of a message recovery type signature method, such as an RSA function, will be described with reference to the flowcharts shown in FIGS. 22 and 24.

Figure 22:
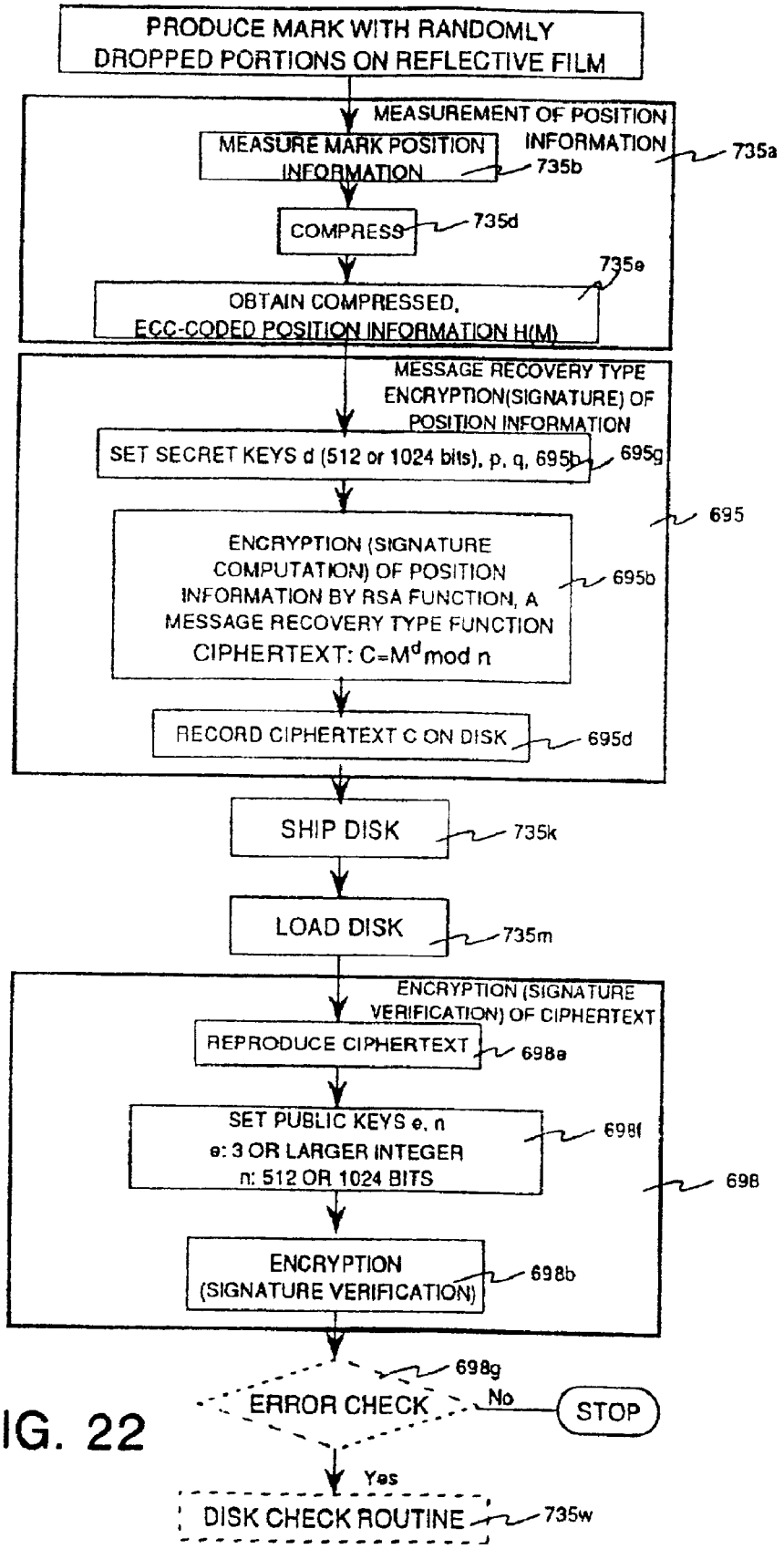
FIG. 22 is a flowchart illustrating a procedure for encryption, etc. using an RSA function according to the embodiment.

As shown in FIG. 22, the process consists of the following major routines: step 735a where marking position information is measured at the optical disk maker, step 695 where the position information is encrypted (or a digital signature is appended), step 698 where the position information is decrypted (or the signature is verified or authenticated) in the reproduction apparatus, and step 735w where a check is made to determine whether the disk is a legitimate optical disk or not.

First, in step 735a, the marking position information on the optical disk is measured in step 735b. The position information is then compressed in step 735d, and the compressed position information H is obtained in step 735e.

In step 695, the ciphertext of the compressed position information H is constructed. First, in step 695, a secret key, d, of 512 or 1024 bits, and secret keys, p and q, of 256 or 512 bits, are set, and in step 695b, encryption is performed using an RSA function. When the position information H is denoted by M, M is raised to d-th power and mod n is calculated by yield ciphertext C. In step 695d, the ciphertext C is recorded on the optical disk. The optical disk is thus completed and is shipped (step 735k).

In the reproduction apparatus, the optical disk is loaded in step 735m, and the ciphertext C is decrypted in step 698. More specifically, the ciphertext C is recovered in step 698e, and public keys, e and n, are set in step 698f; then in step b, to decrypt the ciphertext C, the ciphertext C is raised to e-th power and the mod n of the result is calculated to obtain plaintext M. The plaintext M is the compressed position information H. An error check may be performed in step 698g. If no errors, it is decided that no alterations have been made to the position information, and the process proceeds to the disk check routine 735w shown in FIG. 24. If an error is detected, it is decided that the data is not legitimate one, and the operation is stopped.

In the next step 736a, the compressed position information H is expanded to recover the original position information. In step 736c, measurements are made to check whether the marking is actually located in the position on the optical disk indicated by the position information. :In step 736d, it is checked whether the difference between the decrypted position information and the actually measured position information falls within a tolerance. If the check is OK in step 736e, the process proceeds to step 736h to output software or data or execute programs stored on the optical disk. If the check result is outside the tolerance, that is, if the two pieces of position information do not agree, a display is produced to the effect that the optical disk is an illegally duplicated one, and the operation is stopped in step 736g. RSA has the effect of reducing required capacity since only the ciphertext need be recorded.

(Implementation by elliptic function)

Next, another type of signature system, that is, an imprint type signature system using an elliptic function for encryption, will be described with reference to the flowcharts shown in FIGS. 23 and 24.

Figure 23:
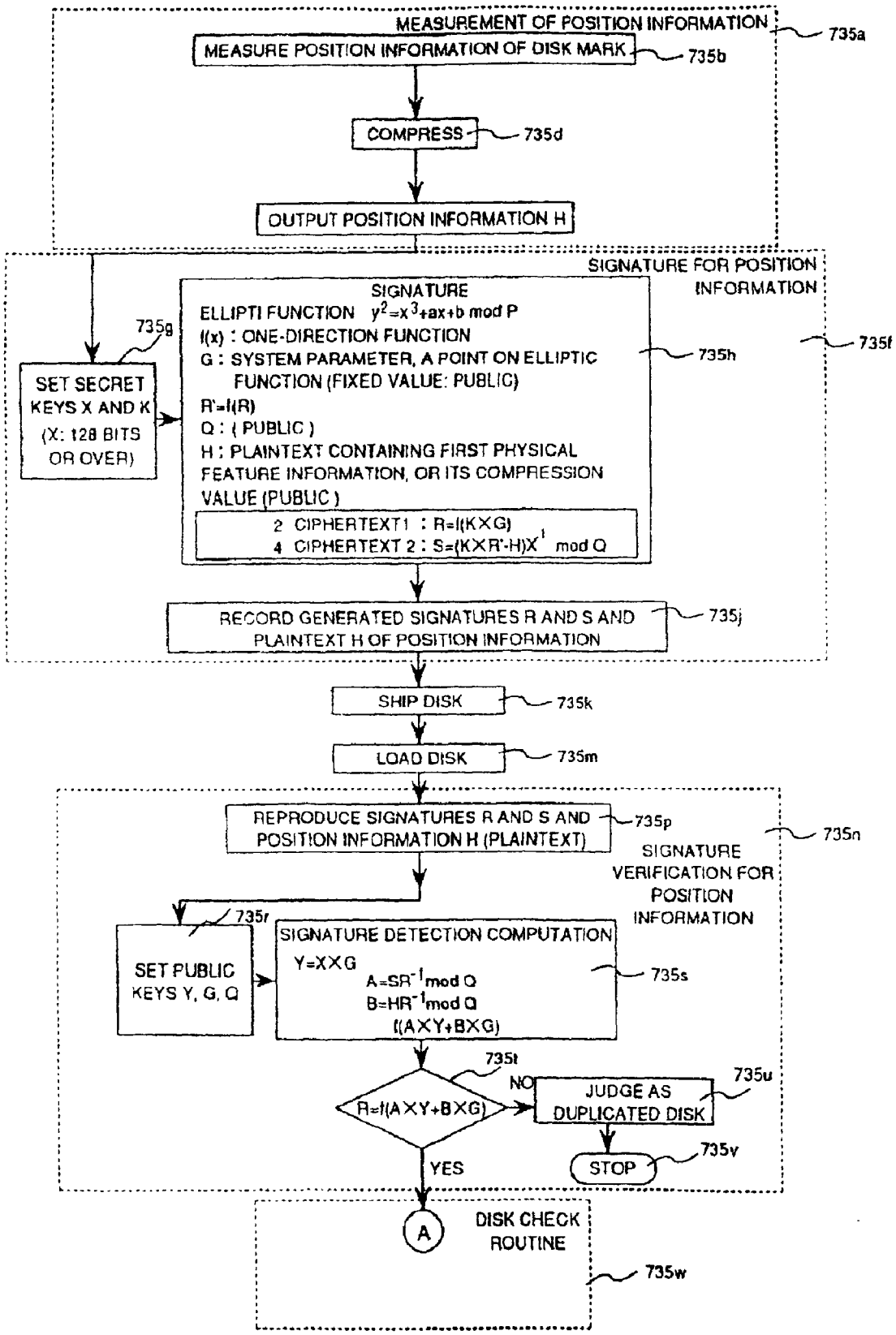
FIG. 23 is a flowchart illustrating a procedure for digital signature, etc. using an elliptic function according to the embodiment.

As shown in FIG. 23, etc., the process consists of the following major routines: step 735a where marking position information is measured at the optical disk maker, step 735f where authentication ciphertext (i.e., signature) for the position information is computed, step 735n where position information authentication (signature verification) is performed in the reproduction apparatus, and step 735w where a check is made to determine whether the disk is a legitimate optical disk or not.

The process from step 735a to step 735e is the same as that for the RSA function.

In step 735f, authentication ciphertext for the compressed position information H is constructed. First, in step 735g, secret keys X (128 bits or over) and K are set, and in step 735h, a public system parameter G, a point on an ellipse, is determined, and with f(x) as a one-direction function, R=f(K×G) is obtained first, and then R'=f(R) is obtained; then from equation $S=(K\times R'-H)X^{-1}$ mod Q, R and S as authentication ciphertext are generated. In step 735j, the authentication ciphertext R and S and the plaintext H of the compressed position information are recorded on the optical disk, and in step 735k, the completed disk is shipped.

In the reproduction apparatus, the optical disk is loaded in step 735m, and an authentication operation is performed in step 735n to authenticate the position information.

First, in step 735p, the authentication ciphertext R and S and the compressed position information H are recovered from the loaded optical disk. In step 735r, public keys Y, G, and Q are set, and in step 735s, an authentication operation is performed whereby f(A×Y+B×G) is obtained from $A=SR^{-1}$ mod Q and $B=HR^{-1}$ mod Q. In step 735t, it is checked if the above value matches R. If they match, it is decided that no alterations have been made to the position information, and the process proceeds to the optical disk check routine 735w in FIG. 24. If they do not match, it is decided that the data is not legitimate one, and the operation is stopped.

The subsequent process from step 736a to step 736g is the same as that for the RSA function. That is, if the optical disk is judged as being an illegally duplicated one, a display to that effect is produced, and in step 736g, the operation is stopped. Compared to the RSA function, the elliptic function has the advantage that the computation time is short, which serves to reduce the time before the reproduction starts. This system therefore is suitable for application to consumer reproduction apparatus.

(b) Complex encryption (digital signature) using master key, subkey, etc.

Not only the marking position information but information concerning the features of contents of the software stored on the optical disk and an anti-piracy identifier are subjected to encryption (digital signature). Furthermore, two kinds of encryption keys, master key and subkey, are used. A specific example is described below in which a secret key encryption function is used in combination with a public key encryption function.

Before proceeding to a detailed description of the specific example, a basic functional description of this system will be given first with reference to FIG. 40 to facilitate understanding of the basics thereof.

In the example treated in the following basic description, encryption is performed using a public key encryption function, and encryption using a secret key encryption function is not treated here. Therefore, the master secret key for public key encryption and the sub secret key for public key encryption are simply referred to as the master secret key and sub secret key, respectively. Likewise, the master public key for public key encryption and the sub public key for public key encryption are simply referred to as the master public key and sub public key, respectively.

Figure 40:
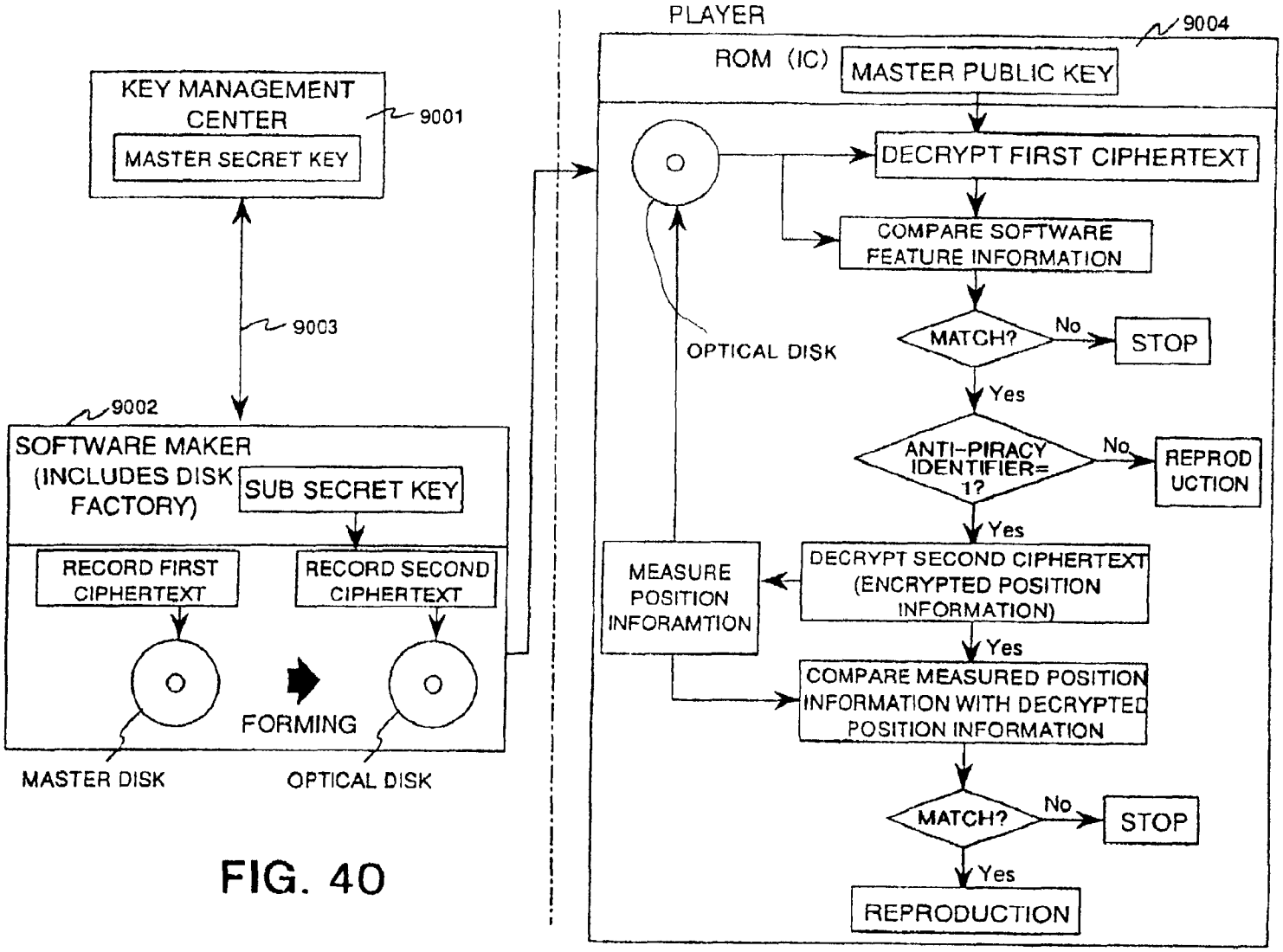
FIG. 40 is a block diagram showing an outline of a process of recording position information, etc., encrypted with a master key, subkey, etc., on an optical disk and a process of reproducing such information according to the present embodiment.

As shown in FIG. 40, a key management center 9001 securely manages the master secret key to maintain its secrecy, and is linked to a software maker 9002, to be described later, via a communication line 9003. When a request for encryption is made from the software maker 9002, the key management center 9001 receives data, to be encrypted, via a network 9003 and encrypts the data using the master secret key.

For simplicity of explanation, it is assumed here that the software maker 9002 also includes a disk manufacturing factory. Therefore, the software maker 9002 here is a department that performs the manufacturing process at the disk manufacturing factory illustrated in FIG. 1, in addition to the production of software. That is, when manufacturing optical disks of movie software, encryption for prevention of illegal duplications is also performed. To accomplish the encryption, the software maker 9002 obtains an exclusive sub secret key from the key management center 9001. The above has described the arrangement at the optical disk maker side.

On the other hand, there is a player 9004 at the user side where the optical disk is used. The player 9004 is an apparatus for reproducing an optical disk, and contains a ROM in which is prestored a master public key corresponding to the master secret key maintained at the key management center. A function to stop the reproduction of an illegally duplicated optical disk is also incorporated.

Having described the general arrangement, we will now describe the operation.

(b-1) First, the processing steps for encryption performed at the software maker 9002 will be described.

The encryption step first performed (the first encryption step) involves encryption at the stage of disk mold manufacturing, and the encrypted information is reflected in the shape of the disk mold. The encryption step performed finally (the second encryption step) concerns encryption performed at a stage after the formation of a marking by laser trimming.

(1-1) In the first encryption step, encryption is performed using a sub public key corresponding to the sub secret key to be used in the second encryption step, and using a software feature information and anti-piracy identifier. The information is transferred to the key management center 9001 via the communication line 9003. The software feature information refers to the information describing the contents of the movie software written on the optical disk, and it is unique to each movie software and is different from one software to another. The anti-piracy identifier is provided to make it possible to detect whether the manufactured optical disk is processed with piracy prevention. The identifier of an optical disk processed with piracy prevention using second ciphertext is "1"; otherwise, the identifier is "0". In this example, the identifier is "1", needless to say.

(1-2) The key management center 9001 encrypts the information transferred from the software maker 9002, by using the master secret key maintained at the center, and sends the encrypted information back to the software maker 9002. The thus created ciphertext is referred to as the first ciphertext.

(1-3) The software maker 9002 records the first ciphertext on the disk mold (or master) along with the movie software, etc.

(1-4) The software maker 9002 molds disks by using the thus completed mold.

(1-5) Next, the software maker 9002 fabricates optical disks from the molded disks, and performs the laser trimming, as previously described, to form a marking on each optical disk.

(1-6) Further, the software maker 9002 detects the position of the marking and encrypts the obtained position information by using the sub secret key maintained at the maker. The thus encrypted information is referred to as the second ciphertext. Since it is created by encrypting the position information, the second ciphertext is different from one optical disk to another even if they are pressed from the same mold. This is the difference from the first ciphertext.

(1-7) Finally, the software maker 9002 records the second ciphertext as a barcode on the optical disk. The optical disk is thus completed.

(b-2) Next, we will describe the operation when the user who purchased the thus completed optical disk plays it back on the player 9004.

(2-1) First, the player 9004 reads the first ciphertext recorded on the optical disk, and using the master public key stored in the ROM, decrypts the first ciphertext which contains in encrypted form the sub public key corresponding to the sub secret key, the software feature information, and the anti-piracy identifier.

(2-2) In the meantime, the player 9004 extracted the software feature information from the contents of the movie software recorded on the optical disk. The extracted software feature information is compared with the software feature information obtained by decryption in (2-1); if they do not agree, the optical disk is judged as being an illegally duplicated one, and the subsequent reproduction operation is stopped. If they agree, the process proceeds to the next step.

(2-3) It is checked whether the anti-piracy identifier obtained by decryption in (2-1) is "1" or "0". If it is "0", the reproduction operation is immediately started, skipping the process hereinafter described. If it is "1", the process further continues.

In this manner, if the optical disk happens to be a disk not processed with the piracy prevention using the second ciphertext, the disk can be reproduced on the player 9004 as long as its identifier is set to "0" in a legitimate way. If a pirate attempts to make an illegal copy by altering the identifier to "0", his effort will be thwarted because the identifier is encrypted using the master secret key after being combined with the software feature information, etc., as earlier described.

(2-4) First, the second ciphertext recorded on the optical disk is read out. Then, the second ciphertext, which is the encrypted version of the position information, is decrypted using the sub public key obtained by decryption in (2-1).

(2-5) Using the decrypted position information, it is checked whether the marking is actually formed in the position on the optical disk indicated by the position information. Then, the actually measured marking position information is compared with the position information decrypted in (2-4). If they do not agree, the optical disk is judged as being an illegally duplicated one, and the reproduction operation is stopped. If they agree, the optical disk is judged as being a legitimate one, and the reproduction operation is started.

An outline of the system has been described above. Now, a description will be given in more specific form.

Figure 32:
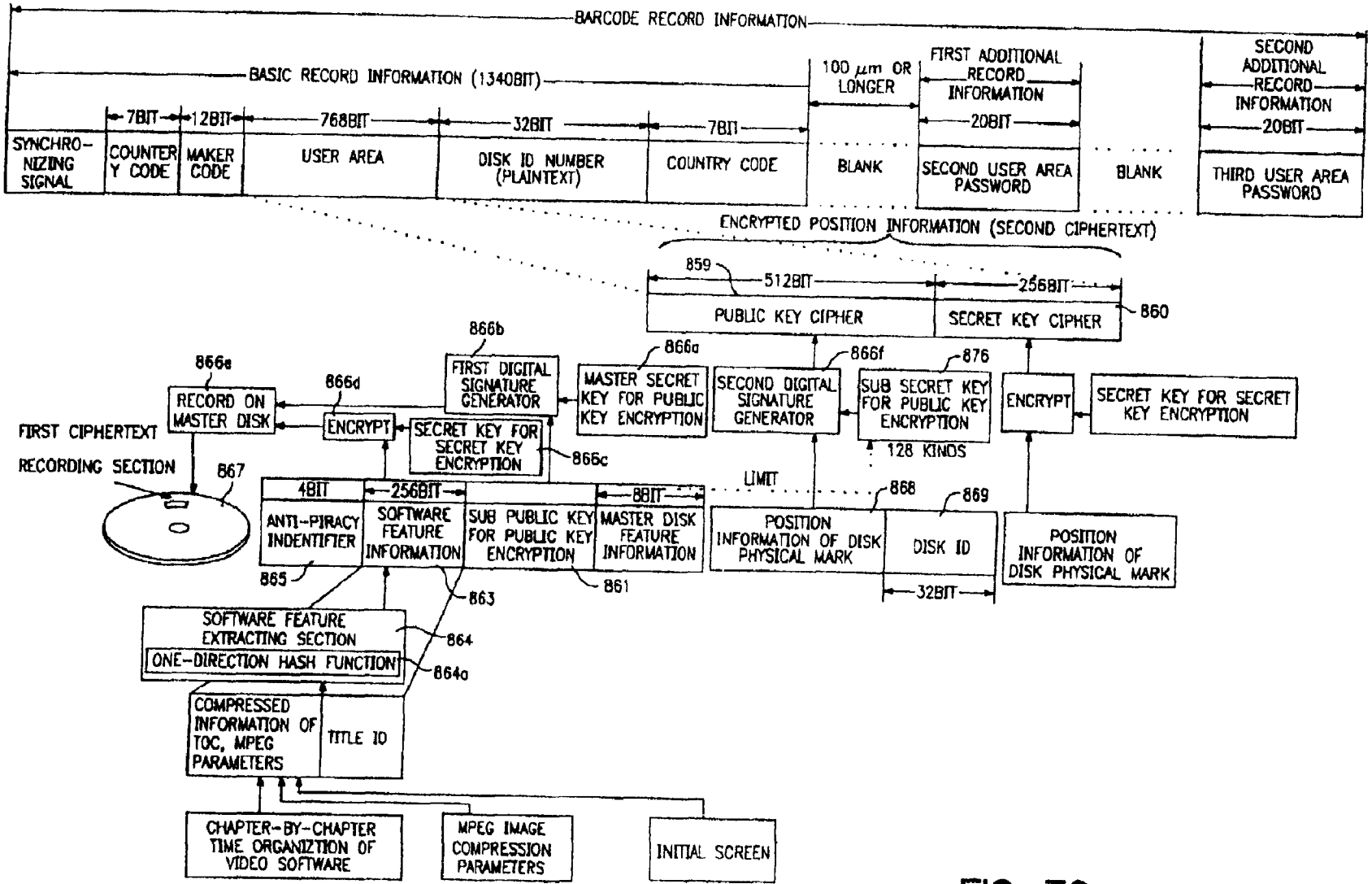
FIG. 32 is a diagram for explaining the contents of barcode recorded information and the relative relationship thereof according to the present embodiment.

As shown in FIG. 32, software feature extracting means 864 extracts the software parameters unique to the software, such as the TOC information showing the time organization of each chapter of the video software, image compression parameters, the title name, etc. from the contents of the software, and compresses the extracted information to 128 bits to 256 bits by the computation of a checksum, the computation of a Galois field, etc., and a one-direction hash function 864a such as SHA and MD5, to create software feature information 863. The software feature information 863 is then combined with a sub public key 861 special to the software maker and an anti-piracy identifier 865 as a copyright identifier, into one data block which is then encrypted in steps 866a and 866b using a master secret key for public key encryption and is recorded on a master disk 867 in step 866e, along with the software proper.

When a system is employed that uses secret key encryption in combination with public key encryption, a master secret key for secret key encryption is used in step 866c, encryption is performed in step 866d, and the data is recorded on the master disk 867 in step 866e.

The disk mastering process is thus completed. The anti-piracy identifier 865 recorded on the master disk defines how the copyright of the software should be protected, and consists of at least four bits of copyright protection flags, including a flag of one bit to indicate whether the software is equipped with an anti-piracy mechanism, a flag of one bit to indicate whether it contains a low reflectivity barcode portion, a flag of one bit as a scramble identifier 965a to indicate whether the software is scrambled or not, and a flag of one bit to indicate whether software dubbing is prevented or not. Since the anti-piracy identifier 865 and the sub public key 861 are combined with the software feature information 863 unique to the software and are encrypted together by using the master secret key for public key encryption, it is not possible to alter them.

The anti-piracy identifier 865 and the sub public key 861 are combined with the software feature information unique to the software, into one data block which is then encrypted by the secret key.

If the software feature information 863 consists of 256 bits, there are 2256 possible variations. This means that when software feature information is extracted from data obtained by authoring a particular movie software product, the probability that it coincides with software feature information of some other software is $1/2256$; therefore, the probability of such coincidence occurring is almost zero. When a one-direction hash function, such as MD5 or SHA, is used, if the hash value, i.e., the software feature information 963, consists of 256 bits, finding two software contents having the same hash value will require 1018 years of computing time using a currently available large computer. Consequently, it is nearly impossible to replace software. For the software feature information of a particular software product authored, only one value exists, and no other software can have the same value.

Since the software feature information is encrypted jointly with the anti-piracy identifier 865 and the sub public key 861, neither of these two values cannot be altered. Thus, after authoring, the anti-piracy identifier 865 and the sub public key 861 for a particular software product are uniquely identified.

The recording of the anti-piracy identifier 865 on the master disk will be described in further detail.

How the anti-piracy identifier 865 is actually appended to software is at the discretion of the copyright owner of the software. It takes cost and labor to apply an anti-piracy measure to optical disk software. Accordingly, not all optical disks are equipped with an anti-piracy mechanism; some optical disks incorporate an anti-piracy mechanism or the barcode of the present invention, while others do not. If legitimate disks having no anti-piracy mechanism or barcode are allowed to exist, reproduction apparatus are required to have a function that enables both types of disk to be reproduced properly. In that case, when reproducing a disk having no piracy protection, two possibilities must be considered: one is that the disk is a legitimate disk for which the software company has unlocked the piracy protection in a legitimate way, and the other is that the disk is a disk which the software company has produced with piracy protection but whose anti-piracy identifier has been illegally altered by a pirate.

Means for identifying whether the anti-piracy identifier is legitimate or not is therefore important.

In the present invention, the anti-piracy identifier 865, including the anti-piracy identifier, is encrypted together with the software feature information by using a secret key, and recorded in a ciphertext recording section on the master disk. The reproduction apparatus decrypts the ciphertext with a prescribed public key. This prevents illegal alterations from being made to either data.

The only way left to pirates is to replace the whole portion of the first ciphertext, which contains the software feature information 863 and the anti-piracy identifier 865, by different one.

To distinguish the software feature information 863 from the software feature information extracted from the movie software actually written on the optical disk, which will be described later, the former may sometimes be referred to as the first software feature information, and the latter as the second software feature information. Both kinds of information are the same in that they relate to the contents of the same movie software, but different in that the former is written in encrypted form at the time the optical disk is manufactured, while the latter is extracted by examining the contents of the actually recorded movie software at the time of reproduction.

Since the first software information 863 has a value unique to the software for which the authoring is completed, the probability of some other software yielding the same value is $1/2^{256}$, which is approximately zero, as earlier noted. If the first software information 863 is replaced, the information no longer agrees with the second software feature information 885 actually extracted from the disk in step 876e in the process of the check routine of FIG. 38 performed in steps 876a, 876c, 876e, and 876f. This prevents the disk with altered information from being played back. In this way, the anti-piracy identifier 865 of the software and the sub public key hereinafter described are protected against illegal alterations. An illegal manufacturer, who is thinking of making illegal disks by copying the software from a legitimate disk, may therefore consider making disks that do not have either the anti-piracy identifier or the barcode. In that case, the anti-piracy identifier in the anti-piracy identifier 865 would have to be changed from ON ("1") to OFF ("0") setting. To change the setting, however, it is necessary to have the key management center issue the first ciphertext encrypted with the master secret key shown at step 866a in FIG. 36, but normally, measures are in effect to prevent the key management center from issuing it to an unauthorized person, thus preventing illegal alteration of the anti-piracy identifier 865.

That is, the first software feature information 863 and the anti-piracy identifier 865 are encrypted together into the first ciphertext 886 for recording on the master disk. This has the effect of thwarting any attempt by a pirate to make illegal copies of piracy-protected software in the disk format of no piracy prevention without an anti-piracy mark or mechanism. With this method that constitutes one aspect of the invention, if a disk standard is worked out, allowing the existence of disks without piracy protection along with disks with piracy protection, and if the standard is replaced by a new-generation standard, reproduction apparatus of the new generation can achieve piracy prevention against all disks. This is a big practical advantage.

The necessity of the master secret key and sub secret key in secret key of a public key encryption and the construction and functions of these secret keys will be described in detail below.

In the piracy prevention method of the invention, the secret encryption key need not be delivered to the disk manufacturing factory since secondary recording can be done. However, it is not realistic to have an encryption center create ciphertext for each of the disks manufactured throughout the world and to receive the ciphertext via a network, because this would cause an enormous increase in communication traffic. On the other hand, distributing the secret key to each software maker and disk manufacturing factory is not possible from the viewpoint of security. A method that can overcome this problem is therefore needed.

As a method to overcome this problem, the present invention provides the master key/subkey system. According to the present invention, the key management center (key issuing center) keeps the master secret key which is not disclosed to the outside. On the other hand, the software company keeps the sub secret key with which the company maintains the security of its software on its own responsibility. As already described with reference to FIG. 32, the software feature information and the sub public key the software company keeps are jointly encrypted, using the master secret key, into the first ciphertext. The reproduction apparatus decrypts the first ciphertext by applying the master public key, and extract the sub public key from the decrypted text. This prevents illegal alterations from being made to the sub public key that becomes necessary to decrypt the second ciphertext, i.e., the encrypted version of the marking position information.

This means that a particular software product can only be encrypted using a particular secret key, that is, the software maker's secret key corresponding to the sub public key. Using the sub secret key, the software maker can set the key on software locked or unlocked at their option.

This in turn means that pirates cannot produce pirated disks unless they steal the sub secret key information unique to the software from the software maker.

Figure 36:
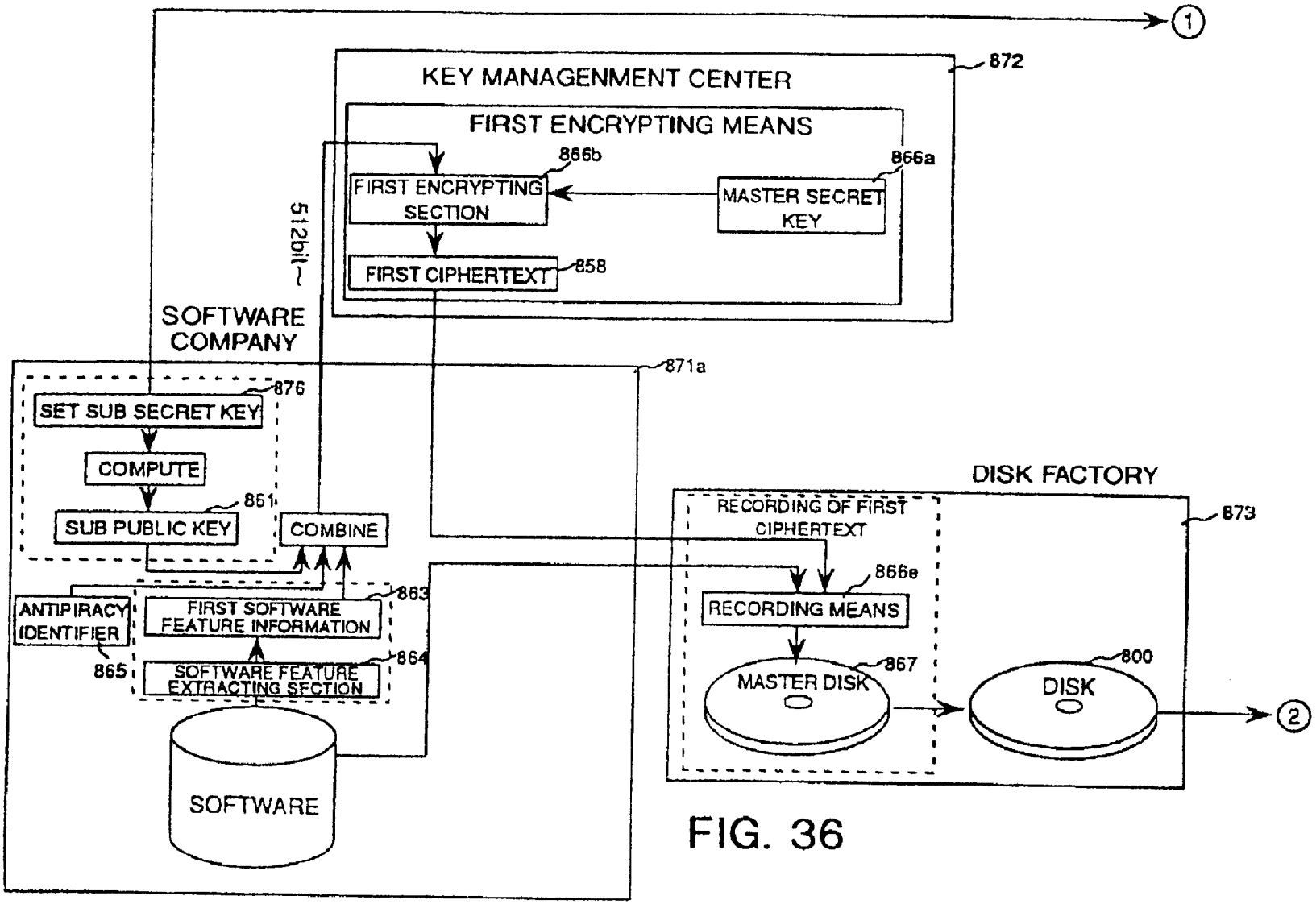
FIG. 36 is a block diagram for explaining a manufacturing process when applying complex encryption to position information, etc. by using a master key, subkey, etc. according to the present embodiment.
Figure 37:
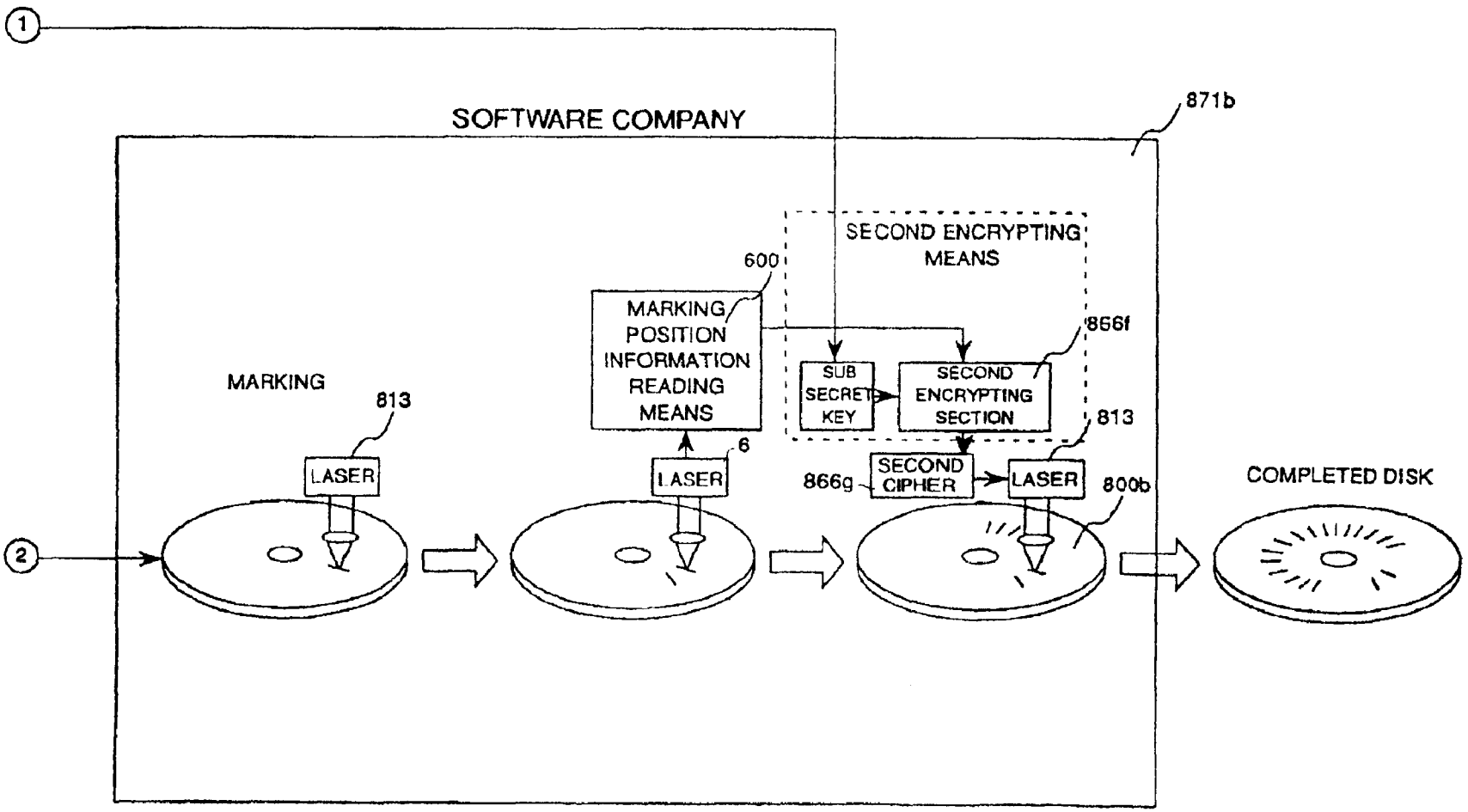
FIG. 37 is a block diagram for explaining the manufacturing process when applying complex encryption to position information, etc. by using the master key, subkey, etc. according to the present embodiment.

In FIG. 32, the software maker combines disk physical position information 868 and disk ID 869, and encrypts them together by using the sub secret key 876 in step 866f to construct a public key cipher 859 which is recorded on the optical disk 800 in the form of a barcode. This permits the software maker to produce piracy-protected disks without having to have the master secret key 866a. The effect of this is to protect the security of the master secret key. If the sub secret key is stolen and pirated disks are produced, the damage is limited to the software for which that sub secret key was issued. When the software maker issues a new sub secret key and sub public key, production of pirated disks of the software thereafter can be prevented. FIGS. 36 and 37 are general system diagrams showing data flow.

In operation, FIG. 36 is the same as FIG. 32, and detailed explanation will not be given here. In FIG. 36, the software company 871a first sets its own sub secret key 876, and computes the sub public key 861. The sub public key 861 is combined with the software feature information 861 of the software to be recorded, and transmitted to the key issuing center 872 via a network such as the Internet. The key issuing center 872 encrypts the combined signal with the master secret key 866a and sends back the encrypted master public key 858 to the software company. The software company combines it with the software, and sends the combined signal to the disk manufacturing factory 873 where it is recorded on the master disk 867 from which the disk 800 is produced. Referring next to FIG. 37, the software company 871b forms a marking on the disk 800, reads the marking position information, encrypts the position information with the sub secret key 876 corresponding to the sub public key, and, using a pulsed laser 813, records the encrypted information on the disk 800b in the form of a barcode. A detailed description of the recording operation has already be given and will not be repeated here.

Figure 38:
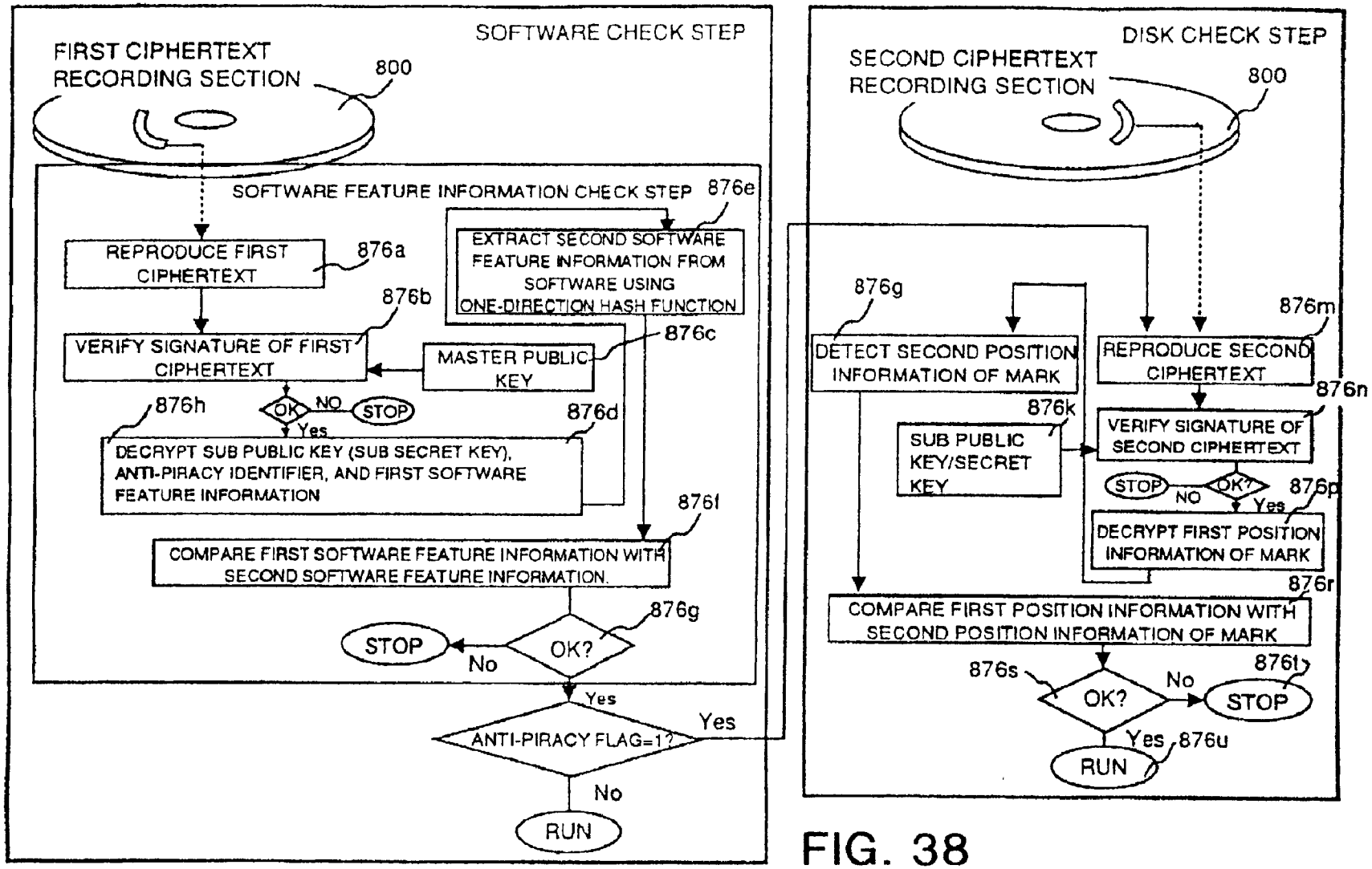
FIG. 38 is a flowchart in a reproduction apparatus according to the present embodiment.

Next, the anti-piracy operation in the reproduction apparatus, when reproducing the thus completed optical disk, will be described in further detail with reference to FIG. 38.

The operation consists essentially of a software check step 874 and a disk check step 875. In the software check step 874, first the first ciphertext is reproduce from the disk 800 in step 876a, and then, using the master public key stored in the ROM in the reproduction apparatus in step 876c, the first ciphertext is decrypted into plaintext in step 876b. In step 876d, the plaintext of the first software feature information 863 and sub public key 861 is obtained, and in step 876f, it is checked against the second software feature information extracted using the one-direction hash function. If the check is NG in step 876g, the operation is stopped; if the check is OK, the sub public key is output in step 876h. If alterations have been made to the sub public key or software attributes by a pirate, the two kinds of information do not agree, so that the reproduction of an illegal disk is prevented. The legitimate sub public key is thus obtained at the reproduction apparatus.

In the disk check step 875, the sub public key is input in step 876k, and the second ciphertext, i.e., the public key cipher 859 (see FIG. 32), is reproduce in step 876m. In step 876n, the second ciphertext is decrypted into plaintext by using the sub public key, and in step 876p, the marking position information is obtained. In this case, the marking position information cannot be altered illegally unless the sub secret key 876 (see FIG. 32) corresponding to the sub public key is leaked out. In step 876p, the actual position of the marking formed on the disk by laser is read, and in step 876r, this position is checked. If the result is NO in step 876s, the operation is stopped in step 876t, producing a display "Pirated Disk". If the result is YES, the reproduction operation is allowed to continue in step 876u.

With the above construction, illegally duplicated disks cannot be reproduced on the reproduction apparatus unless the sub secret key maintained at the software maker is stolen or unless the nonreflective marking portion is laser-trimmed with an accuracy of submicrons, for example, 0.13 μm, and two disks are laminated together with an accuracy of the order of a few microns. This makes it virtually impossible to make pirated disks. This has the effect of preventing pirating of disks.

(c) Detailed description of an example using a public key encryption function in combination with a secret key encryption function A first feature of the encryption system of the present invention is the use of two encryption functions, a public key encryption function and a secret key encryption function, when encrypting marking position information, etc. on each optical disk.

The following description deals with problems encountered when actually implementing a piracy prevention method that uses public key cipher, and also deals with a method of implementation. The public key cipher here refers to the position information encrypted using a public key encryption function (for example, an RSA function).

From the security point of view, it is desirable that all reproduction apparatus be equipped with a public key cipher decoder to decode the anti-piracy public key cipher of the present invention. However, processing a 512-bit public key cipher requires 0.3 seconds using a 32-bit, 50-MHz CPU. On the other hand, the DVD player control IC predominant in consumer apparatus today is an 8-bit one-chip microcomputer. With this CPU, it will take more than a few minutes to process the public key. This means that the user has to wait a few minutes before an image is reproduced from a DVD. This poses a problem in employing the public key cipher system in consumer products.

Since, at the present level, public key cipher cannot be processed by the CPU used in consumer products, for the present there is no option but to use a secret key cipher decoder for consumer reproduction apparatus because it requires a small amount of processing time. However, in the case of secret key cipher, since the secret encryption key can be easily deciphered from cipher decoder information, the secret key cipher will lose its anti-piracy effect once deciphered. Therefore, transferring to public key cipher which is difficult to decipher is imperative in the future.

Secret key cipher and public key cipher are mutually incompatible. If the system were simply switched from secret key cipher to public key cipher in future, second-generation optical disks having public key cipher would not be able to be decoded and reproduced on a first-generation player having a secret key cipher decoder. Furthermore, first-generation optical disks having secret key cipher would be unable to be reproduced on a future player. If the player is constructed to allow the reproduction of such disks, it will allow pirates to decipher the secret key for the secret key cipher and create the secret key cipher using the deciphered key, thus giving rise to the possibility of pirated disks being marketed in large quantities. If disks encrypted with secret key are allowed to be reproduced on future players, piracy cannot be prevented even if public key cipher is used.

The need therefore arises for a mechanism which, if the cipher decoder of reproduction apparatus is changed from the secret key to the public key system in the future, can preserve compatibility to allow earlier optical disks to be reproduced properly on reproduction apparatus having a new public key cipher decoder while preventing the reproducing of pirated disks.

Figure 39:
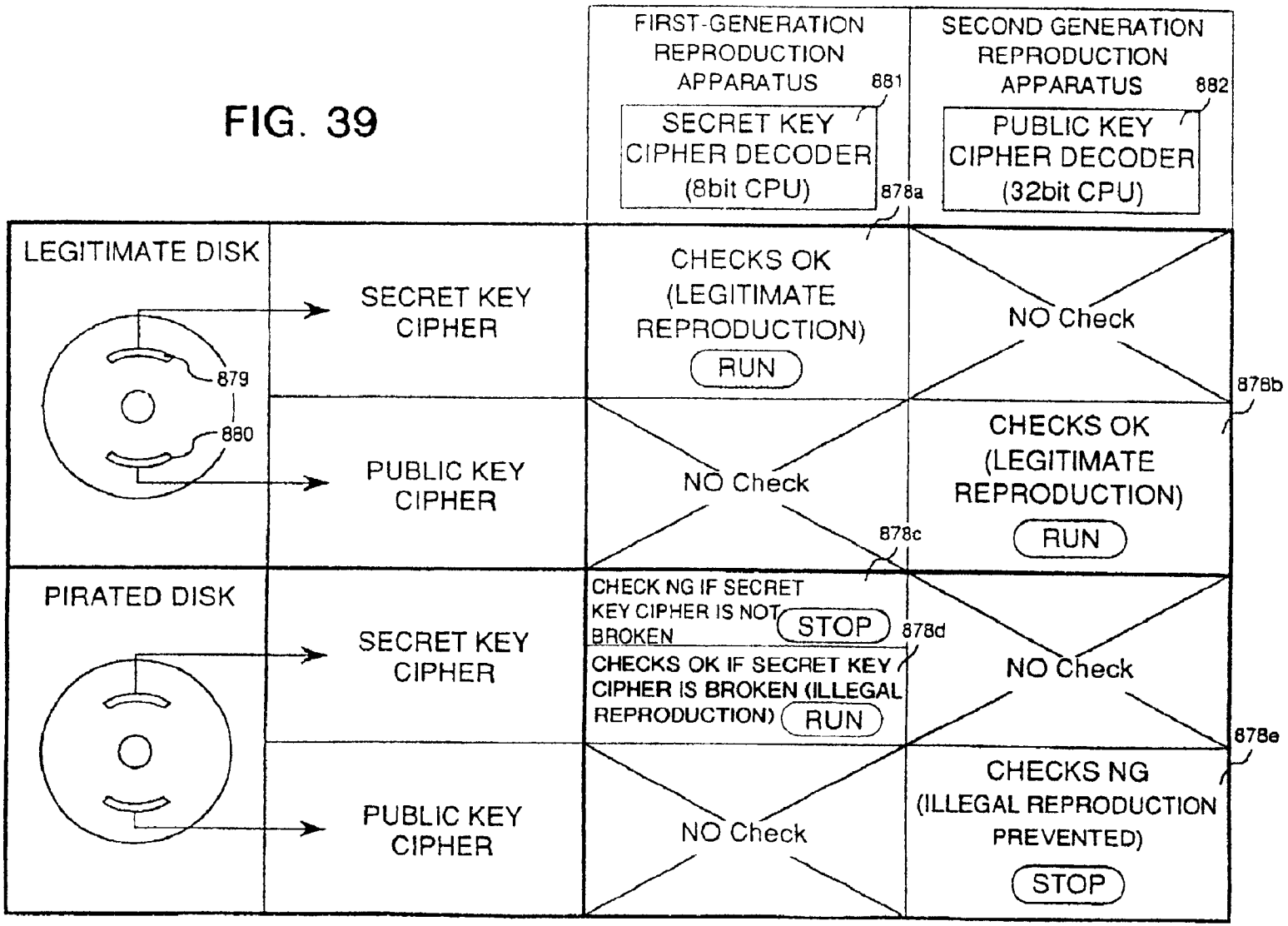
FIG. 39 is a diagram showing a secret key cipher and a public key cipher used in combination on optical disks and their relationship with reproduction apparatus according to the present embodiment.

A method of the invention that satisfies the need for compatibility is disclosed hereinafter. As shown in FIG. 39, the optical disk of the invention has both a secret key cipher recording portion 879 and a public key ciphertext recording portion 880. The manufacturing method will be described later with reference to FIG. 29. First, when reproducing the optical disk of FIG. 39 on a first-generation reproduction apparatus equipped with a secret key cipher decoder 881, the first physical feature information (corresponding to the encrypted version of the position information) unique to the legitimate disk is read from the secret key cipher recording portion 879 on the disk, and decrypted by the secret key cipher decoder 881 into plaintext. Further, the second physical feature information (corresponding to the measured position information) of the disk is measured, and the two kinds of physical information are compared.

In the case of a legitimate disk, the disk is normally reproduced since the two kinds of physical feature information agree, as shown in step 878a.

In the case of a pirated disk, since they do not agree as shown in step 878c, the reproduction of the disk is prevented. That is, the reproduction is prevented as long as the secret key cipher remains unbroken. If it is broken some time in the future by a pirate, as earlier described, the pirate can produce illegal disks in large quantities by illegally creating the secret key cipher. In that case, since the secret key decoder 881 in the first-generation reproduction apparatus checks only the secret key cipher, the comparison checks OK as shown in step 878d, allowing the illegal pirated disk to be reproduced. However, by that time in the future, second-generation reproduction apparatus having a public key cipher decoder 882 will have become a predominant type; therefore, reproducing pirated disks on the first-generation reproduction apparatus in an illegal manner will not have a significant impact.

Since the legitimate disk of the invention has public key cipher, the disk is normally reproduced on the second-generation reproduction apparatus, as shown in step 878b. On the other hand, when a pirated disk is inserted for reproduction, the reproduction apparatus checks only the public key cipher, as shown in step 878e, whether the secret key cipher is deciphered or not. As a result, the anti-piracy function of the public key cipher works, as shown in step 878e, so that the reproducing of the pirated disk on the second-generation reproduction apparatus is almost perfectly prevented.

According to the invention, all disks are manufactured with both the secret key cipher 879 and public key cipher 880 prewritten thereon from the time of commercial introduction of the first-generation reproduction apparatus. Therefore, in the first stage, piracy prevention at the secret key cipher level is provided since the ciphertext can be processed by the 8-bit microcomputer mounted in the first-generation reproduction apparatus. In the second stage, that is, in the future when the secret key cipher may have be broken, more sophisticated piracy prevention can be provided by the public key cipher decoder incorporated in the second-generation apparatus which will have become the predominant type by that time. In this way, if one generation is replaced by the next generation, perfect compatibility with earlier media can be preserved uninterruptedly with the second-generation reproduction apparatus achieving nearly perfect piracy prevention.

The above has described an example of application to the low reflectivity marking method, that is, the piracy prevention method at the reflective layer level, but it will be appreciated that the effect of preserving compatibility at the time of generation change can also be obtained if the same is applied to the piracy prevention method at the master disk level that uses the physical feature information of the master disk as shown in FIG. 13.

The above-illustrated example has the feature that, when performing encryption, the same information is encrypted by using a public key encryption function and a secret key encryption function separately, and the respectively encrypted versions of the information are recorded on the disk.

Accordingly when a transition is made in future from the current player equipped with a decoder, based on an 8-bit microcomputer, for decoding the ciphertext created using a secret key encryption function to the future player equipped with a decoder, based on a 32-bit microcomputer, for decoding the ciphertext created using a public key encryption function, the optical disk as described in the above example can be used effectively on either type of player.

(B) Other mechanisms will be described.

Figure 29:
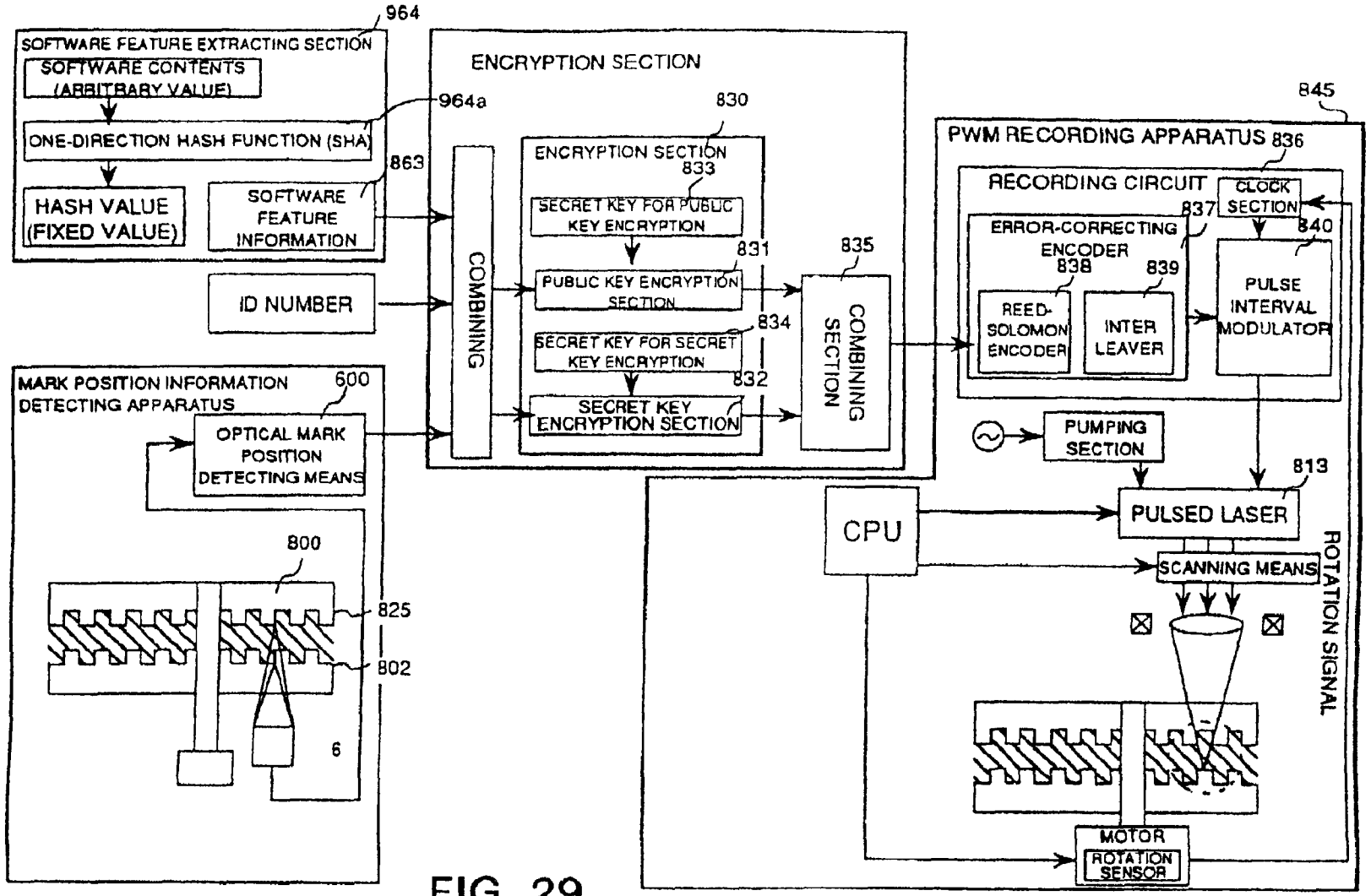
FIG. 29 is a block diagram of a disk manufacturing apparatus according to the present embodiment.

(a) We will describe another specific example of the public key/secret key combination type in which the software feature information, ID number, and marking position information are encrypted (see FIG. 29). The ID number refers to the number assigned to each disk for identifying the disk. The disk ID (also called the disk ID number) to be described later is the same in meaning to the ID number. Major differences between the present example and the foregoing specific example (see FIGS. 32, 36, and 37) are:

(1) In the foregoing specific example, the software feature information is written on the master disk as the first ciphertext and the marking position information is written on a pressed disk as the second ciphertext, while in the present example, the software feature information, the ID number, and the marking position information are all combined together for encryption and the encrypted text is written on an already pressed disk; (2) In the foregoing example, two-stage encryption is performed using the master secret key and sub secret key, while in the present example, encryption is performed only with master secret key without using a key corresponding to the sub secret key.

More specifically, as shown in FIG. 29, the above combined signal is encoded in a secret key encryption section 832 by using a secret key 834 for secret key encryption. The same combined signal is also encoded in a public key encryption section 831 by using a secret key 833 for public key encryption. In this way, public key cipher is used in conjunction with secret key cipher. This overcomes the problem that the current reproduction apparatus can only decode the secret key cipher because of the slow processing speed of its microcomputer. Future reproduction apparatus will use a higher-speed microcomputer, for example, of 32-bit configuration and performs a piracy check by decoding only the public key cipher having a higher degree of security; therefore, piracy can be prevented almost perfectly. If the secret key cipher is broken some time in the future, since the public key-type player will be the predominant type by that time, substantial prevention of piracy can be accomplished. By recording the public key cipher simultaneously with the secret key cipher on the media, if a transition occurs from the current generation to the next-generation player, the media can be reproduced on reproduction apparatus of old generation while substantially achieving piracy prevention.

(b) Next, a modulation recording method for barcode will be described in detail with reference to the same figure.

In FIG. 29, a barcode recording apparatus (PWM recording apparatus) 845 is used to write the encrypted information onto the disk.

First, information concerning the position of the nonreflective portion 815 formed on the reflective layer 802 or on the second reflective layer 825 is detected using optical mark position detecting means 600. The method of detection has already been described with reference to FIG. 15, etc., and therefore, explanation will not be repeated here. The optical mark position information, the software feature information and the ID number generated by ID generator 546 are combined by combining means 830. The software feature information is obtained by feature-extracting from a part of the software contents using a one-direction hash function such as SHA, and by obtaining a hash value of 128 bits or 160 bits. The ID number generator 546 has already been described with reference to FIG. 14, and therefore, explanation will not be repeated here. In the encryption section 830, the combined signal of the physical feature information is encoded in the public key encryption section 831, such as RSA, by using the secret key 833 for public key encryption.

The above public key cipher and the secret key cipher are combined in a combining section 835, and are affected with interleaved/Reed-Solomon error corrections by a Reed-Solomon encoder 838 and an interleaver 839 in an error-correcting encoder 837 of a recording circuit 836. The interleave length in this case is so set as to be able to correct a burst error due to a disk scratch 2.38 mm or longer, the same level as the CD, thereby resulting such effect to provide error correction of errors in the barcode recorded data of the invention against a disk scratch that may be caused in the worst condition in consumer use.

The principle of the pulse width modulation method will be described with reference to the same figure. This method eliminates the need for the first ciphertext by the master secret key and the second ciphertext by the sub secret key. In this method, the software feature information, the position information, and the ID number are combined together for encryption. Billions of ROM disks are produced annually. Therefore, there is a possibility that a disk that happens to have a marking whose position pattern is very easy to duplicate may be produced. A pirated disk could be produced by using a combination of this easily duplicatable marking position information and the legitimate ciphertext of this position information. In FIG. 29, the position information is combined with the software feature information for encryption or for authentication by signature. The position information is therefore inseparable from the software feature information. This means that if an easily duplicatable mark happens to be produced, it is only possible to produce pirated disks having corresponding software contents, so that potential damage will be greatly limited. It will be recognized here that this ciphertext may be recorded on the master disk.

Figure 30:
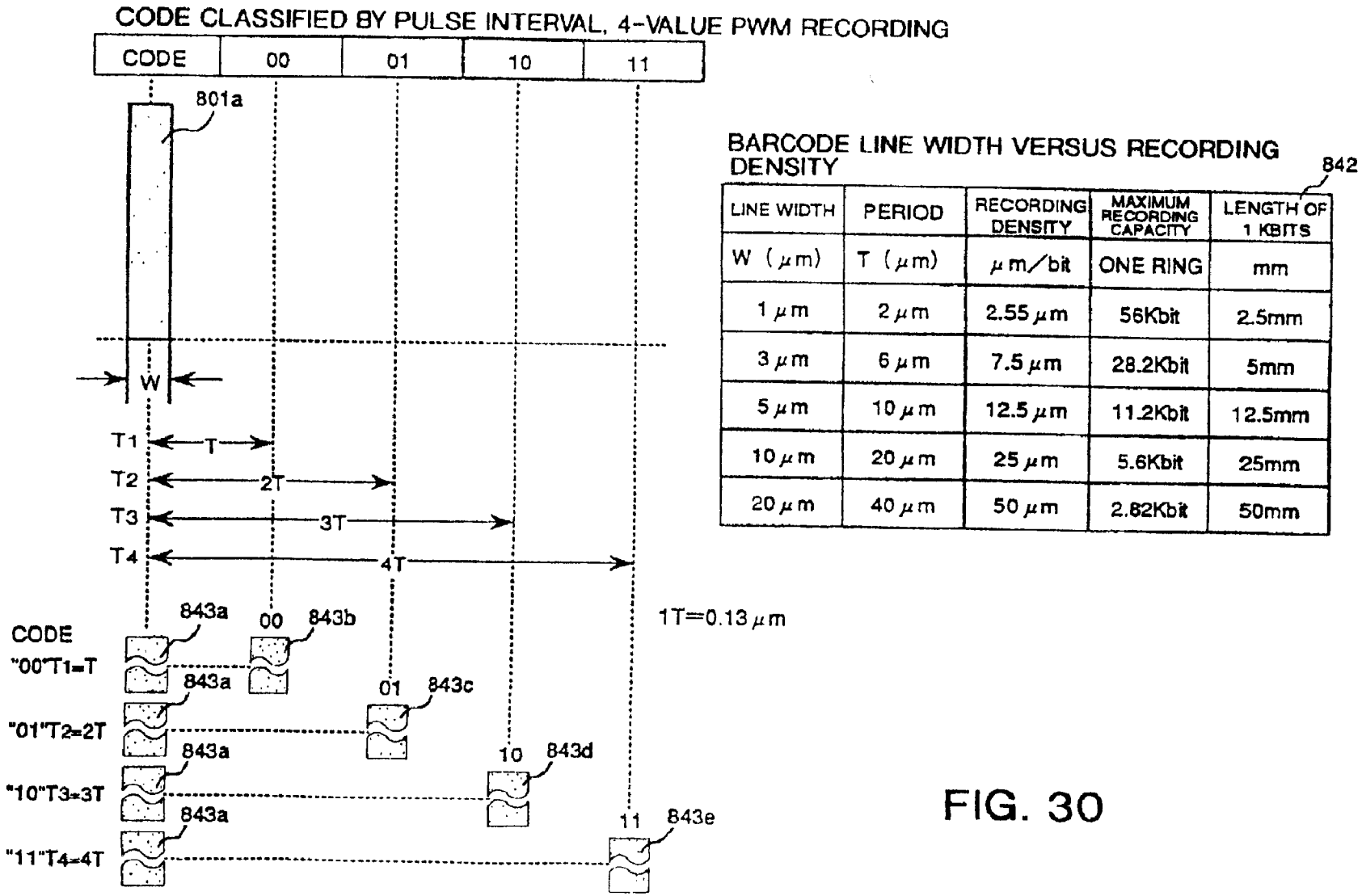
FIG. 30 is a code diagram for a nonreflective portion according to the present embodiment.

The error-correction coded signal is modulated into a PWM signal by a pulse interval modulator 840. When describing lines by using a laser, it is difficult to construct a barcode by accurately controlling the line width. Therefore, in the present invention, the pulse interval is classified into four values 1T, 2T, 3T, and 4T, as shown in FIG. 30, and by encoding marks 843b, 843c, 843d, and 843e as 00, 01, 10, and 11, for example, 2-bit data can be transmitted with one barcode. As shown in a table 842 showing the relationship between line width and recording rate in FIG. 30, when recording a PIM barcode in a lead-in area of the ROM disk 800 with line width 10 μm, it can be seen that 5.6 kbits of information can be written additionally on the completed disk in one revolution.

Figure 31:
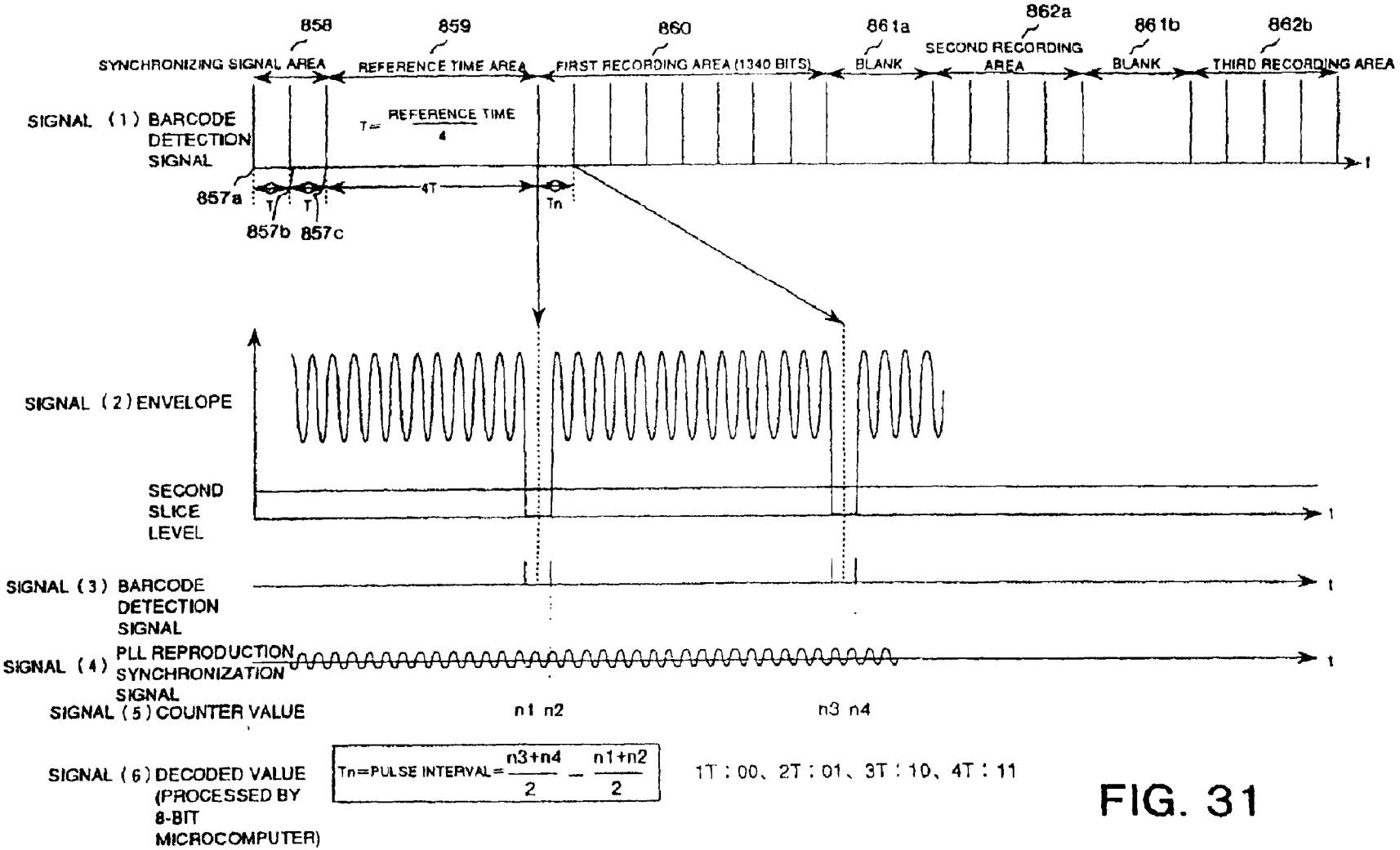
FIG. 31 is a diagram showing a detected waveform from the nonreflective portion according to the present embodiment.

Part (1) of FIG. 31 shows a nonreflective portion detection signal.

The signals have a synchronizing signal area 858, consisting of three pulses 857a, 857b, and 857c with interval T; this area indicates the starting position. This is followed by a blank of 4T which is a reference time area for measuring reference time T. When the line width is 10 μm, T=20 μm. Next comes a first recording area 860 of about 1 kbits for holding secondary-recorded data. Then, preceded by a blank 861a of 100 μm or greater length, there is recorded a second recording area 862a for tertiary-recorded data. A password for descrambling, etc. are recorded at a dealer.

(c) The following describes the method of use of the barcode which can secondary- and tertiary-record by the HMST method.

Figure 35:
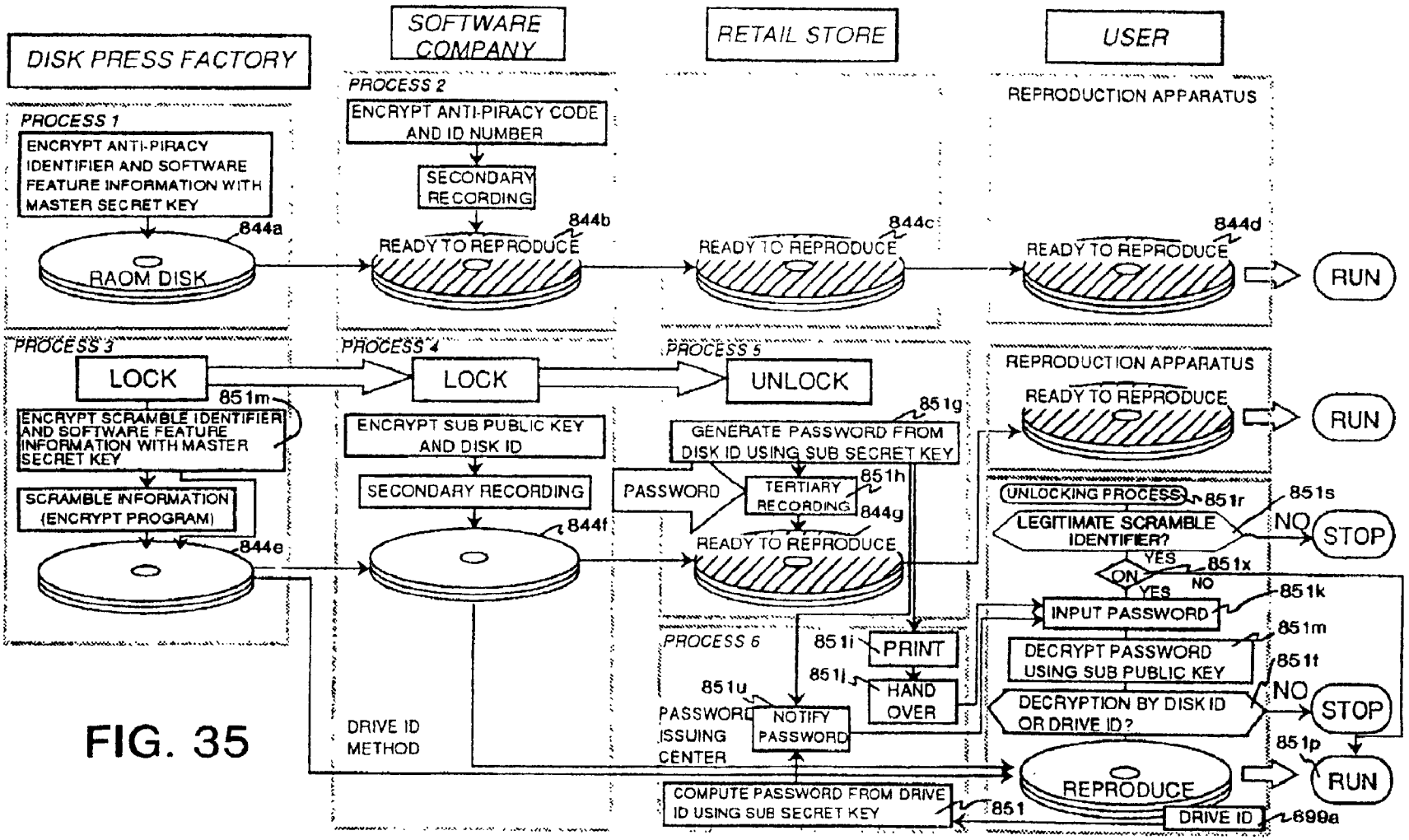
FIG. 35 is a diagram showing a process of disk distribution according to the present embodiment.

As shown in FIG. 35, in process (2), the software maker may produce a disk 844b on which the ID number unique to the disk and a private key used for secret communication with a user are recorded. The disk 844c, 844d can be reproduced without requiring any special procedure.

Figure 21:
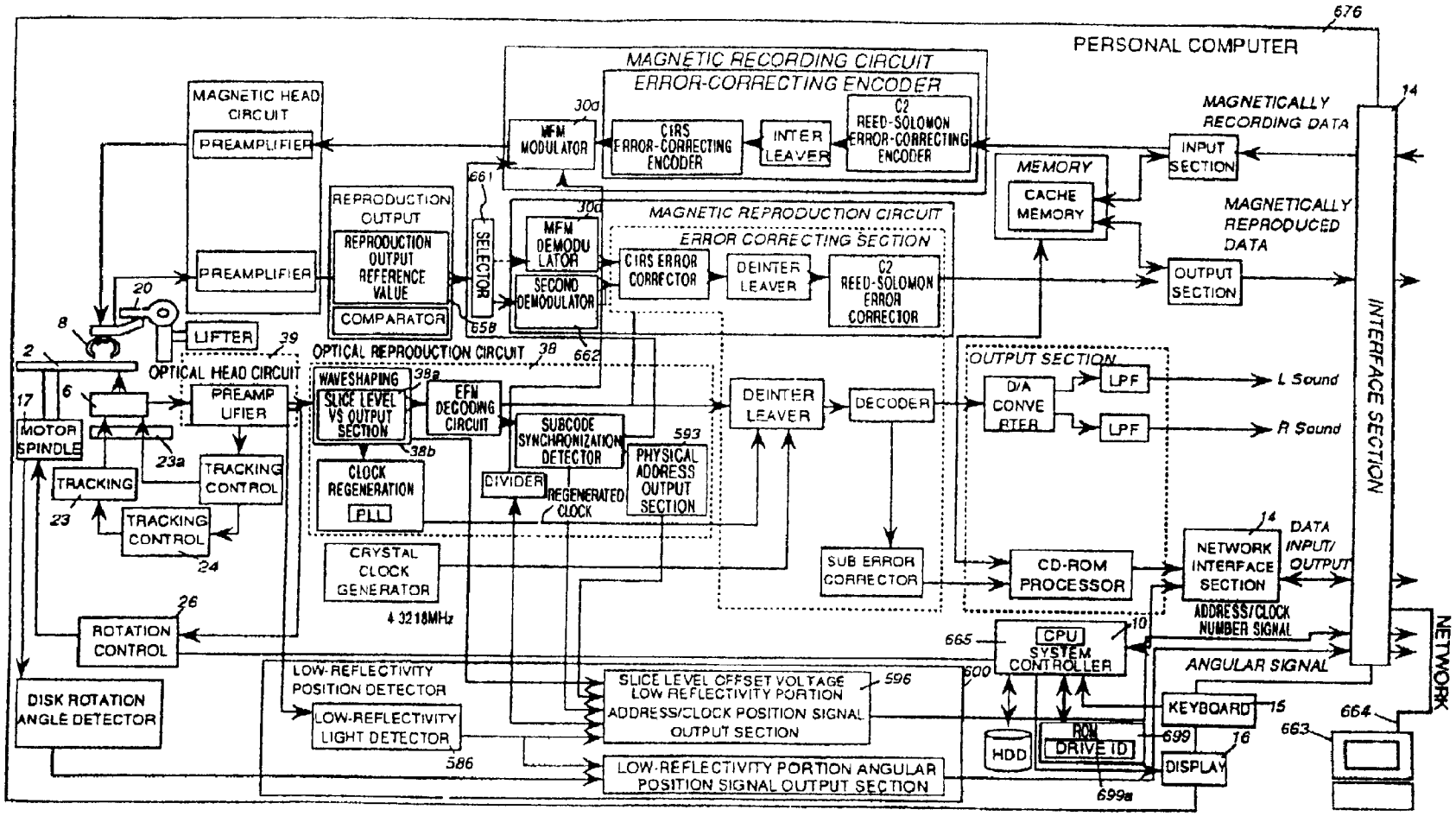
FIG. 21 is a block diagram of a magnetic recording apparatus according to the embodiment.

As shown in FIG. 21 to be described later, a recording/reproduction circuit implementing the HMST method of the invention can be constructed by replacing an MFM modulation/demodulation magnetic head in a magnetic recording/reproduction circuit by a PWM (PIM) modulation/demodulation laser.

(d) Another specific example of disk manufacturing is shown in FIG. 35. That is, in process (3) of FIG. 35, which shows another application of the disk, information of scrambled MPEG video signal or the like is recorded on a disk 844c. A brief operational description of MPEG scrambling will be given below. An MPEG compressed video signal is split between a variable-length encoder for AC components and a fixed-length encoder, each containing a random number adder, for scrambling. In the present invention, a descrambling signal is encrypted by an encryption encoder using a one-direction function. Further, a portion of a compression program in an image compression controller is compressed by the encryption encoder. This makes it difficult for a replicating company to exchange the encryption encoder with an illegal one. Accordingly, only legitimate disks are decrypted with sub public key.

Referring back to FIG. 35, we will describe next how the disk 844e manufactured in the above process (3) is processed in the next process (4) and later processes.

That is, in process (4) of FIG. 35, using a master secret key the software company encrypts the disk ID number and a sub public key for decoding the descrambling signal, and secondary-records the encrypted text by barcode on the disk, thus completing the disk 844f. Since the disk 844f are scrambled, the disk cannot be reproduced as is. The disk ID number mentioned here is the same in meaning as the previously described ID number. In process (5), after receiving money for the disk from a customer, the dealer generates a password by using the disk ID number with the sub secret key corresponding to the sub public key, and tertiary-records the password on the disk. Once the password has been recorded, the disk 844g can be reproduced on a reproduction apparatus by descrambling the data. In the case of a computer program, the program can be installed. With this method, if someone shoplifts a disk, images or software on the disk cannot be reproduced since image scrambling and ciphertext are not unlocked. This defeats the effort of a shoplifter, and thus has the effect of preventing shoplifting.

(e) We interrupt here our explanation relating to FIG. 35, and refer back to FIG. 21 to describe the operation and configuration of a reproduction apparatus incorporating a recording circuit, as shown, concentrating on magnetic recording and reproduction circuits which in combination of an optical reproduction apparatus constitute a recording/reproduction circuit. In FIG. 21, a combination of the magnetic recording and reproduction circuits, and optical reproduction apparatus is shown, but instead, a combination of an ordinary optical reproduction apparatus and a floppy disk drive may be used.

In the figure, the magnetic reproduction circuit has two demodulators, an MFM demodulator 30d and a second demodulator 6b2(sic) which is another type to MFM, one or the other of which is selected by a selector 661. The corresponding modulator is kept only at the factory, so that a full recording capability is not provided although reproduction is possible. Accordingly, when a specially modulated area was recorded at the factory, a specially modulated signal is not recorded. CPU 665 on the drive side performs control so that no recording can be made unless the specially modulated signal is reproduced from this area. Therefore, it can be said that this area is a logical write-once area, permitting recording only once. Accordingly, once the machine ID, such as a drive ID 699a recorded in a ROM 699 in the reproduction apparatus, has been recorded in this write-once area of a magnetic recording portion on an optical disk or a floppy disk, the user drive cannot alter the recorded contents, thus preventing illegal installation on more machines than a permitted number of machines. The drive ID mentioned here is a number assigned to each reproduction apparatus for identifying the apparatus. The machine ID may be an ID assigned to a personal computer. A network interface section 14 examines an HDD, etc. on a second personal computer 663 connected to a network 664 and supervises the operation so that the program of the same drive ID or same machine ID will not be started or run, thus preventing the use of illegally copied software.

The laser marking recording method of the invention permits secondary recording such as recording of a dealer code at a dealer, as does a magnetic method. This, however, does not constitute a feature of the present invention, and therefore, detailed explanation will not be given here.

In the case of a rental video store, if a password were recorded permanently on a disk, and if the disk were shoplifted, the shoplifter could play back that disk. To prevent this, a rental video store hands a scrambled disk 844j to a customer, as shown in process (6). In step 851g, a password for descrambling is computed from the disk ID or the drive ID described later by using a sub secret key. In step 851j, the password is printed on the receipt which is handed to the customer. The password may be notified to the customer by telephone, as shown in step 851u.

The customer performs the descrambling operation shown in step 851r on his reproduction apparatus in his home. First, in step 851s, the scramble identifier and the software feature information are decrypted from the ciphertext by using the sub public key. The decrypted software feature information is compared with the software feature information that was actually extracted from the software contents by using a one-direction hash function, to verify whether they agree or not. If verification cannot be done, the disk is regarded as an illegal one, and the reproduction is stopped. If the scramble identifier is OFF in step 851x, the reproduction operation is permitted in step 851p. If the scramble identifier is ON, the user enters a password from a numeric keypad in step 851k, and the password is computed using the sub public key. In step 851t, a further computation is performed using the disk ID and/or drive ID, and only when the result of the password computation agrees with the disk ID or drive ID, the scramble or ciphertext is unlocked to permit reproduction or operation for a prescribed number of days. When the disk has been rented out with a password only for a portion of the software to the customer, if the customer desires to view other items in the software, the customer can request by telephone the key issuing center to issue the password for the desired software item; the password is then notified to the customer in step 851u and input in step 851k to enable the desired software on the disk to be reproduced.

The operation performed at the video retail store or rental video store in processes (5) and (6) in FIG. 35 will be described in further detail with reference to FIG. 34. The video retail store receives a scramble- or encryption-applied disk 844f, and after confirming payment from the user, transmits the disk ID number and sub public key data of the disk 844f from a barcode recording/reproduction apparatus 845 to a password issuing center 852 via a POS terminal 846. In the case of a small shop system, the password issuing center, that is, the system containing the sub secret key for the sub public key, may be contained in the POS terminal. The password issuing center inputs the disk ID number and time information in step 851q, performs computation in step 851s, performs encryption with the sub secret key in step 851t, and issues a password in step 851g. The password is then transmitted via a network 848 and the POS terminal 846 to the barcode recording apparatus 845, and the disk 844g with the password recorded thereon is handed to the customer. This disk 844g can be reproduced as is.

Next, the operation performed at the rental store will be described in detail. First, a ROM disk 844f locked with scrambling is displayed on the store shelf. When the particular ROM disk 844f is specified by a customer, a shop clerk holds in his or her hand a circular barcode reader 850 with a built-in rotary-type optical head 853 generating a spiral scanning pattern, and presses it onto the center of the disk 800 housed in a transparent case, to read the barcode formed by nonreflective portions 815 on the reflective layer in the disk 844f, thereby reading the disk ID number. The product code may be read either from the barcode of the invention formed by the nonreflective portions 815 or from the circular barcode prerecorded and pressed by the existing recording method on an inner ring portion inside the pit recording area of the master disk. These items of information are processed by the POS terminal 846, and the rental charge is settled; at the same time, the password corresponding to the disk ID number is issued in step 851g, as previously described. For rental purposes, to limit the number of days for viewing, time information, as used in step 851r, is appended to the disk ID number for encryption, and the password is thus created. This password is valid for a preset number of days, the effect being that in the case of a rental disk a rental period of 3 days, for example, can be set in the password.

Figure 25:
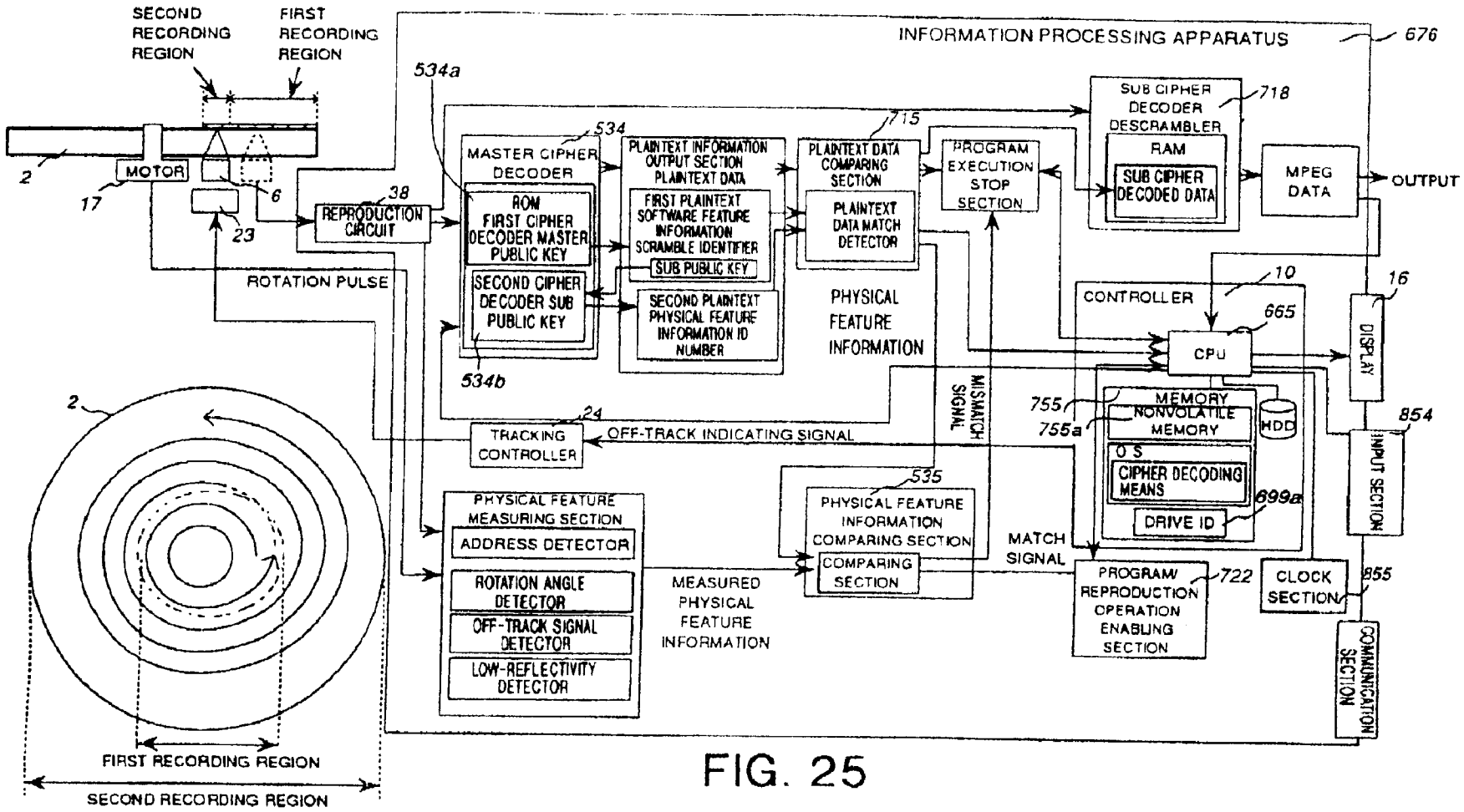
FIG. 25 is a block diagram of an information processing apparatus according to the embodiment.

In step 851i, the thus issued password for unlocking the scramble, the date of rent, the expected data of return, and the rental charge of the title are printed on a receipt 849 which is handed to the customer together with the disk. The customer takes the disk 844j and receipt 849 home. When, in step 851k, the password is input from an input section 854, such as a numeric keypad, on the information processing apparatus 676 shown in FIG. 25, the password is computed with the disk ID number and is input to a master cipher decoder 534 where the encrypted data is decoded into plaintext by using a public key. This plaintext is checked in a plaintext data checking section 715 to determine whether it satisfies a predetermined condition; only when the password is correct, program data is descrambled by a sub cipher decoder 718, and the video image is output.

In this case, if the password contains time information, date data from a clock section 855 is checked, and descrambling is allowed as long as the date data matches the time information. The password and its corresponding ID number are stored in a nonvolatile memory 755a in a memory 755. Once the password has been entered, the user need not reenter it to perform descrambling. In this way, the key on a disk can be locked and unlocked by electronic means, which offers an advantage for distribution business.

The foregoing embodiments have been described referring mainly to the disk ID method wherein a disk ID is appended to a disk. However, in the case of disks that do not have disk IDs, it becomes necessary to use the drive ID of the drive. The following description deals in detail with the descrambling, password creation, and checking operations when the drive ID alone is used and also when both the drive ID and disk ID are used.

Figure 34:
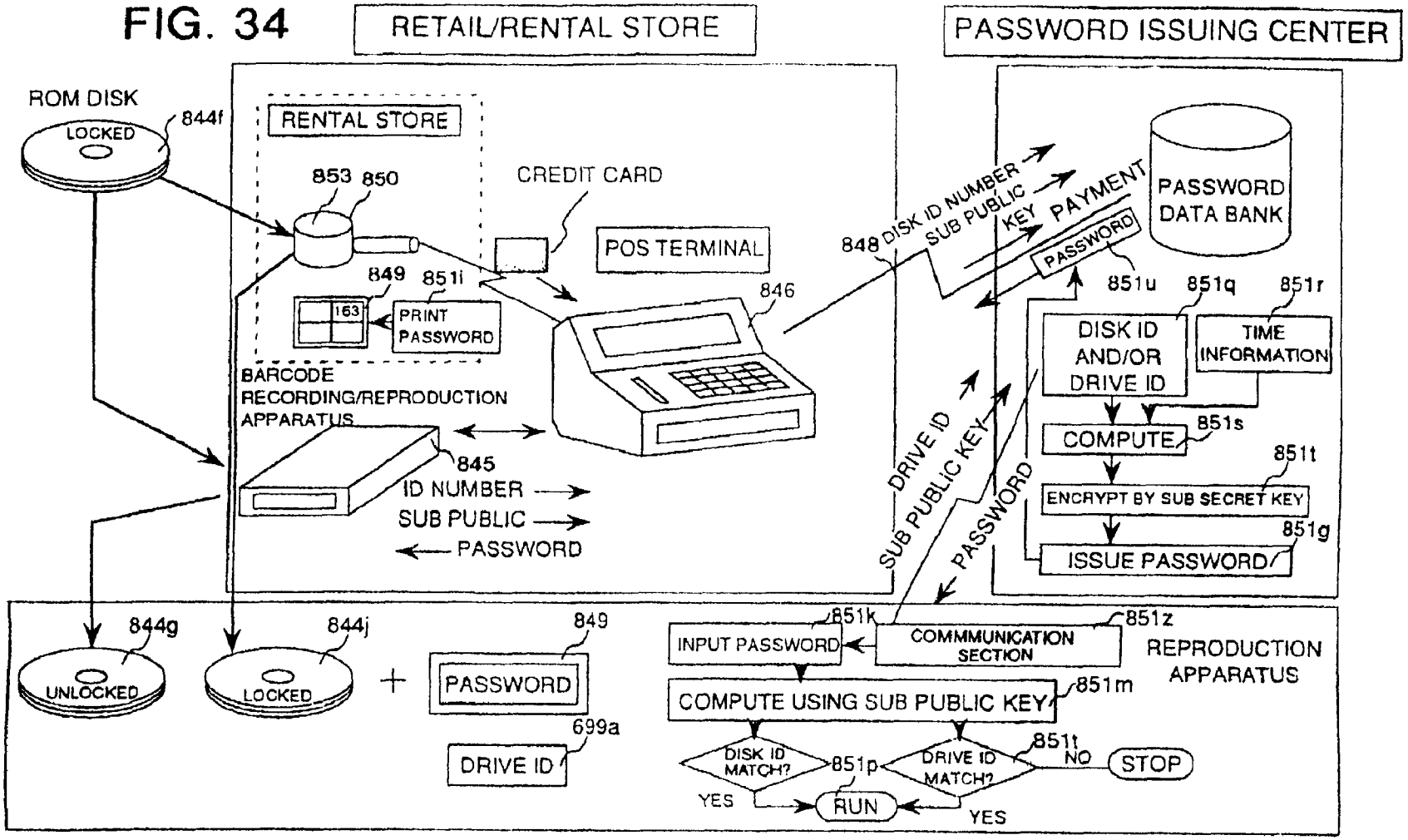
FIG. 34 is a diagram for explaining data flow in disk distribution according to the present embodiment.

In FIG. 35, when using a password relating to the drive ID for descrambling the software, the drive ID 699a stored in a ROM in the reproduction apparatus is transmitted from a signal section 851z in FIG. 34 to the password issuing center by telephone or via personal computer communication. In the password issuing center, using the drive ID and the software ID in step 851q, computation is performed in step 851s, and the result is encrypted with sub secret key in step 851t, thereby creating a password in step 851g. In step 851u, the password is transmitted to the communication section 85z(sic) in the reproduction apparatus including the user's personal computer, by telephone or via personal computer communication. The user enters the password in step 851k, and decryption computation is performed using the sub public key in step 851m. In step 851t, the drive ID is compared with the result of the computation, and if they do not match, the operation is stopped. If they match, reproduction or operation is performed in step 851p.

The advantages and disadvantages of the drive ID method and the disk ID method will be described. When the disk ID is used, the password is valid only for one particular disk. The disk can be run on any drive. This method is therefore suitable for movie software and the like. However, in the case of business software for personal computers, if the software can be installed on any drive, the software on the disk may be illegally copied onto more than one computer.

That the disk can be run only on one drive is a disadvantage of the drive ID method in the case of movie software. This, however, however, becomes an advantage in the case of personal computer software. For business software that need only be installed once, the drive ID method has an advantage in that its password-protect unlocking feature prevents the software from being illegally installed on a personal computer by using other drives than the one designated drive.

However, the drive ID is written in an EPROM in the machine, and can be easily altered. If drives of the same drive ID are sold, illegal installation may be made on many machines. On the other hand, as already described, it is difficult to alter the disk ID of the present invention. In FIG. 34, if provisions are made to create a password for both disk ID and drive ID in step 851q and to check both IDs in step 851t, the disk ID is prevented from being altered. The resulting effect is that if drives of the same drive ID are distributed in large quantities, since the disk ID is valid only for one particular disk, illegal installation on many machines is suppressed.

Figure 42:
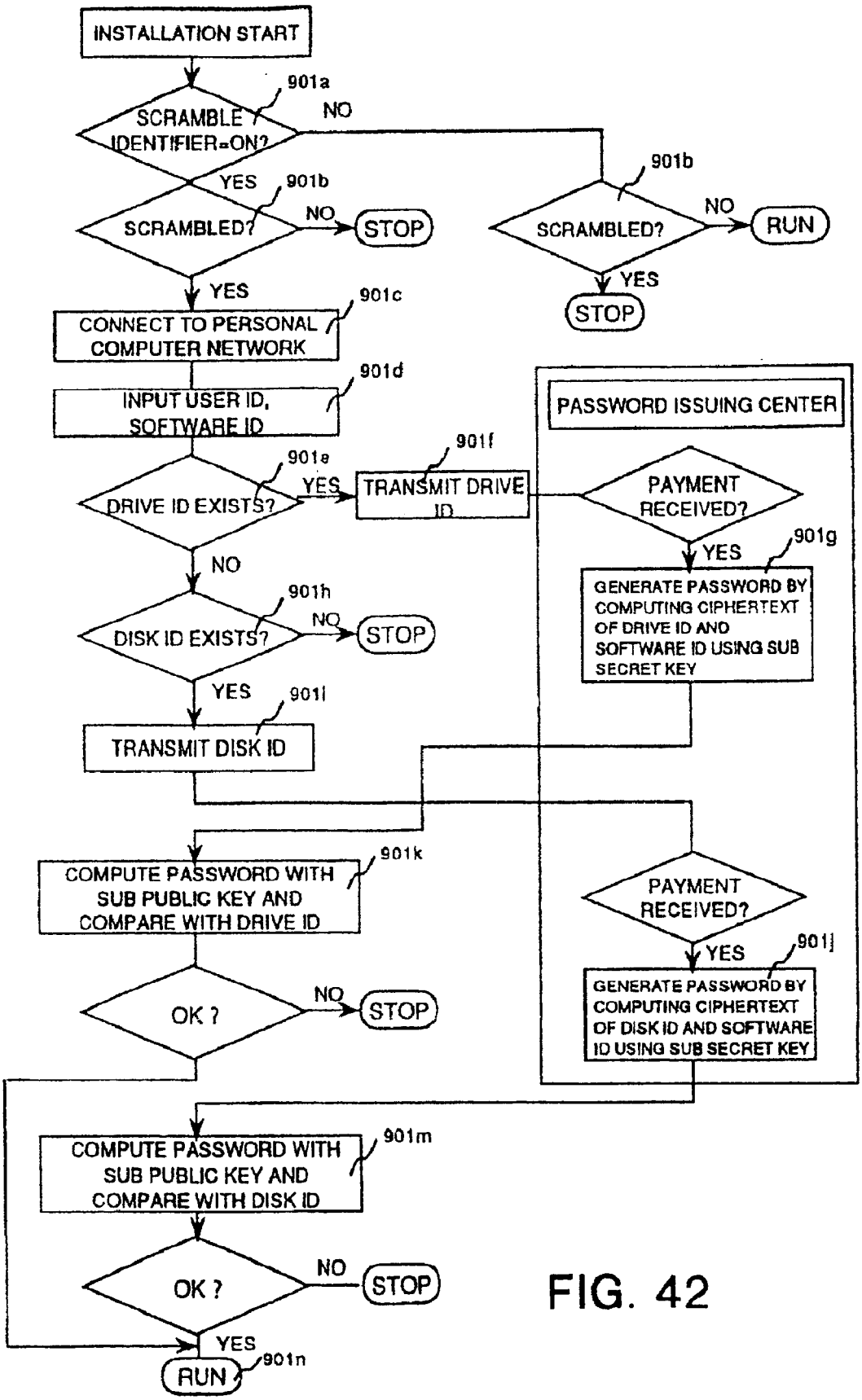
FIG. 42 is a flowchart illustrating the function of a scramble identifier and the switching between drive ID and disk ID in a program installation process according to the present embodiment.

As described above, the drive ID method and the disk ID method have their own advantages and disadvantages, and the advantages are different for different applications. It is expected that the drive ID method will be used for computer software that is installed only once, and the disk ID method for movie or music software that is reproduced many times. This requires that the reproduction apparatus be designed to support both methods. Using the flowchart of FIG. 42, we will describe an operational procedure that handles both the drive ID and disk ID. When installation is started, first the scramble identifier is checked in step 901a whether it is ON or not. If the software is scrambled and the identifier is OFF, this means an illegal operation, and the installation stops. The installation also stops if the identifier is ON though the software is not scrambled. As already described, this scramble identifier cannot be altered and is therefore effective in preventing illegal installation. In step 901c, the personal computer is connected to the password issuing center via a network. In step 901d, user ID is entered, and in step 901e, if the reproduction apparatus has a drive ID, the drive ID is transmitted to the password issuing center. After confirming payment, the password issuing center performs encryption and computation on the drive ID and software ID by using a sub secret encryption key, to generate a password. The personal computer at the user end performs computation to decrypt the password by using a sub public key, and compares it with the machine ID of the personal computer or the drive ID of the drive. If they do not match, the operation stops; if they match, the installation program is run in step 901n. In the above case, that is, when computing the password with the drive ID in step 901k, a program decryption key may be output to accomplish decryption or descrambling.

Turning back to step 901e, if there is no drive ID, then it is checked in step 901h whether a disk ID is recorded on the disk, and if there is no disk ID, the installation stops. If a disk ID is recorded, the disk ID and the software ID are transmitted to the password issuing center. The password issuing center communicates with a credit company, and after confirming online payment by credit, creates a password in step 901j from the disk ID and software ID by using the sub secret key. The personal computer at the user end decrypts the password by using the sub public key in step 901m, and if the result checks OK, program installation or software reproduction is carried out.

In this way, both the drive ID and disk ID can be handled. This has the effect of preventing illegal installation while allowing legitimate installation of software products having various IDs.

Thus by encrypting the disk physical ID by a one-direction encryption encoder, copy protection security can be enhanced.

As described above, according to the present embodiment, a nonreflective portion is formed on a reflective layer in an optical disk consisting of two disks laminated together, and at least its position information is encrypted and written on the same optical disk. This makes duplication much more difficult as compared to the prior art. Production of illegal copies, that is, so-called pirated disks, can thus be made virtually impossible.

As is apparent from the description so far given, the present invention has the advantage of achieving a greatly improved copy prevention capability as compared to the prior art.

Furthermore, according to the present invention, a piracy check mechanism can be incorporated into the master disk by encrypting formatted master disk physical feature information 876 in combination with public key data and software feature information, as described with reference to FIG. 32, etc. This further increases security.

Figure 26:
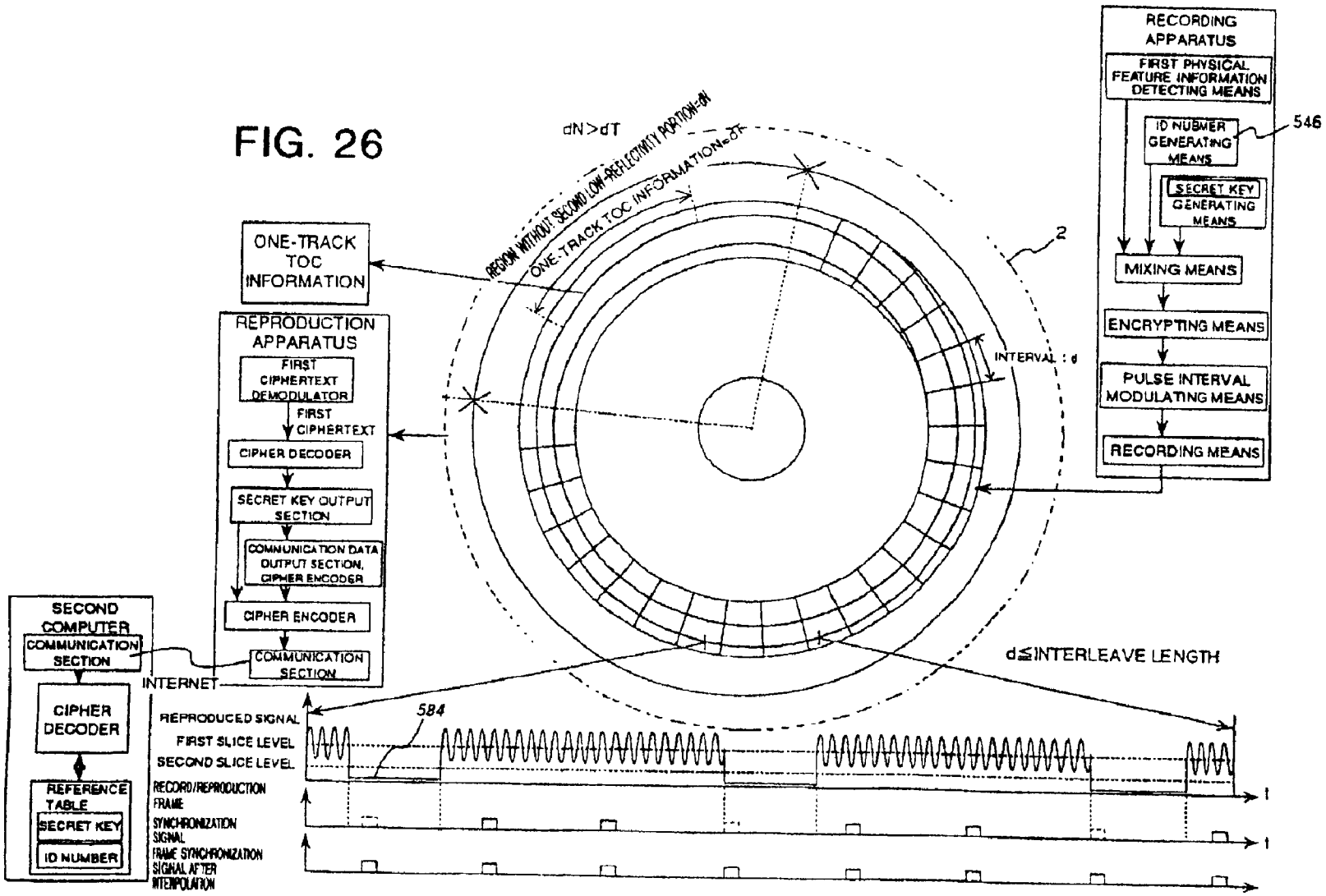
FIG. 26 is a top plan view of a second low-reflectivity portion according to the embodiment.

In FIG. 26, a method was disclosed that provides greater network security for online shopping companies. According to this method, the online shopping company secondary-records the private key for secret communication on all disks and distributes it to users, eliminating the need for sending the private key to the user by mail and also saving the user the trouble to key in the private key of many digits. Furthermore, since the user need not enter the private key by himself, a large numeric value consisting of 100 or more digits can be used as the private key. This greatly improves network security.

In the above embodiment, the marking position information of the invention was written on the same disk, but the invention is not limited to the illustrated example. For example, the information may be written on a floppy disk as a different medium.

Furthermore, in the above embodiment, examples have been described wherein an elliptic function or an RSA function is applied to the digital signature or digital signature-like technique or encryption technique. However, the invention is not limited to the illustrated examples; rather, any other encryption technique may be used.

Moreover, in the above embodiment, the position information was encrypted or was provided with a digital signature, but instead, the position information itself may be written directly on the disk. In that case also, the invention is effective in preventing pirated disks from being made by copying the marking and its position information.

The optical disk of the invention has a structure such that a reflective film is sandwiched directly or indirectly between two members resistant to laser light and a marking is formed by laser on the reflective film. The above embodiment has described examples in which this structure is used for a piracy prevention technique, but it will be appreciated that such a structure may also be applied to other techniques. In the above embodiment, the optical disk of the invention has been described as being fabricated by laminating two substrates with an adhesive layer interposed therebetween. However, the adhesive layer may be omitted, or instead, a member made of a different material, such as a protective layer, may be used; that is, any suitable structure may be used as long as the reflective film is sandwiched directly or indirectly between two members resistant to laser light. Furthermore, in the above embodiment, the optical disk of the invention has been described as comprising substrates as the members that are laminated together, but other members such as protective layers may be used; that is, any member that has resistance to laser light may be used.

In the above embodiment, a combination of two kinds of cipher, secret key cipher and public key cipher, has been described as a representative example of a combination of multiple kinds of ciphers of different generations, but the invention is not limited to this particular example. For example, as an alternative combination of different generations, public key cipher having a 256-bit secret key, which is less secure but can be processed by a slow CPU, and public key cipher having a 1024-bit secret key, which provides great security but can only be processed by a high-speed CPU, may be used. In this way, with a combination of public key ciphers having different security levels, the same effect of preserving compatibility between different generations can be obtained. Furthermore, a combination of three kinds of ciphers of different generations, such as secret key cipher, low-security public key cipher, and high-security public key cipher, may also be used.

What is claimed is:

[1. A marking forming apparatus comprising:

marking forming means for applying at least one marking to at least one reflective film formed to a disk;

marking position detecting means for detecting at least one position of said marking; and position information output means for outputting said detected position as position information of said marking.]

[2. A marking forming apparatus according to claim 1, further comprising position information writing means for writing at least said output position information or information concerning said position information to said disk or to a different medium.]

[3. A marking forming means according to claim 2, wherein said position information writing means includes encrypting means for encrypting at least said output position information or information concerning said position information, and writes contents thus encrypted to said disk.]

[4. A marking forming apparatus according to claim 3, wherein when the encrypting means performs the encryption, it uses a secret key of a public key encryption function.]

[5. A marking forming apparatus according to claim 3, wherein said encrypting means includes first encrypting means for encrypting software feature information concerning features of software contents written to said disk and a sub public key of a public key encryption function by using a master secret key of said public key encryption function, and second encrypting means for encrypting said position information or information concerning said position information by using a sub secret key corresponding to said sub public key, and the writing at least said output position information or information concerning said position information means writing contents encrypted by said first encrypting means and contents encrypted by said second encrypting means to said disk.]

[6. A marking forming apparatus according to claim 2, wherein said position information writing means includes digital signature means for applying a digital signature to at least said output position information or information concerning said position information, and the writing at least said output position information or information concerning said position information means writing information concerning a result of said digital signature application to said disk.]

[7. A marking forming apparatus according to claim 6, wherein when said digital signature means applies said digital signature, it uses a secret key of a public key encryption function.]

[8. A marking forming apparatus according to claim 6, wherein said digital signature means includes first digital signature means for applying a digital signature to software feature information concerning features of software contents written to said disk and to a sub public key of a public key encryption function by using a master secret key of said public key encryption function, and second digital signature means for applying a digital signature to said position information or information concerning said position information by using a sub secret key corresponding to said sub public key, and the writing at least said output position information or information concerning said position information means writing a result of the application of said digital signature by said first digital signature means and a result of the application of said digital signature by said second digital signature means to said disk.]

[9. A marking forming apparatus according to claim 2, wherein the position information writing means writes coexistently such informations that are processed by using plural kinds of encryption techniques or digital signature techniques with regard to a same position information.]

[10. A marking forming apparatus according to claim 4, 5, 7, or 8, wherein said public key encryption function is an RSA function or an elliptic function.]

[11. A marking forming apparatus according to claim 10, wherein said disk is constructed by laminating two disks together.]

[12. A method of forming a laser marking to an optical disk, comprising the steps of:

forming at least one disk;

forming a reflective film to said formed disk;

laminating two disks together, said disks including at least one disk with said reflective film formed thereon; and forming at least one marking by a laser on said reflective layer of the laminated disks.]

[13. A reproduction apparatus comprising:

position information reading means for reading position information of at least one marking or information concerning said position information, said marking being formed to at least one reflective film formed to a disk and being detected for a position thereof, at least the position thus detected being output as said position information of said marking;

marking reading means for reading information concerning at least one actual position of said marking;

comparing/judging means for performing comparison and judgement by using a result of reading by said position information reading means and a result of reading by said marking reading means; and reproducing means for reproducing recorded data on said optical disk in accordance with a result of the comparison and judgement performed by said comparing/judging means.]

[14. A reproduction apparatus according to claim 13, wherein at least said output position information or information concerning said position information is written to said disk by position information writing means.]

[15. A reproduction apparatus according to claim 14, wherein said position information writing means includes encrypting means for encrypting at least said output position information or information concerning said position information, and said position information reading means includes decrypting means corresponding to said encrypting means, and by using said decrypting means, decrypts said encrypted position information or information concerning said position information.]

[16. A reproduction apparatus according to claim 15, wherein when the encrypting means performs the encryption, it uses a secret key of a public key encryption function, and said decrypting means performs the decryption by using a public key corresponding to said secret key.]

[17. A reproduction apparatus according to claim 15, wherein said encrypting means includes first encrypting means for encrypting software feature information concerning features of software contents written to said disk and a sub public key of a public key encryption function by using a master secret key of said public key encryption function, and second encryption means for encrypting said position information or information concerning said position information by using a sub secret key corresponding to said sub public key, and said decrypting means includes first decrypting means for decrypting said encrypted software feature information and the encrypted sub public key of said public key encryption function, by using a master public key corresponding to said master secret key, and second decrypting means for decrypting said encrypted position information or information concerning said position information by using the sub public key thus decrypted.]

[18. A reproduction apparatus according to claim 14, wherein said position information writing means includes digital signature means for applying a digital signature to at least said output position information or information concerning said position information, and writes information concerning a result of said digital signature application to said disk, and said position information reading means includes authenticating means corresponding to said digital signature means, and position information extracting means for obtaining said position information from an authentication process performed by said authenticating means and/or from said information concerning the result of said digital signature application, when an output indicating correctness of said authentication result is produced from said authenticating means, said comparing/judging means performs the comparison and judgement by using the position information obtained by said position information extracting means and the result of reading by said marking reading means, and when said output indicating correctness is not produced, the reproduction is not performed.]

[19. A reproduction apparatus according to claim 18, wherein when said digital signature means applies said digital signature, it uses a secret key of a public key encryption function, and said authenticating means performs said authentication by using a public key corresponding to said secret key.]

[20. A reproduction apparatus according to claim 18, wherein said digital signature means includes first digital signature means for applying a digital signature to software feature information concerning features of software contents written to said disk and to a sub public key of a public key encryption function by using a master secret key of said public key encryption function, and second digital signature means for applying a digital signature to said position information or information concerning said position information by using a sub secret key corresponding to said sub public key, and the writing at least said output position information or information concerning said position information means writing a result of the application of said digital signature by said first digital signature means and a result of the application of said digital signature by said second digital signature means to said disk, wherein said position information reading means includes;

authenticating means for authenticating said digital signature-applied software feature information and sub public key of said public key encryption function, by using a master public key corresponding to said master secret key, and position information extracting means for obtaining said position information from said authentication process thereof and/or from the result of said digital signature application by using the sub public key obtained from said authentication process and/or from the result of said digital signature application, and when an output indicating correctness of said authentication result is produced from said authenticating means, said comparing/judging means performs the comparison and judgement by using the position information obtained by said position information extracting means and the result of reading by said marking reading means, and when said output indicating correctness is not produced, the reproduction is not performed.]

[21. A reproduction apparatus according to any one of claims 13 to 20, wherein the reproduction is not performed when, as a result of said comparison and judgement, the result of reading by said position information reading means and the result of reading by said marking reading means do not agree with each other.]

[22. A reproduction apparatus according to claim 16, 17, 19, or 20, wherein said public key encryption function is an RSA function or an elliptic function.]

[23. A method of manufacturing an optical disk, comprising the steps of:

forming at least one disk;

forming a reflective film to said formed disk;

applying at least one marking to said reflective film;

detecting at least one position of said marking; and outputting said detected position as position information of said marking, and encrypting said information for writing to said disk.]

[24. A method of manufacturing an optical disk, comprising the steps of:

forming at least one disk;

forming a reflective film to said formed disk;

applying at least one marking to said reflective film;

detecting at least one position of said marking; and outputting said detected position as position information of said marking, and applying a digital signature in relation to said position information for writing to said disk.]

[25. An optical disk wherein at least one marking is formed by a laser to at least one reflective film of the disk holding data written thereon and at least position information of said marking or information concerning said position information is written to said disk in an encrypted form or with a digital signature applied thereto.]

[26. An optical disk having a structure such that at least one reflective film is one of sandwiched directly and sandwiched indirectly between two members formed from material resistant to laser light, wherein at least one marking is formed by a laser to said reflective film.]

[27. A marking forming apparatus according to claim 9, wherein said disk is constructed by laminating two disks together.]

*28. An optical disk comprising:*

*a data zone having pits indicating data signals readable by light radiation;*

*a reflective layer formed on the data zone; and*

*portions of the reflective layer being trimmed forming markings,*

*wherein the markings form a barcode pattern indicating information and are formed on the pits on a track of the optical disk.*

*29. A method of manufacturing an optical disk comprising the steps of:*

*forming, on a substrate, a data zone having pits indicating data signals readable by light radiation;*

*forming a reflective layer on the data zone; and*

*trimming the reflective layer to form markings on the pits on a track of the optical disk;*

*wherein the markings form a barcode pattern indicating information.*

* * * * *

UNITED STATES PATENT AND TRADEMARK OFFICE

CERTIFICATE OF CORRECTION

PATENT NO. : RE 39,297 E
APPLICATION NO. : 10/020427
DATED : September 19, 2006
INVENTOR(S) : Mitsuaki Oshima et al.

It is certified that error appears in the above-identified patent and that said Letters Patent is hereby corrected as shown below:

Title Page (Page 2), Item (56) References Cited, FOREIGN PATENT DOCUMENTS
Delete Duplicate Reference "EP 0545472 6/1993"

Title Page (Page 2), Item (56) References Cited, FOREIGN PATENT DOCUMENTS
Change "JP 5-325193 1/1991" to -- JP 5-325193 12/1993 --

Title Page (Page 2), Item (56) References Cited, FOREIGN PATENT DOCUMENTS
Add
-- JP 5-234321 9/1993 --
-- JP 58-211343 12/1983 --
-- JP 61-248250 11/1986 --
-- JP 03-078178 4/1991 --
-- JP 03-116441 5/1991 --
-- JP 02-056750 2/1990 --

Title Page (Page 2), Item (56) References Cited, OTHER PUBLICATIONS
Add
-- Korean Patent Office Official Action , dated March 5, 2003 --

Column 42
Line 20, after "trimmed" add -- by a laser --

Column 42
Line 23, delete "on a track of" add -- functioning as a track on --

UNITED STATES PATENT AND TRADEMARK OFFICE

CERTIFICATE OF CORRECTION

PATENT NO. : RE 39,297 E
APPLICATION NO. : 10/020427
DATED : September 19, 2006
INVENTOR(S) : Mitsuaki Oshima et al.

It is certified that error appears in the above-identified patent and that said Letters Patent is hereby corrected as shown below:

Column 42
Line 30, after "trimming" add -- by a laser --

Column 42
Line 31, delete "on a track of" add -- functioning as a track on --

Signed and Sealed this

Twenty-fifth Day of December, 2007

JON W. DUDAS
*Director of the United States Patent and Trademark Office*